US011448189B2

(12) United States Patent
Dietzel

(10) Patent No.: US 11,448,189 B2
(45) Date of Patent: Sep. 20, 2022

(54) POWER GENERATION AND PROPULSION ARCHITECTURE USING FLUID FLOW

(71) Applicant: Paul C. Dietzel, Cuyahoga Falls, OH (US)

(72) Inventor: Paul C. Dietzel, Cuyahoga Falls, OH (US)

(*) Notice: Subject to any disclaimer, the term of this patent is extended or adjusted under 35 U.S.C. 154(b) by 0 days.

(21) Appl. No.: 16/789,364

(22) Filed: Feb. 12, 2020

(65) Prior Publication Data

US 2020/0200147 A1 Jun. 25, 2020

Related U.S. Application Data

(63) Continuation-in-part of application No. 15/681,754, filed on Aug. 21, 2017, now Pat. No. 10,598,153.
(Continued)

(51) Int. Cl.
*F03D 9/00* (2016.01)
*F03D 9/12* (2016.01)
(Continued)

(52) U.S. Cl.
CPC ............ *F03D 9/12* (2016.05); *F03D 1/04* (2013.01); *F03D 3/0427* (2013.01); *F03D 3/065* (2013.01); *F03D 7/0224* (2013.01); *F03D 9/32* (2016.05); *F03D 80/00* (2016.05); *F03D 15/10* (2016.05); *F05B 2240/133* (2013.01); *F05B 2240/941* (2013.01); *Y02B 10/30* (2013.01); *Y02E 10/74* (2013.01)

(58) Field of Classification Search
CPC ..... F03D 9/00; F03D 9/12; F03D 9/11; F03D 3/065; F03D 3/0427; F03D 9/32; F03D 1/04; Y02B 10/30; Y02E 10/74; Y02E 10/72; F05B 2240/931
See application file for complete search history.

(56) References Cited

U.S. PATENT DOCUMENTS

| 981,077 A | 1/1911 | Feldner |
| 1,595,578 A | 5/1925 | Sovereign |
| (Continued) | | |

FOREIGN PATENT DOCUMENTS

| DE | 3630488 A1 | 3/1987 |
| EP | 0433380 B1 | 6/1993 |
| (Continued) | | |

OTHER PUBLICATIONS

Marlec Renewable Power; a montage of wind power turbines for boats; found at https://www.marlec.co.uk/wind-power/boats-and-marine/?v=7516fd43adaa; date unknown; 1 page.
(Continued)

*Primary Examiner* — Julio C. Gonzalez
(74) *Attorney, Agent, or Firm* — E.D. Jorgenson Law, LLC; Eric D. Jorgenson, Esq.

(57) ABSTRACT

A turbine system that harnesses energy from natural atmospheric wind and water currents for power generation and storage in a power storage mode, and in a reverse switched operation, sources current to the turbine system from storage power to function in a propulsion mode to propel an associated structure (e.g., boat, aircraft).

19 Claims, 43 Drawing Sheets

Related U.S. Application Data which is a continuation of application No. 14/627,212, filed on Feb. 20, 2015, now Pat. No. 9,745,960.

(60) Provisional application No. 61/944,012, filed on Feb. 24, 2014.

(51) Int. Cl.

| | | |
|---|---|---|
| *F03D 3/06* | (2006.01) | |
| *F03D 7/02* | (2006.01) | |
| *F03D 3/04* | (2006.01) | |
| *F03D 9/32* | (2016.01) | |
| *F03D 80/00* | (2016.01) | |
| *F03D 1/04* | (2006.01) | |
| *F03D 15/10* | (2016.01) | |

(56) References Cited

U.S. PATENT DOCUMENTS

| | | | |
|---|---|---|---|
| 2,409,439 A | 10/1946 | Law | |
| 2,563,279 A | 8/1951 | Rushing | |
| 3,156,447 A | 11/1964 | Takeda | |
| 3,556,239 A * | 1/1971 | Spahn | B60K 6/48 180/65.25 |
| 3,883,750 A | 5/1975 | Uzzell, Jr. | |
| 4,045,144 A | 8/1977 | Loth | |
| 4,087,196 A | 5/1978 | Kronmiller | |
| 5,844,324 A | 12/1998 | Spriggle | |
| 5,939,861 A | 8/1999 | Joko | |
| 6,373,145 B1 | 4/2002 | Hamrick | |
| 6,476,513 B1 | 11/2002 | Gueorguiev | |
| 6,655,907 B2 | 12/2003 | Brock et al. | |
| 6,838,782 B2 | 1/2005 | Vu | |
| 6,926,346 B1 | 8/2005 | Wong et al. | |
| 7,256,512 B1 | 8/2007 | Marquiss | |
| 7,339,286 B1 * | 3/2008 | Chen | F03D 80/00 290/55 |
| 7,538,447 B1 | 5/2009 | Berenda et al. | |
| 7,679,206 B1 | 3/2010 | Green | |
| 7,808,121 B1 | 10/2010 | Glynn | |
| 7,969,036 B2 | 6/2011 | Chung | |
| 8,434,574 B1 | 5/2013 | York et al. | |
| 8,618,683 B2 | 12/2013 | Diaz | |
| 2003/0175109 A1 | 9/2003 | Brock et al. | |
| 2008/0209940 A1 | 9/2008 | Whisson | |
| 2008/0283319 A1 | 11/2008 | Putnam | |
| 2010/0026009 A1 | 2/2010 | Sarwin | |
| 2010/0107633 A1 | 5/2010 | Tsao | |
| 2010/0320771 A1 * | 12/2010 | Urch | F03B 17/061 290/55 |
| 2011/0095531 A1 | 4/2011 | Menges | |
| 2011/0133454 A1 * | 6/2011 | Vo | F03D 13/20 290/44 |
| 2012/0119507 A1 | 5/2012 | Tuttle | |
| 2013/0043082 A1 | 2/2013 | Tran | |
| 2013/0101502 A1 | 4/2013 | McAlister | |
| 2013/0127393 A1 | 5/2013 | Garcia | |

FOREIGN PATENT DOCUMENTS

| | | |
|---|---|---|
| WO | 2009114920 A1 | 9/2009 |
| WO | 2012141603 A1 | 10/2012 |

OTHER PUBLICATIONS

Marlec Renewable Power; a montage of wind power systems for caravans, camping, and leisure; found at https://www.marlec.co.uk/wind-power/caravans-and-leisure/?v=7516fd43adaa; date unknown; 1 page.

American Security Project; The Future of Flying Wing Turbines; screenshot found at https://www.americansecurityproject.org/?s=furture+of+flying&submit=; Jun. 21, 2013; 1 page.

Hov Pod; screenshots of electric drones and others from www.hovpod.com; found at https://hovpod.com/hovercraft-applications/drone-platform/vtol-fixed-wing-drone/; date unknown; 1 page.

WaterLily Turbine; montage of screenshots of portable water turbines from website; found at https://www.waterlilyturbine.com/; 2019; 1 page.

Bergey WindPower; screenshots of Large, Full-Scale Wind Turbines; found at http://www.bergey.com/; date unknown; 1 page.

* cited by examiner

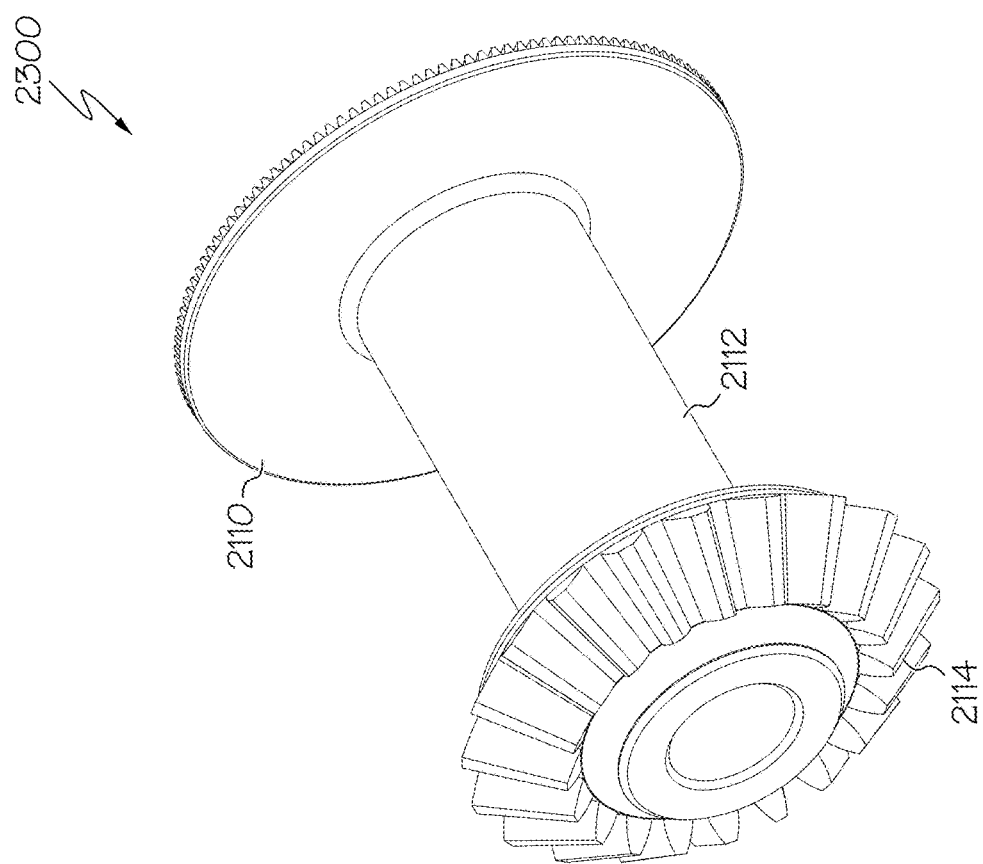
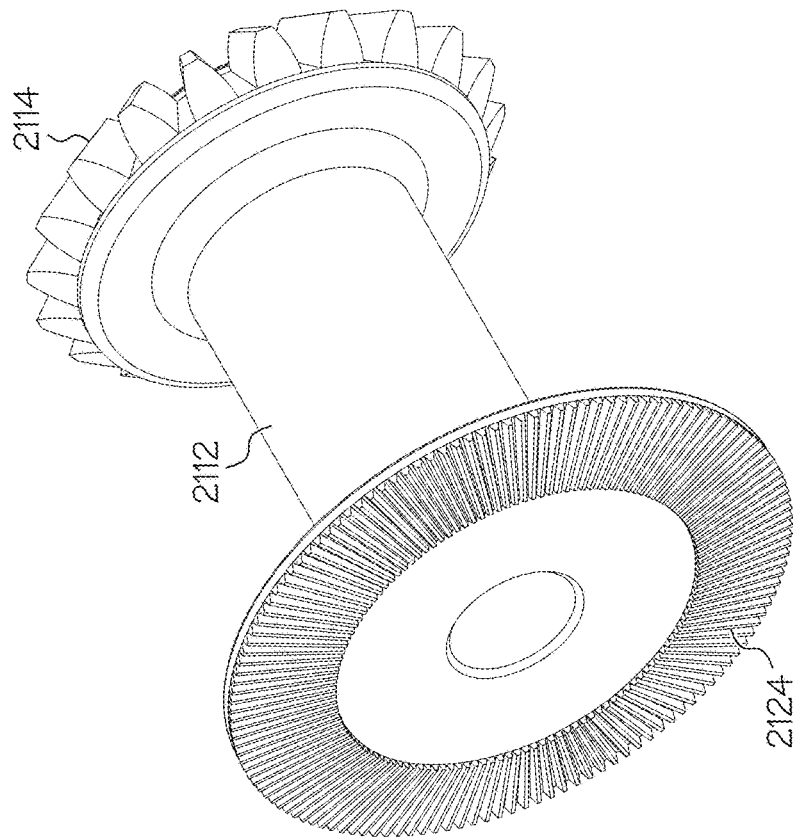
FIG. 23

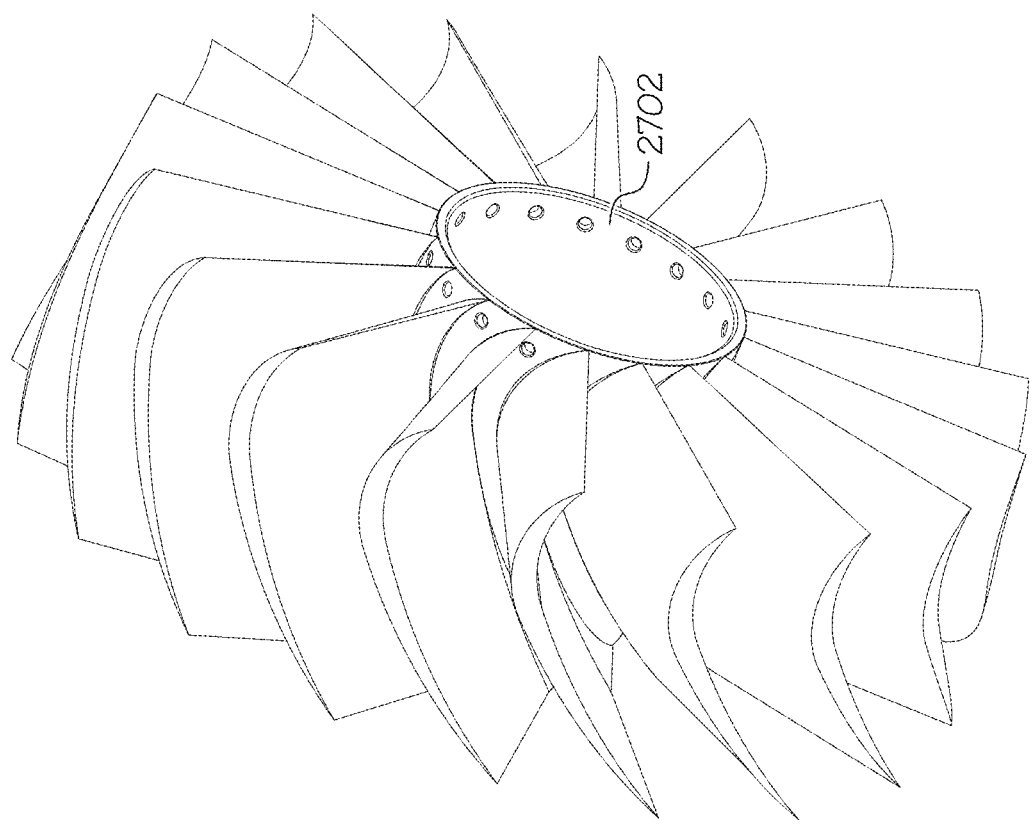
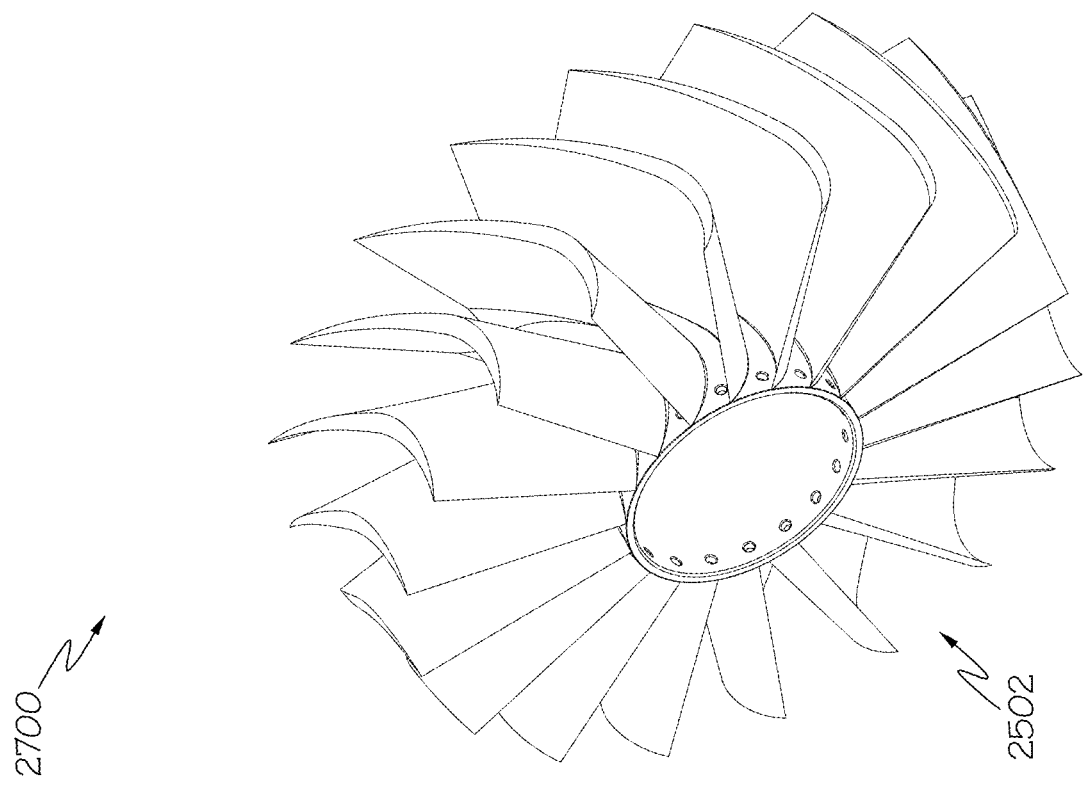
FIG. 27

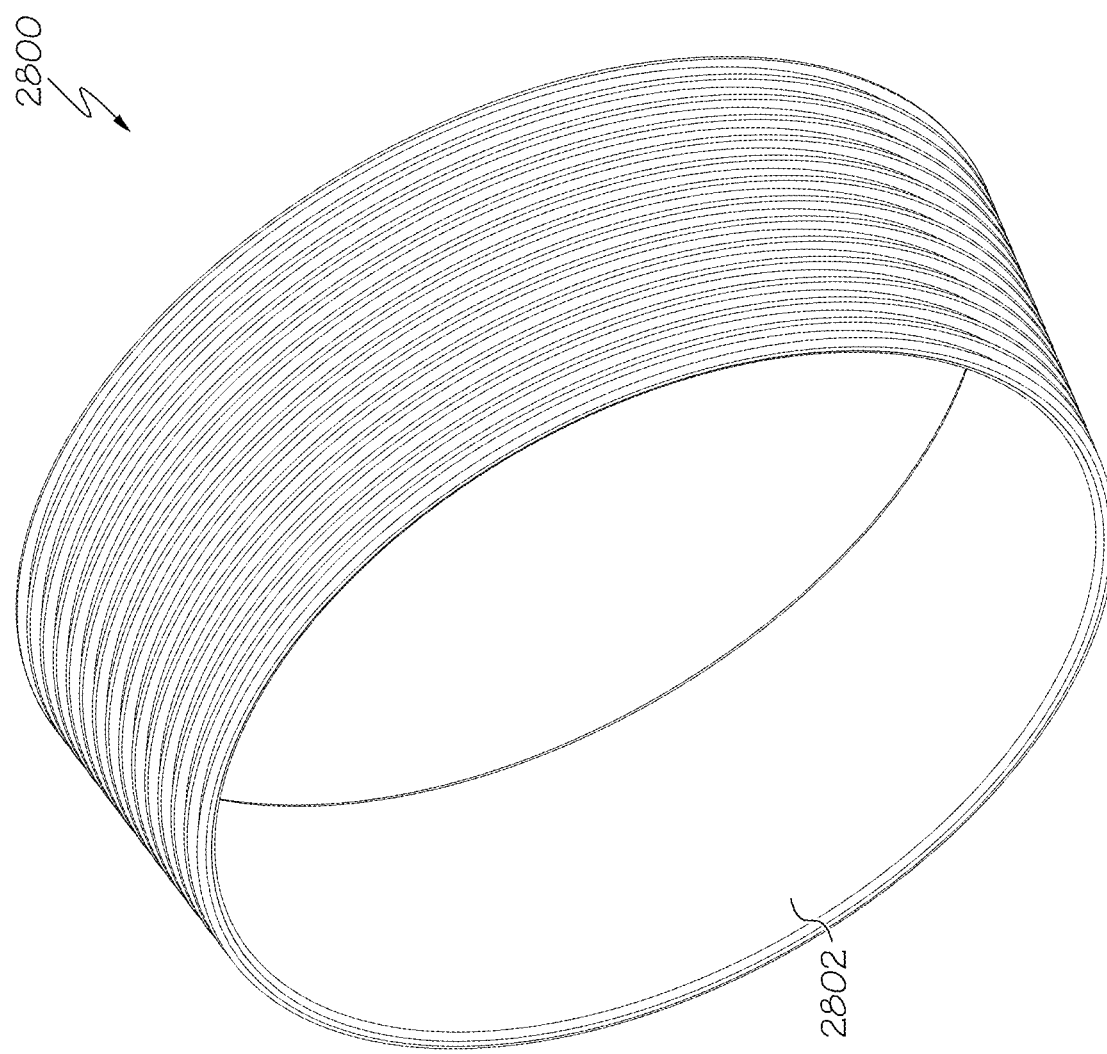
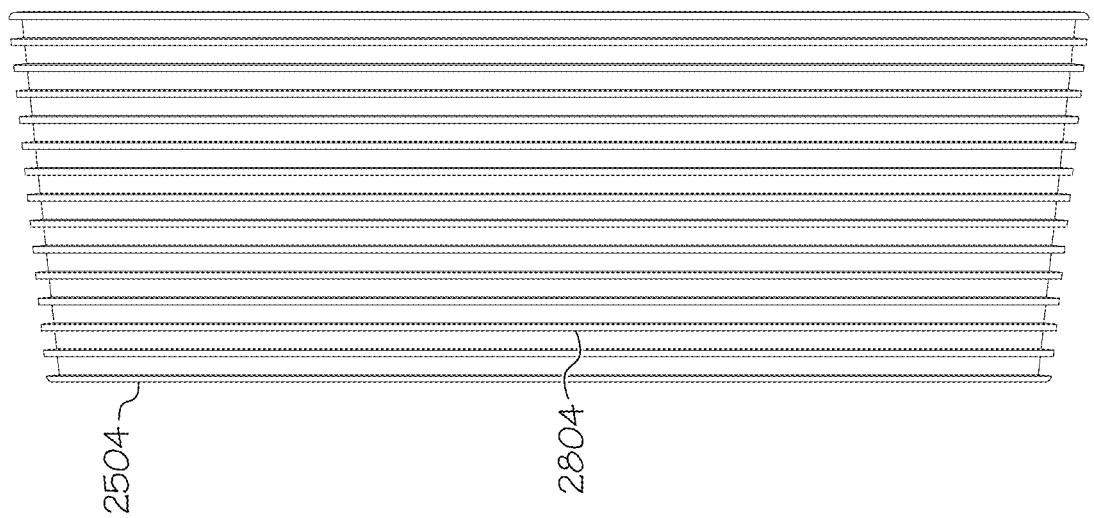
FIG. 28

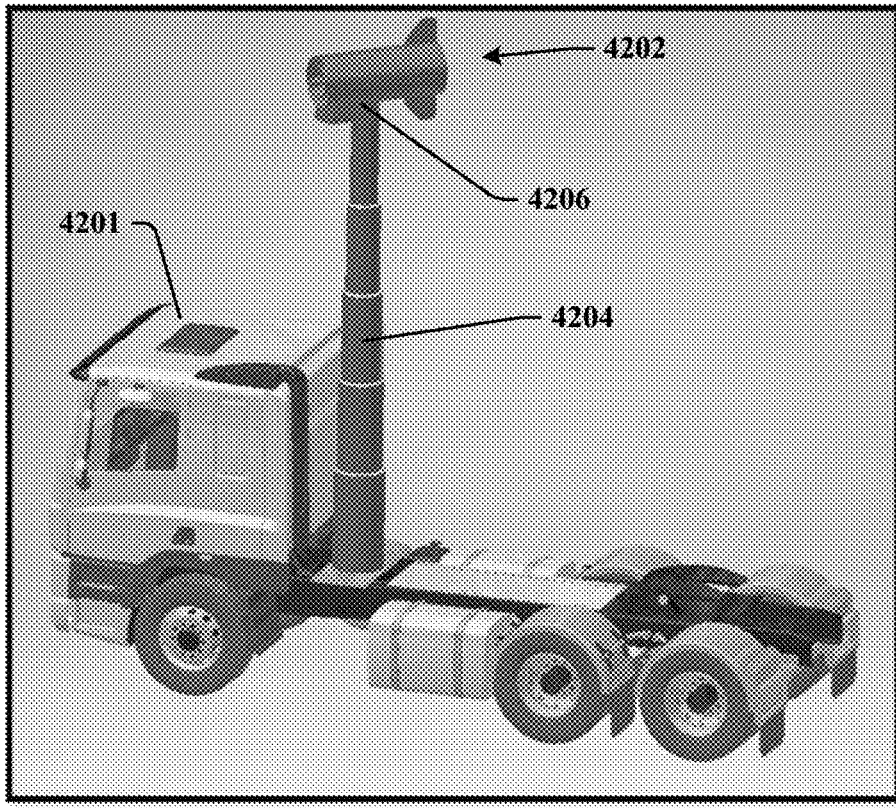
*FIG. 42A*
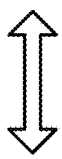
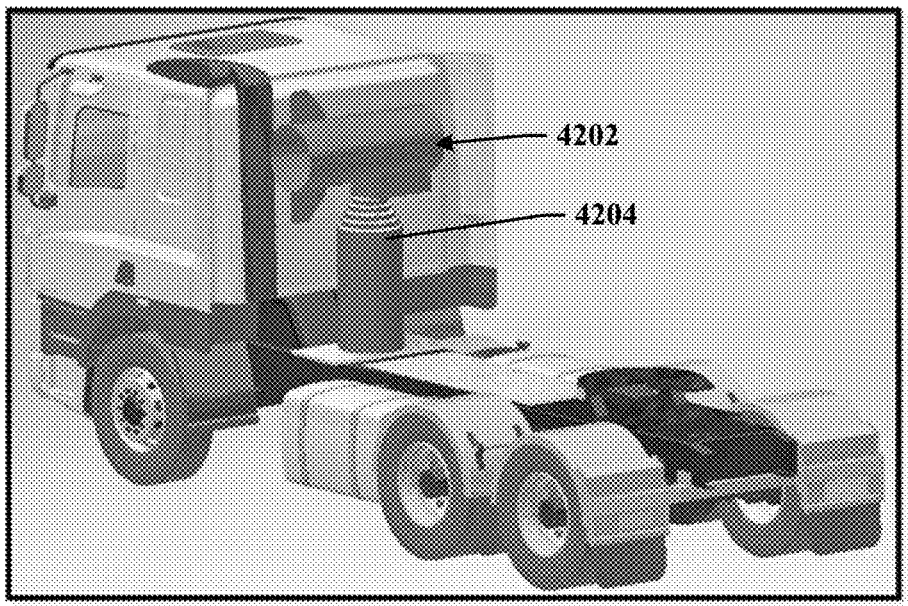
*FIG. 42B*

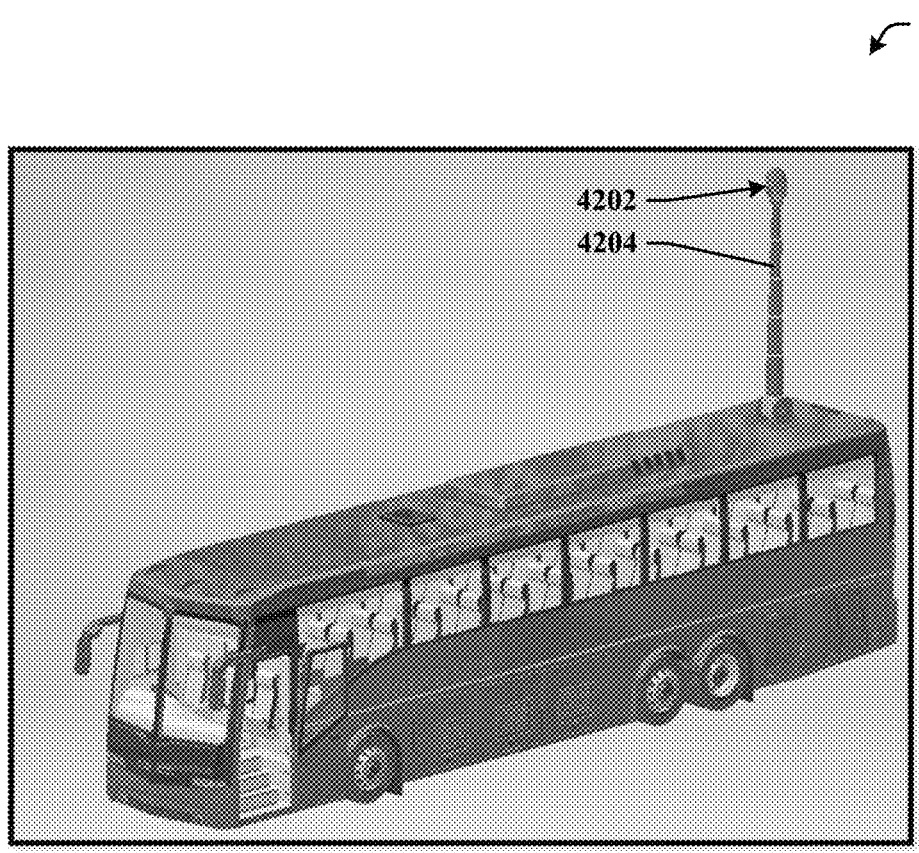
*FIG. 43A*
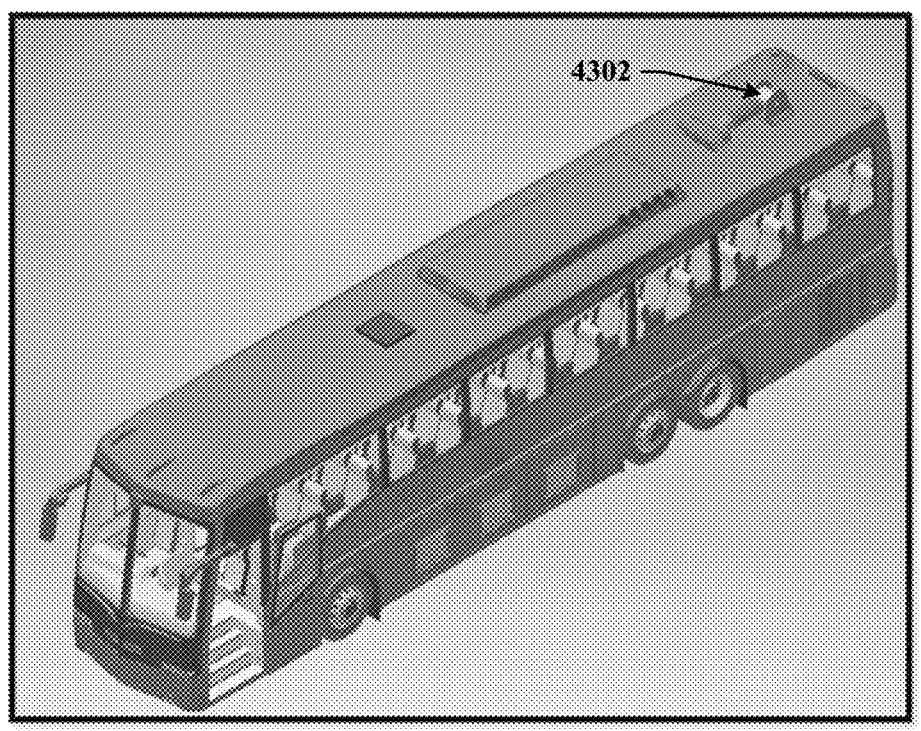
*FIG. 43B*

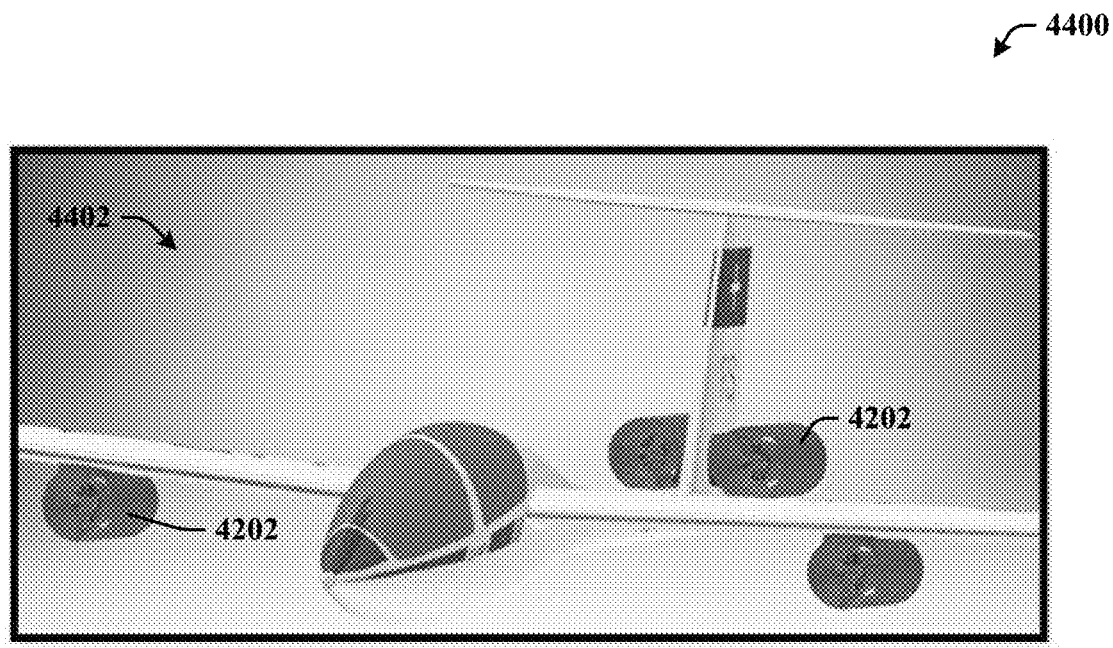
*FIG. 44A*
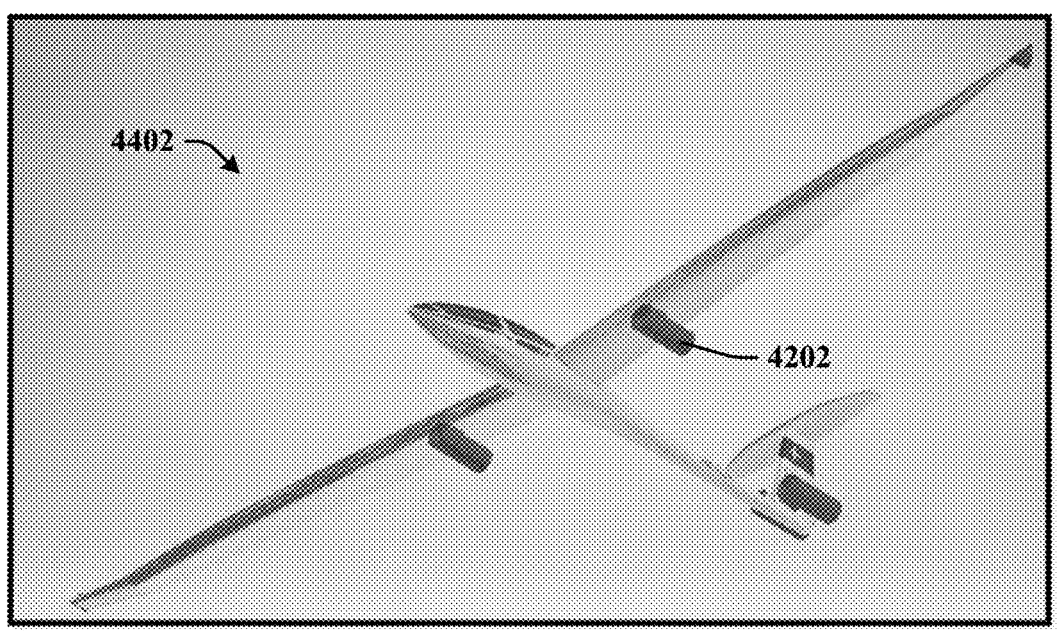
*FIG. 44B*

POWER GENERATION AND PROPULSION ARCHITECTURE USING FLUID FLOW

CROSS-REFERENCE TO RELATED APPLICATIONS

This application is a Continuation-in-Part of U.S. patent application Ser. No. 15/681,754 filed Aug. 21, 2017 and entitled "POWER GENERATION ARCHITECTURE USING ENVIRONMENTAL FLUID FLOW", which is a Continuation of U.S. patent application Ser. No. 14/627,212, filed Feb. 20, 2015, and entitled "POWER GENERATION SYSTEM USING ENVIRONMENTAL FLUID FLOW", now U.S. Pat. No. 9,745,960, issued Aug. 29, 2017, which claims the benefit of U.S. Provisional Patent Application Ser. No. 61/944,012 entitled "POWER GENERATION SYSTEM USING ENVIRONMENTAL FLUID FLOW" and filed Feb. 24, 2014, the entirety of the applications incorporated by reference herein.

BACKGROUND

Commercial transport vehicles such as tractor-trailer rigs are an essential part of the cargo delivery infrastructure. In long-haul deliveries, for example, drivers will typically run their diesel engines while taking a break or even staying overnight at a truck stop or other location to sustain heating, air conditioning, and electrical power components for personal comfort and/or load considerations. Additionally, fuel costs are a significant cost whether short haul or long-haul transports. Truckers seek ways in which to at least cut fuel costs by mounting aerodynamic cowlings on the cab, for example, to direct airflow over and around equipment that would otherwise cause air turbulence that has the ultimate effect of increasing fuel consumption. Additionally, environmental regulations are placing increasing burdens on transports over air quality requirements. Transportation companies and owner-operators are looking for solutions to at least reduce fuel costs and emissions.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture harnesses energy from natural atmospheric wind and water currents and self-generated wind and water currents from moving vehicles (terrestrial such as cars, trucks, recreational vehicles, etc., and non-terrestrial such as boats, ships, aircraft, etc.) and natural fluid flow found in nature for moving or stationary applications (e.g., on a post or tower). The power generation system is a non-combustion technology (does not use combustible fuels) that harnesses energy from sources of natural atmospheric currents/flows utilizing pneumatic and/or hydraulic turbines with compound nozzles, meteorological sensors, computer controlled harmonic resonance valves (also called blades), a control system, and other components. In one implementation, a system is utilized on a tractor-trailer vehicle to obtain the benefit of wind flow while in operation, for example, over long distance ("over-the-road") trips.

The architecture is a nozzle design where the nozzle comprises a ducting system that includes convergent ducts and divergent ducts that when combined with controlled fluid flow throttling attains optimum fluid mass and pressure in order to effectively and efficiently impart energy to power generation devices. In an implementation of airflow, the divergent duct widens as airflow progresses through the duct; hence, at subsonic speeds, the divergent duct increases pressure and temperature of the air while decreasing air velocity. The convergent duct narrows as airflow progresses through the duct; hence, at subsonic speeds, the convergent duct decreases pressure and temperature of the air while increasing the air velocity. The overall effect of this ducting and throttling is to drive the power generation system. The principle can be applied to turbines as the power generation devices as air impacting the turbines moves from a convergent/divergent flow into the turbine blades.

Put another way, there is described a turbine system, comprising: a turbine mounted in a housing into which fluid flow is received for rotation of the turbine, the housing having compound nozzles which include a smaller opening into which fluid flow is received and a larger opening from which fluid flow is exhausted, the turbine positioned inside a shroud, the shroud designed as a conic section and rotates in unison with the turbine; and, a power generation system connected to the turbine to receive and store power from the turbine in a power storage mode, and to deliver power to the turbine to control the turbine in a propulsion mode.

The turbine system can further comprise an electromechanical control system which controls cycling blades of the turbine system to incrementally open and close the cycling blades to manage fluid flow into the turbine. The cycling blades can be controlled to achieve optimum rotational energy of the turbine for at least one of power generation or propulsion.

The turbine system can further comprise an electromechanical control system for control and data acquisition, power conversion, and power routing, the electromechanical control system is local to the power generation system. The power generator system can include a rotating stator, the rotating stator fixedly attached to the turbine, and rotated by the turbine based on the fluid flow to generate power which is routed to power storage.

The housing is pivotally mounted and controlled to enable the propulsion mode from the turbine in a specific direction. The turbine system can be employed on an aquatic (water-based) vehicle to generate and store power when controlled as a wind turbine, and another turbine system is employed on the aquatic vehicle to provide propulsion when controlled as a (submerged) water turbine.

The turbine system can be portable for outdoor use to generate and store power based on at least one of wind or water. The turbine system can be controlled to provide thrust from at least one of wind or water when in the propulsion mode.

The turbine system can further comprise an extendible support on which the housing is mounted, the extendible support is at least one of manually extendible and retractable or automatically controlled to be extended and retracted, and which support comprises a support base which enables attachment of the support and turbine system to a surface. The support base can comprise a hinged hardware component which enables rotation of the support and the turbine system into a stowed position and an operational position.

The compound nozzles of the turbine system inherently generate thrust to compensate for aerodynamic drag. The power generation system automatically switches operation of the turbine between the power storage mode and the propulsion mode based on amount of stored power. The turbine can be controlled in propulsion mode during take-off of an aircraft, and in power storage mode during landing of the aircraft to facilitate braking. The turbine system can further comprise electrical switching gear that enables charging of some power storage elements and power delivery from other power storage elements.

In another implementation, a turbine system is provided, comprising: a turbine mounted in a housing into which fluid flow is received for rotation of the turbine, the housing having compound nozzles which include a smaller opening into which fluid flow is received and a larger opening from which fluid flow is exhausted, the turbine positioned inside a shroud, the shroud designed as a conic section and rotates in unison with the turbine; an electromechanical control system which controls cycling blades of the turbine system to incrementally open and close the cycling blades to manage fluid flow into and out of the turbine; and, a power generation system connected to the turbine to receive and store power from the turbine in a power storage mode, and to deliver power to the turbine to control the turbine in a propulsion mode.

The turbine system can further comprise an extendible support on which the housing is mounted, the extendible support is at least one of manually extendible and retractable or automatically controlled to be extended and retracted. The turbine system can further comprise a support base which enables attachment of the support and turbine system to a water-based vehicle, a land-based vehicle, and an air-based vehicle.

The turbine system can further comprise electrical switching gear that enables charging of some power storage elements during the power storage mode and concurrent delivery of power from other power storage elements during the propulsion mode.

In yet another implementation, a turbine system is provided, comprising: a turbine mounted in a housing into which fluid flow is received for rotation of the turbine, the housing comprising a convergent section into which fluid flow is input and a divergent section from which fluid flow is output, the turbine positioned inside a shroud, the shroud designed as a conic section and rotates in unison with the turbine; an electromechanical control system which controls cycling blades of the turbine system to incrementally open and close the cycling blades to manage fluid flow into and out of the turbine; and a power generation system connected to the turbine to receive and store power from the turbine in a power storage mode, and to deliver power to the turbine to control the turbine in a propulsion mode.

In yet another implementation, a power generation system is disclosed, comprising: a housing, comprising an input into which fluid flow is received; a rotatable turbine mounted in the housing, the turbine comprising turbine blades impacted by the fluid flow; a cycling blade system mounted between the input and the turbine, the cycling blade system comprises cycling blades controlled to incrementally open and close to manage the fluid flow from the input to the turbine; and a power generator connected to the turbine, the turbine rotates the power generator based on driving force of the fluid flow against the turbine blades, to generate power.

In still another alternative implementation, a power generation system is disclosed, comprising: a housing, comprising an input into which fluid flow is received; a rotatable turbine mounted in the housing, the turbine comprising turbine blades impacted by the fluid flow; a cycling blade system mounted between the input and the turbine, the cycling blade system comprises cycling blades controlled to incrementally open and close to manage the fluid flow from the input to the turbine; a power generator connected to the turbine to generate power, the turbine rotates a stator of the power generator based on driving force of the fluid flow against the turbine blades; and an electromechanical control system for electromechanical interconnection for control and data acquisition, power conversion, and power routing, the electromechanical control system is local to the power generation system.

In yet a further alternative implementation, a power generation system is disclosed, comprising: a housing, comprising an input into which fluid flow is received, the housing has an interior, the interior of the housing comprises a convergent section and a divergent section, with fluid flow entering the convergent section via the input; a rotatable turbine located inside the housing, the turbine comprising turbine blades impacted by the fluid flow; a cycling blade system located inside the housing and between the input and the turbine, the cycling blade system comprises cycling blades controlled to incrementally open and close to manage the fluid flow from the input to the turbine; a power generator connected to the turbine to generate power, the turbine rotates a stator of the power generator based on driving force of the fluid flow against the turbine blades; and an electromechanical control system for electromechanical interconnection for control and data acquisition, power conversion, and power routing, the electromechanical control system is local to the power generation system.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 23 illustrates isometric views of the drum, drum shaft, and drum shaft bevel gear.

FIG. 27 illustrates views of the turbine.

FIG. 28 illustrates side and isometric views of the flywheel shroud.

FIG. 42A and FIG. 42B illustrate a land-vehicle system of a land-based vehicle that can utilize turbine system as a power generator.

FIG. 43A and FIG. 43B illustrate a power generation system that employs the wind turbine system on a public transport, such as a bus.

FIG. 44A and FIG. 44B illustrate an aircraft system that utilizes turbine systems attached to an aircraft for power generation and/or propulsion.

DETAILED DESCRIPTION

Figure 1:
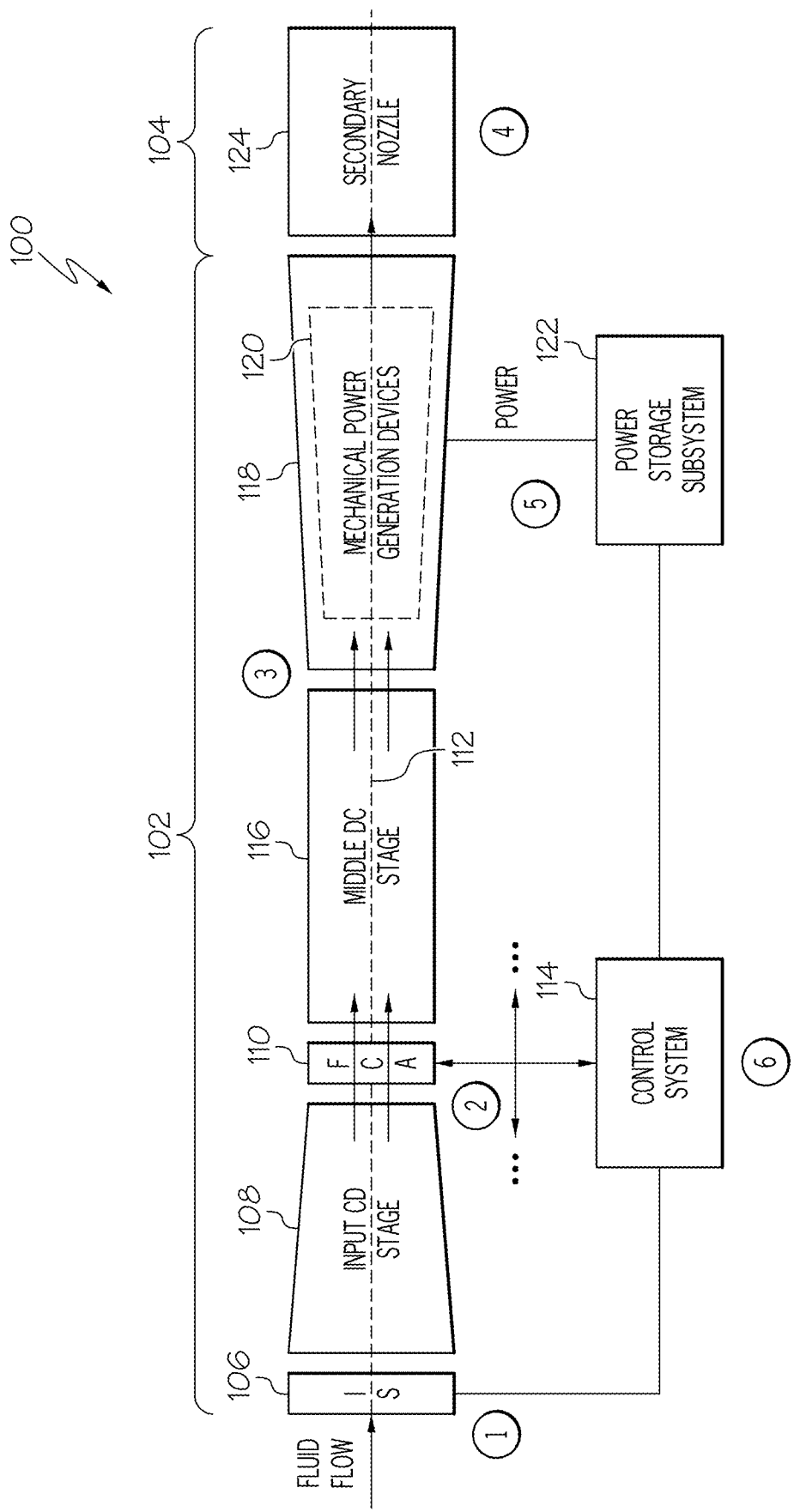
FIG. 1 illustrates a power generation system in accordance with the disclosed architecture.

The disclosed architecture utilizes fluid dynamics (gaseous and liquid) from natural environmental sources to generate energy for different purposes. The architecture generates power from the fluid moving past the stationary energy generation system as well as when the energy generation system is moving.

The disclosed architecture can be designed for use in both wind and water currents such as windmills/wind turbines, waterwheels/water turbines, and similar devices. The architecture harnesses energy from natural atmospheric wind and water currents and self-generated wind and water currents from moving vehicles and natural fluid flow found in nature for moving or stationary applications. The power generation system harnesses energy from natural atmospheric sources utilizing pneumatic and/or hydraulic turbines with compound nozzles, meteorological sensors, computer controlled harmonic resonance valves (also called blades), a control system, and other components.

The use of hydraulic (water) turbines for the stationary type power generation system can utilize suitably designed turbine blade designs/configurations than the pneumatic (air) turbines. The hydraulic turbines may accommodate larger forces due to the larger fluid density. Additionally, cavitation effects are considered, which if not properly engineered can cause major damage to all parts of the turbine.

Cavitation defines the behavior of a fluid in a hydraulic machine when the static pressure at some point in the machine drops below the vapor pressure of the fluid passing through the machine. Accordingly, other types of turbines are used for hydraulic systems such as impulse wheels, Pelton wheels, Francis runners, propeller runners, Kaplan adjustable blade propeller runners, Terry runners, and others. The principle operation of both hydraulic and pneumatic turbines remains the same, however, but the parts of the turbine/system are slightly different in order to accommodate the differences in forces, cavitation, drag, stall, and other effects. Moreover, seals become more important to counteract leaks and chemical effects such as corrosion, depths, and pressures, for example.

Following is a set of terms and definitions used throughout this description.

A nozzle is a device or system designed to control, to some designed degree, the characteristics and direction of fluid flow (e.g., airflow) such as for a gas or a liquid as being discharged via a pipe, hose, or spout. As utilized herein in one embodiment, a primary nozzle through which airflow is enabled can comprise a series of ducting or subnozzles (nozzles within the primary nozzle) to manage airflow for the benefit of the efficient and controlled generation of power.

A diffuser is a device that impacts/controls the characteristics of a fluid flow at the entrance (input) or exit (output) of a thermodynamic flow passage. For example, a diffuser can be utilized to decelerate a stream of air (or a liquid) from a higher velocity to a lower velocity.

Resonance is the enhancement of a response of a system, (e.g., electric, mechanical, etc.) to a periodic driving force when the driving frequency is equal to the natural undamped frequency of the system.

An ejector is a device that uses the Venturi effect of a converging-diverging nozzle to convert pressure energy of a motive fluid to velocity energy, which creates a low pressure zone that draws in and entrains a suction fluid. Referred to also as a "siphon", "exhauster", or "eductor", the ejector is similar to an injector in its method of action, but is designed to handle large quantities of gases, liquids, or even solids, against a pressure less than that of the actuating fluid. The actuating fluid may be steam or water or other high pressure vapor, gas, or liquid.

A flywheel is a rotating mechanical device (e.g., an inertia wheel) that stores rotational energy to minimize speed variations in a system or machine that may be subject to fluctuations in drive and load.

Reentry turbines are turbines in which the gas enters a single wheel two or more times.

A Curtis stage, impulse turbine is a turbine that uses two rows of moving blades to absorb the kinetic energy of a gas (e.g., air), and between these rows is a row of stationary blades to guide the gas properly into a second set of moving blades.

A Rateau turbine (pressure-compounded turbine) is a turbine typically used in steam systems where the pressure drop from the steam inlet (throttle) and the exhaust is regulated by a series of velocity-compounded impulse stages using nozzles and blades. The difficulties attendant upon the high velocities following large expansions may be avoided by breaking up the total expansion from throttle to exhaust into a series of small expansions. There is provided a set of nozzles for each small expansion and a row of blades for each set of nozzles.

A permanent magnet alternator is a generator that produces alternating current (AC) and makes use of a permanent magnet as the field.

Ram tuning (resonant manifold tuning) is a process of enhancing the amount of input to realize an increase in output, such as horsepower. This is commonly used on performance race cars to optimize the airflow into the engine cylinders for increased output horsepower.

A hydraulic ram is a fluid pump (e.g., water) in which the downward flow of naturally running fluid is intermittently halted by a valve so that the flow is forced upward through an open pipe into a reservoir (e.g., for a water tower).

A wind concentrator such as the input of the primary nozzle, for example, is a device that can be used to augment wind flow into a turbine or other wind-driven type of power generation device.

The disclosed architecture will be described primarily in the context of a tractor-trailer vehicle commonly used for over-the-road (terrestrial) transport of goods, and using turbines as the power generation devices. However, it is to be understood that the disclosed power generation architecture is not so limited, and comprises embodiments that can be suitably designed to be utilized on smaller terrestrial (or airborne) vehicles, as a standalone system for residential or commercial power generation, on water transports above and/or below the waterline (e.g., boats, ships, tankers, etc.), in environments where water wave actions may drive the system, in terrestrial wind environments, and so on.

The disclosed power generation architecture provides and utilizes many different features, including, but not limited to: at least two cowls or aerodynamic covers used in the system; a primary nozzle that comprises subnozzles in the system whether convergent-divergent or divergent-convergent types; a secondary nozzle which is the most rear nozzle (exhaust nozzle), and which is part of the last cowl to function as a fluid ejector; and, the secondary (exhaust) nozzle can also have operational aspects of a ram jet.

Other features include the following: the primary nozzle is generally a convergent-divergent type which operates as a pulse jet by using a valve (a throttle valve), also referred to as a flow control apparatus, in the throat of the primary nozzle to pulse fluid waves at a resonance frequency of the fluid column; the use of Curtis stage type stationary reversing buckets redirect the fluid flow into the various turbine stages along the divergent portion of the primary nozzle; the use of Rateau stage type expansion nozzle/chambers between the turbines establish velocity/pressure staging for each turbine; and, the throttle valve that functions as a flow control apparatus, airfoil/hydrofoil valves, and/or similar valves in the throat of the primary nozzle generate a harmonic pressure wave cycle utilizing a Helmholtz-resonance effect to multiply the kinetic energy that flows into the turbines.

Still other features include the use and control of an aerodynamic input shutter of the primary nozzle, which is a housing designed to be adjusted incrementally from a closed position to various degrees of openness corresponding to increase or decrease the cross-sectional area of the primary nozzle intake port through which the air can travel such that the turbine speed can be controlled. The aerodynamic housing design of the input shutter deflects excess air over the top of the power generation system and vehicle while minimizing any drag on the entire vehicle/system. When fully closed (power generation disabled), the input shutter housing enables the power generation system 100 to function as a fully streamlined body on the vehicle.

The fluid turbines utilize flywheel gears to act as load/speed leveling devices, and the flywheel gearing of one turbine interconnects to no more than two other turbines, whereby all turbines are interconnected by the associated flywheel gears, and all the wind turbines rotate together but at different rotational speeds (RPMs) to limit the top rotational speed of the turbine/generators under large airflow velocities. The flywheel gears are of different sizes (diameters) for correspondingly different-sized turbines, and thus, rotate as different rotational speeds. Other type/style turbines can also use flywheels but may then use flywheels with labyrinth seals rather than gearing, since the design does not require a radial mechanical connection.

Radial blade turbines are utilized with reentry type blades. The turbines can be of the impulse type configuration so that blade clearances do not need to be as tight as blade clearances of reaction type blades for moving vehicle applications. However, any type/style of turbine may be utilized depending upon the requirements of the specific situation and application of the system. Thus, reaction, impulse, or both may be used in various places and implementations.

For radial type turbines, oppositely curved blade design configurations can be used both clockwise and counterclockwise based on which side of the divergent nozzle (diffuser) it is positioned. These turbines are geared together directly which requires opposing rotation, and the air flow is on opposite sides of the staggered air turbine configuration. This operation is similar to roots style blowers, where the geared lobes rotate opposite of each other.

Computer controlled servo motors can be utilized in the power generation system, such as for the input shutter open/close control of the primary nozzle and the primary nozzle flow control apparatus, for example.

The control and data acquisition system can comprise computer monitored/controlled sensors such as meteorological sensors for air (fluid) speed, temperature, pressure, humidity, turbine/generator rotational speed, vehicle wheel speed, and other auxiliary sensors for controlling the servo motor inputs. The system optimizes for maximum power output from the power generator devices without overspending the generators while maintaining resonance in the fluid column.

Power can be stored in one or more storage subsystems such as battery banks to provide backup/primary vehicle power and for powering the servo-motors, for example, of the system. The battery banks can comprise switching gear to enable certain batteries to be charged while other batteries are providing power to the vehicle and/or the power generation system components.

Permanent magnet alternators and/or alternating current (AC) generators with exciters can be employed to eliminate the need for external power to operate the generator. These generators can be connected to the air turbines to produce electrical power. Other components such as controllers, rectifiers, and inverters for these generators can be incorporated with the system.

The power stored can be used for vehicle power, HVAC (heating, ventilation, and air conditioning), and auxiliary equipment to prevent unnecessary engine idling, especially in commercial trucks, buses, and recreational vehicles, for example.

The housing components, as well as other suitable structural components, can be constructed of lightweight materials such as aluminum, aluminum alloy, magnesium alloy, titanium alloy, carbon fiber composite, fiberglass, or other such materials.

The flow control apparatus (e.g., butterfly valve), airfoil/hydrofoil valves, and/or similar flow control elements can utilize a worm gear train with an increaser spur gear or bevel gear train such that the motor speed is the same as the flow control apparatus speed (e.g., one revolution of the motor shaft for one cycle of the flow control apparatus {open/closed}); however, the motor can take advantage of a self-locking property of the worm gear to operate in a fixed state. Thus, the motor cannot be pushed back or rotated by these valves due to air pressure. Additionally, the valves may be geared in various ways such that the valves are cycled from fully open to fully closed to produce the desired resonance effect in the nozzle.

This system can be powered by natural atmospheric wind/water currents through a stationary system (e.g., vehicle) and/or self-generated wind/water currents by a moving system. The disclosed architecture may be used for both stationary and mobile applications such as being mounted on vehicles and transports (e.g., trucks, buses, trains, ships, boats, etc.) and/or rigid structures (e.g., towers, masts, poles, buildings, etc.).

The disclosed architecture uses the primary and secondary nozzles and resonance of air pressure waves to produce a mechanical advantage that drives turbine/generators sets. This is analogous to the mechanical advantages produced by hydraulic rams, levers, block and tackle, and other machines.

The input shutter system may not need an aerodynamic housing to control, since other air speed controlling devices may be employed such as telescoping masts, closed resonance valves, and by furling (turning) the rotor toward the tail vane, for example.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a power generation system 100 in accordance with the disclosed architecture. The power generation system 100 comprises a primary nozzle section 102 and a secondary nozzle section 104. Generally, the primary nozzle section 102 is a convergent-divergent design where airflow entering the primary nozzle section 102 is controlled by structural design to converge, and airflow exiting the primary nozzle section 102 is controlled by structural design to diverge. Thus, by controlling airflow through the primary nozzle section 102, power can be efficiently generated, utilized, and/or stored. The secondary nozzles section 104 can be employed to generate a Venturi effect at the output airflow of the primary nozzle section 102.

The primary nozzle section 102 receives airflow via an input shutter (IS) 106, which can be controlled between a closed state and some degree of openness to enable airflow, or block airflow entirely. The primary nozzle section 102 comprises an input convergent-divergent (CD) nozzle stage (or portion) 108 so designed to converge the airflow received, and then enable divergent airflow from the input CD stage 108 to a flow control apparatus (FCA) 110. The input CD stage 108 receives the airflow and increases airflow velocity (decreases pressure) depending on the state (open/partially open) of the FCA 110. The FCA 110 is mechanically in-line (aligned) with the input shutter 106, as aligned according to an axis 112 (longitudinal) centered through the length of the primary nozzle section 102. A control system 114 is provided to control the FCA 110 and the input shutter 106 to enable airflow into the primary nozzle section 102 and to meter the airflow through subsequent stages via the FCA 110.

Immediately following the FCA 110 and in mechanical alignment along the axis 112, is a middle divergent-convergent (DC) nozzle stage 116 structurally designed to diverge airflow from the FCA 110, and then converge the airflow as the airflow exits the middle DC nozzle stage 116 for input to a power generation stage 118. The power generation stage 118 can be non-combustion devices (non-fuel burning) and comprises a set of mechanical power generation devices 120 (e.g., turbines). The mechanical power generation devices 120 can be rotary mechanical devices such as air turbines (airflow driven).

The power generation stage 118 is structurally designed as divergent to efficiently direct and control airflow through and according to increasing sizes of the multiple mechanical power generation devices 120. The mechanical power generation devices 120 are impacted by the airflow, which airflow imparts kinetic energy to cause rotation of the mechanical power generation devices 120, where rotary mechanical devices are employed. The mechanical power generation devices 120 are arranged in the divergent power generation stage 118 as increasingly larger rotary mechanical power generation devices. The airflow from the power generation stage 118 eventually exits to and through the secondary nozzle stage 124, as partially enclosed in a secondary nozzle housing (e.g., housing 206 of FIG. 2). Note that the secondary nozzle stage 124 is not a requirement, but optional.

The rotation of the rotary mechanical devices causes the generation of power to a power storage subsystem 122. The control system 114 interfaces to other components and subsystems (e.g., a data acquisition and sensor subsystem) to effect efficient operation of the power generation system 100.

The control system 114 of the disclosed power generation system 100 comprises a data acquisition system, which employs sensors that obtain (sense) and communicate measurements (data) from many areas (data points) to enable optimum control and power generation, and where moveable, at desired vehicle/transport speeds. The areas include, but are not limited to, an area ① that includes either or both sides of the input shutter 106 (e.g., input airflow velocity, mechanical displacement of IS components (e.g., as relates to open/close), speed of open/close, etc.), an area ② that includes measurements (e.g., FCA speed, airflow, FCA fluid flow, FCA throttling speed (as relates to degrees of open/close), etc.) associated with either or both sides (input/output) of the FCA 110, an area ③ that includes measurements associated with the middle DC nozzle stage 116 and the power generation stage 118, an area ④ that includes measurements associated with the secondary nozzle 124, an area ⑤ that includes measurements (e.g., power output, storage power/capacity/usage, etc.) associated with the power storage subsystem 122, and an area ⑥ for measurements associated with the control system 114. Other measurements can be obtained from the vehicle/transport system such as vehicle speed, vehicle batter power, etc., any or all of which can be presented via a user interface suitably located for user viewing and user interaction with content displayed via the user interface.

The power generation system 100 maximizes power generation based on fluid velocity, density, and resonance, for example. The velocity and density of the fluid (e.g., airflow), affect the amount of power produced (e.g., at any point in time, window of time, etc.), since these terms are functions of a power equation. The resonance is determined by the geometry of the fluid column (e.g., length of the column) and the wave motion and air column equations, where wave velocity equates to the product of wave length and frequency, for example.

The measurements of pressure (e.g., static/stagnation), temperature, humidity, fluid velocity, mass flow rate, and noise (e.g., sound/vibration), for example, can be obtained at all the sensor locations. Auxiliary sensors or extra sensors may also be used/located in various places, such as generator temperature sensors, strain gages on turbine blades, displacement sensors for shutter monitor and control, rotational data from servo motors and/or stepper motors, and other types of systems/sensors.

Different types of meteorological sensors can be utilized such as pressure transducers (e.g., Bourdon tubes, barometers, bellows and capsules, diaphragms, strain gage elements, capacitive elements, and piezoelectric crystal elements, etc.), temperature gauges (e.g., thermocouples, thermometers, thermistors, radiometers, pyrometers and other radiation detectors), fluid velocity sensors (e.g., Pitot-static tubes, thermal anemometer, laser Doppler anemometer, and particle image velocimetry, etc.), flow rate sensors (e.g., orifice meters, Venturi meters, flow nozzles, sonic nozzles, laminar flow meters, electromagnetic flow meters, vortex shedding meters, rotameters, turbine meters, transit time/Doppler ultrasonic flow meters, positive displacement meters, thermal flow meters, Coriolis flow meters, etc.), humidity gauges (e.g., psychrometers and other hygrometers), and other types of sensors suitable for data acquisition that results in operational efficiency and power generation optimization.

Figure 2:
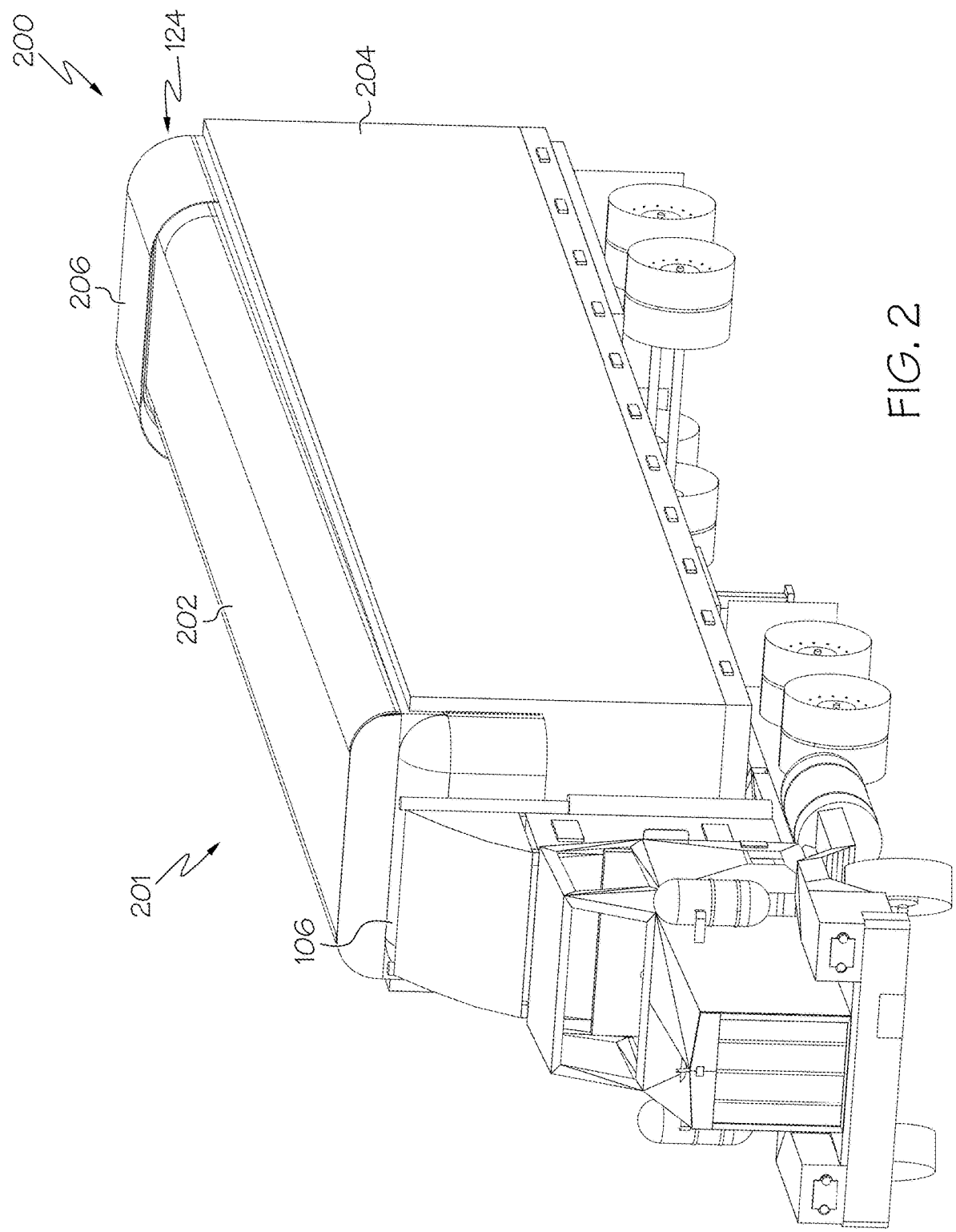
FIG. 2 illustrates a tractor-trailer system that employs the disclosed power generation system.

FIG. 2 illustrates a tractor-trailer system 200 that employs the disclosed power generation system 100. The power generation system 100 can be designed to be enclosed in an aerodynamic housing 201, which housing 201 comprises the input shutter 106, a primary nozzle housing 202 and optionally, the secondary nozzle housing 206 (over the secondary nozzle stage 124), all of which are mountable (removably) on the front/top of a trailer 204 of the tractor-trailer system 200.

The input shutter 106 can be controlled to partially open or entirely open for operation while traveling down the road, or close entirely when not in use. It is to be understood that, optionally, a secondary input shutter (not shown) can be employed in mechanical cooperation (e.g., some degree of opening and closing) with the secondary nozzle housing 206 to control tertiary air inflow via the secondary nozzle stage 124, and hence, the Venturi effects of the system.

Figure 3:
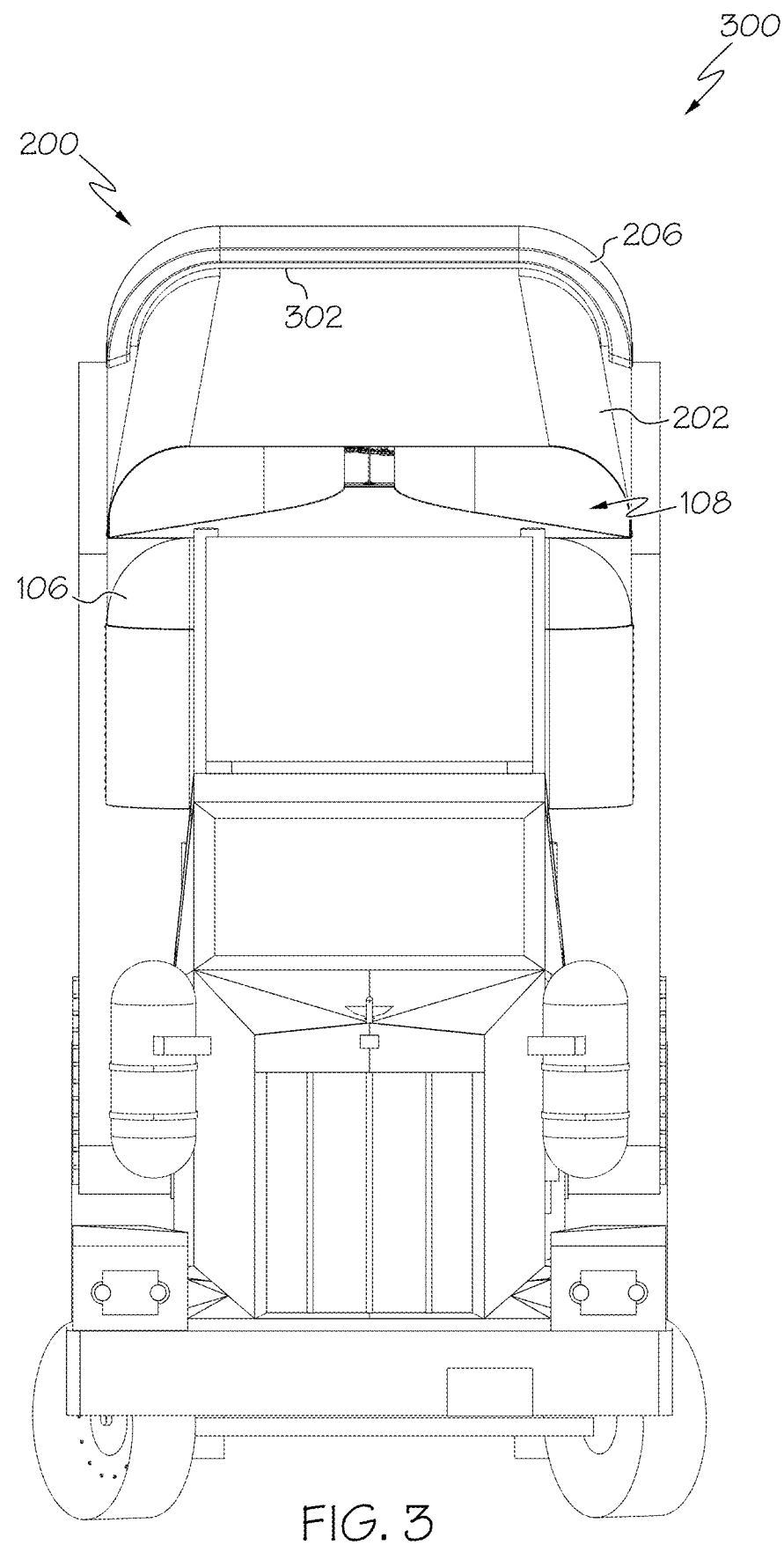
FIG. 3 illustrates an isometric frontal view of the aerodynamic housing system as deployed on the tractor-trailer system with the input shutter open.

FIG. 3 illustrates an isometric frontal view 300 of the aerodynamic housing 202 as deployed on the tractor-trailer system 200 with the input shutter 106 open (a down position). (The primary nozzle housing 202 is shown from an elevated view (instead of a direct frontal view) depicting the top outer surface 302 of the primary nozzle housing 202 extending to the secondary nozzle housing 206.) As shown, the input shutter 106 is in a down or open state to allow airflow to be received and forced into the input CD stage 108 of the power generation system 100. The frontal view 300 enables a view into the "throat" of the input CD stage 108 along the axis 112. Additionally, the frontal view 300 shows the secondary nozzle housing 206 and air intake clearance between the secondary nozzle housing 206 and the top surface 302 of the primary nozzle housing 202 to enable the Venturi effect.

Figure 4:
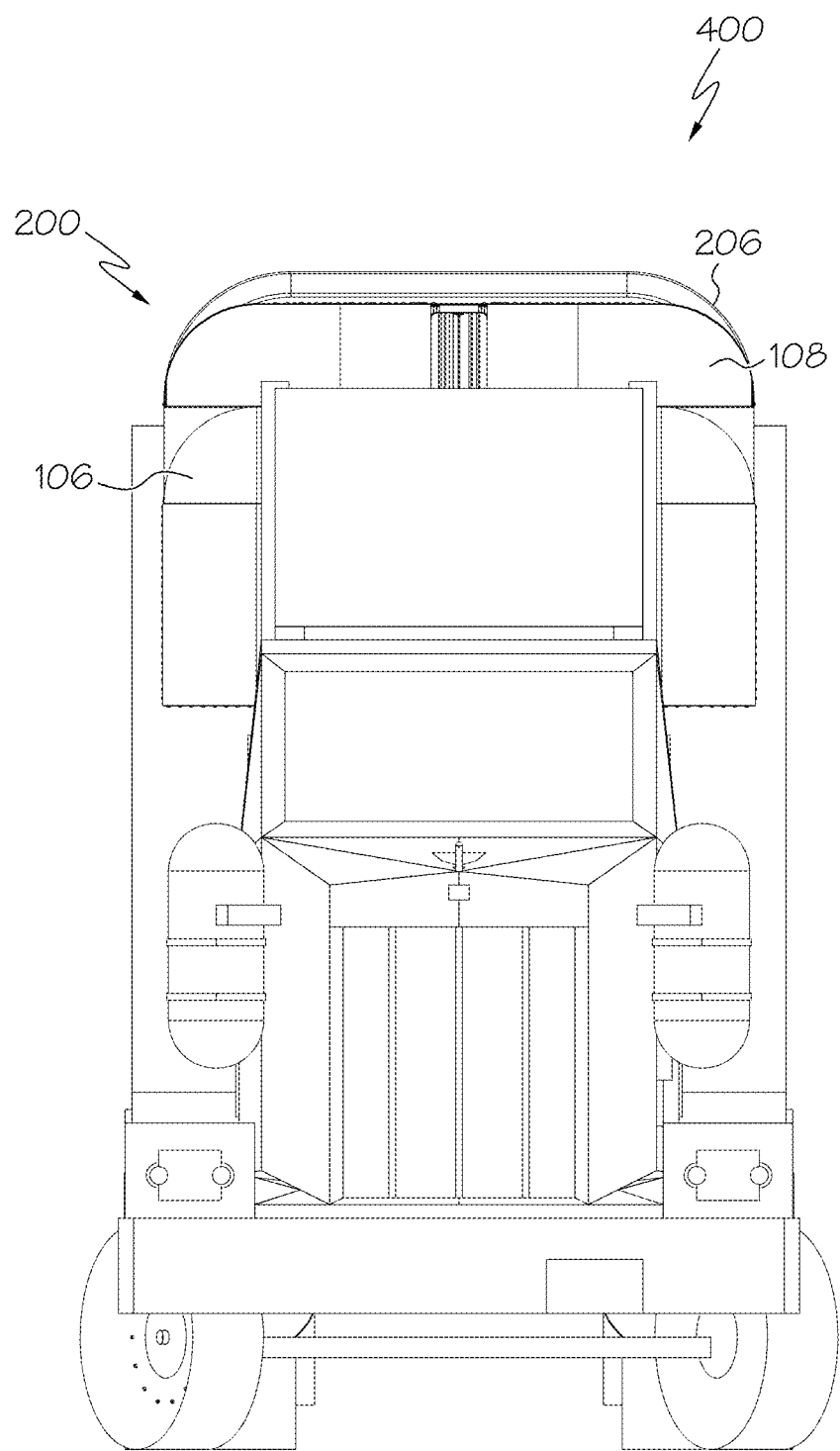
FIG. 4 illustrates a frontal view of the aerodynamic housing system as deployed on the tractor-trailer system with the input shutter fully opened.

FIG. 4 illustrates a frontal view 400 of the aerodynamic primary nozzle housing 202 as deployed on the tractor-trailer system 200 with the input shutter 106 fully opened. As shown, the input shutter 106 is in a fully open state to allow airflow to be received and forced into the input CD stage 108 of the power generation system 100 as the tractor-trailer system 200 moves down the highway.

Figure 5:
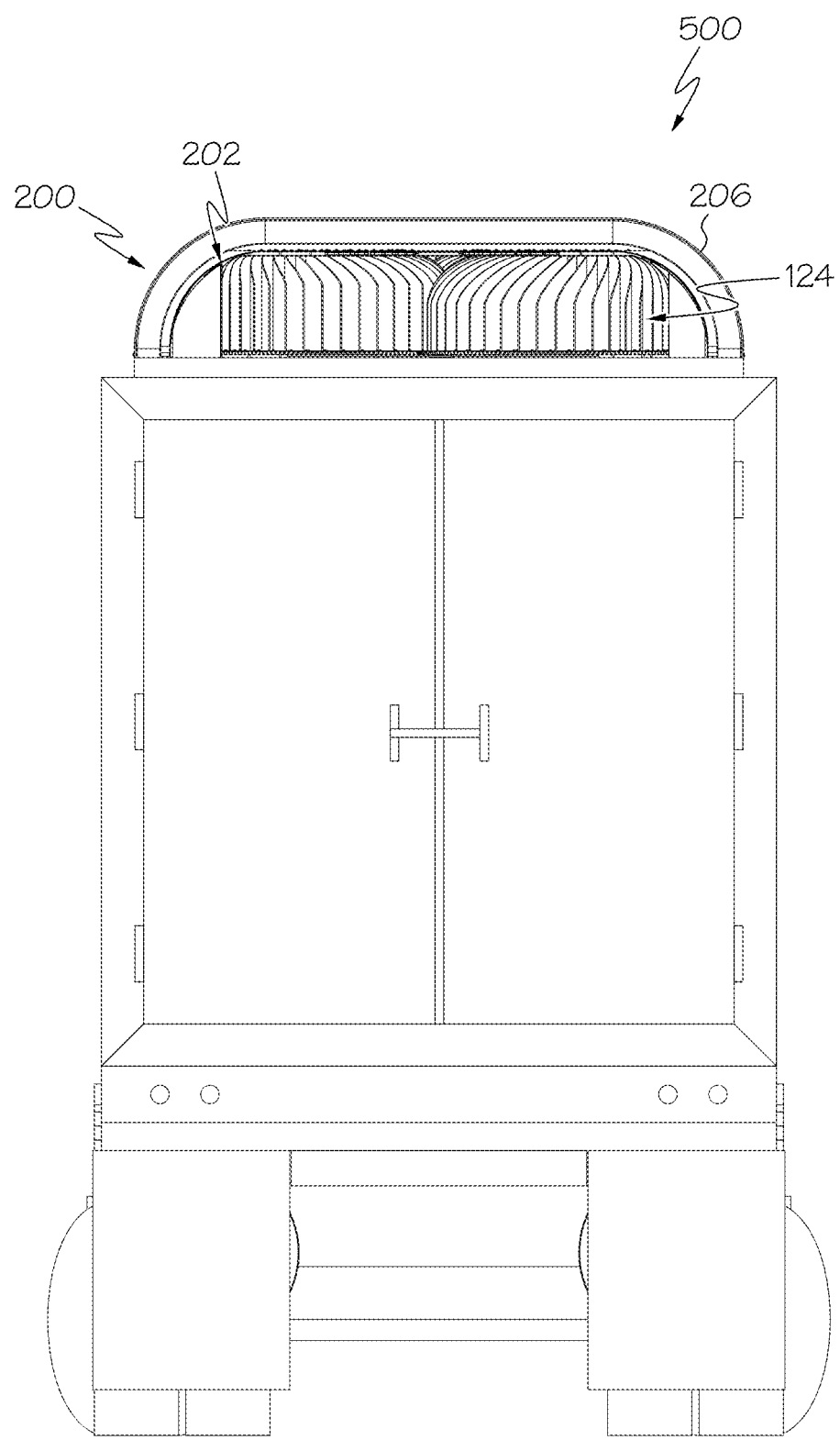
FIG. 5 illustrates a rear view of the power generation system as deployed and viewed in the aerodynamic housing system on the tractor-trailer system.

FIG. 5 illustrates a rear view 500 of the power generation system 100 as enclosed in the aerodynamic primary nozzle housing 202 and deployed on the tractor-trailer system 200. As shown, the secondary nozzle stage 124 is exposed to enable air to exit the power generation system 100, as enclosed in the aerodynamic primary nozzle housing 202 and secondary nozzle housing 206. Optionally, it is within contemplation of the disclosed architecture that a rear cover (not shown) may be employed to be controlled (e.g., elevated up and down to close and open, respectively) to correspondingly close the rear access to the secondary nozzle stage 124 to prevent dust and debris from entering, or open the rear access to the secondary nozzle stage 124.

Figure 6:
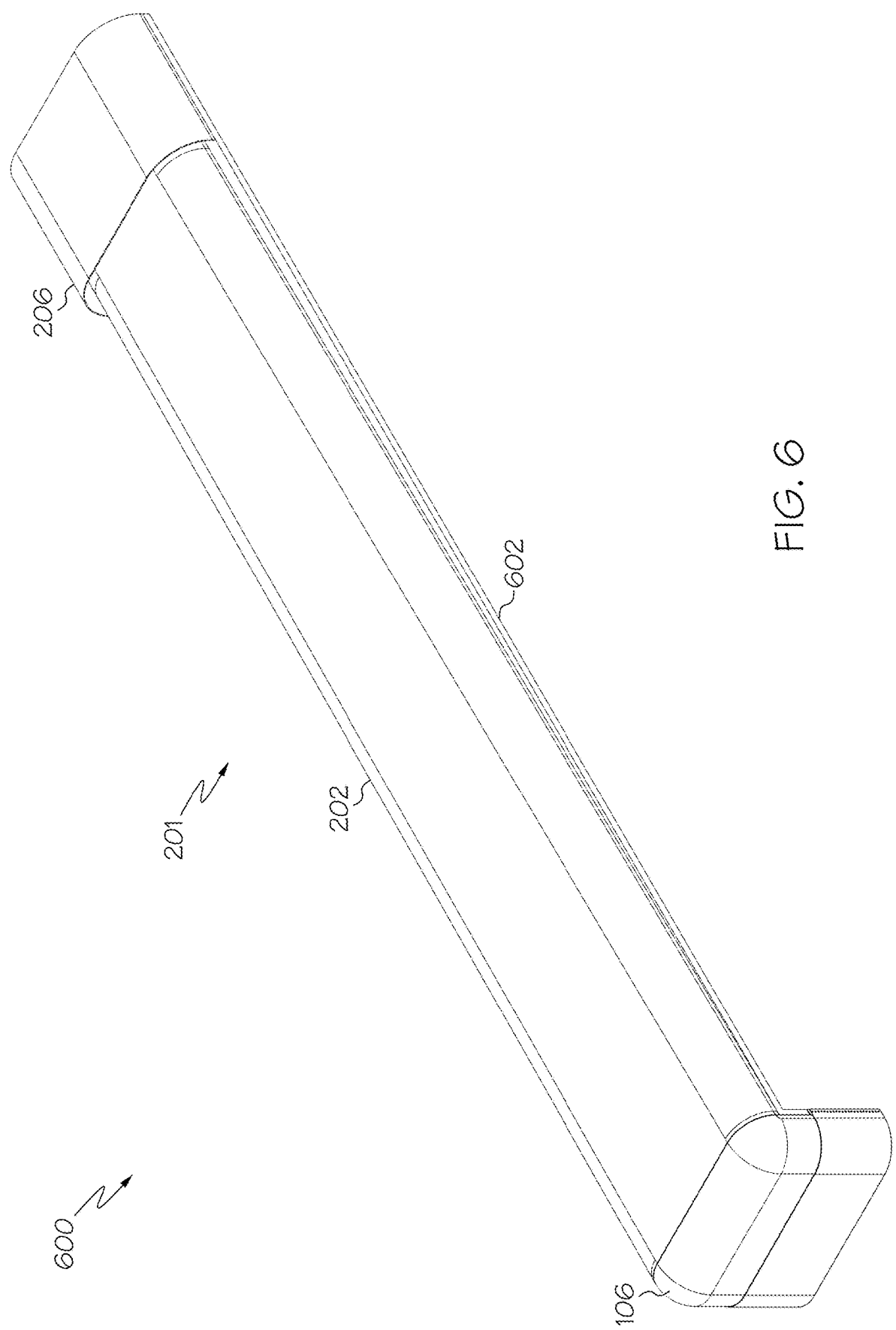
FIG. 6 illustrates an isometric view of the aerodynamic housing system that encloses the power generation system.

FIG. 6 illustrates an isometric view 600 of the aerodynamic primary nozzle housing 202 and secondary nozzle housing 206 of the aerodynamic housing 201, which encloses the power generation system 100. As shown, the input shutter 106 is in a closed (up) state. The housings (primary nozzle housing 202 and secondary nozzle housing 206) enclose the internal components and subsystems (e.g., mechanical and computing) for protection from weather conditions (e.g., rain, snow, high winds), dust, and debris that may accompany travel in any environment. The secondary nozzle housing 206 is also aerodynamically designed to provide protection of the opening of the exhaust portion and to assist in drawing of the air from (the Venturi effect) and through the enclosed power generation system 100.

The aerodynamic housing 201 can also comprise a base 602 that secures (e.g., bolts) to the top of the trailer. The base 602 can be designed to, additionally, accommodate (structurally fasten, affix) all internal components of the power generation system 100, such as some portions or all of the power storage system 122, some parts or all of the control system 114, the input CD stage 108 and associated structural and hardware components, the middle DC nozzle stage 116 and associated structural and hardware components, the mechanical power generation devices 120 and associated structural and hardware components of the power generation stage 118, and the secondary nozzle 124 and associated structural and hardware components, communications cables, power cables, sensor cables, and so on.

In other words, with the base 602, the power generation system 100 can be assembled as a unit and then hoisted onto the top of the vehicle (e.g., trailer) for securing. Alternatively, the power generation system 100 can be mounted to the vehicle and assembled in sections, as desired. The base 602 can have a flat planar surface that mounts on top of and substantially parallel to the top of the vehicle or trailer on which it is deployed. The base 602 can be constructed of a material (e.g., aluminum) that is lightweight, yet sufficiently strong and sturdy to support all mounted hardware and systems, as well as to retain alignment of the supported hardware and systems for optimum power generation during travel on the road.

Figure 7:
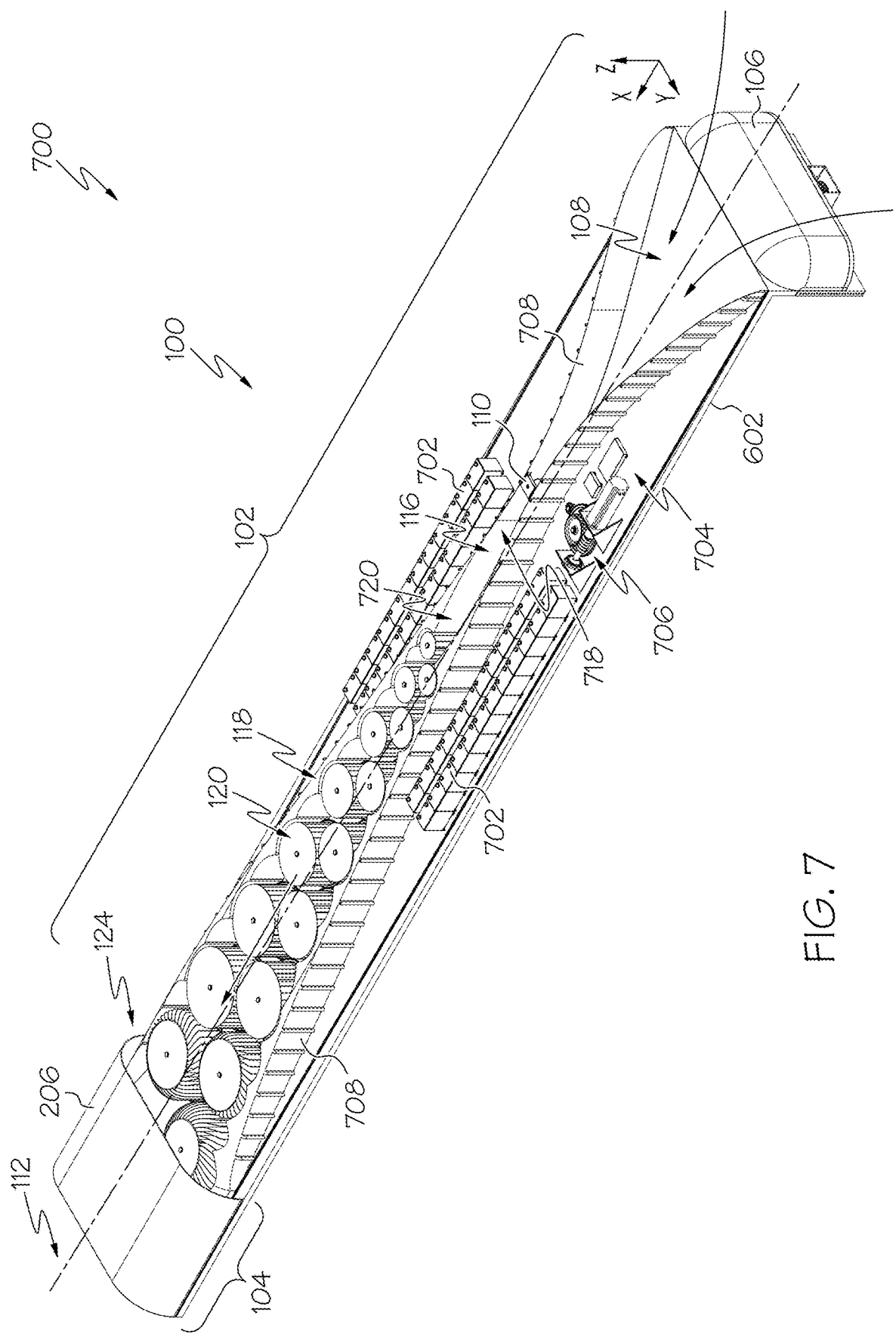
FIG. 7 illustrates an isometric view of the enclosed power generation system with the primary housing partially assembled to expose inner design, components, and subsystems.

FIG. 7 illustrates an isometric view 700 of the enclosed power generation system 100 with the primary nozzle housing 202 removed to expose inner design, components, and subsystems. In this particular design, the input shutter 106 is open or partially open (moved downward to a position that enables input airflow (or fluid flow)). Airflow is funneled into the input CD stage 108, as indicated by the two arrows. Airflow is metered from the input CD stage 108 and into the middle DC nozzle stage 116 by the flow control apparatus 110 at predetermined pressures/flows to ensure adequate flow to operate the mechanical power generation devices 120. The mechanical power generation devices 120 (e.g., non-combustion) are shown as arranged in the divergent portion of the power generation stage 118. Airflow is directed in and around the mechanical power generation devices 120 through and out the secondary nozzle stage 124.

Power generated by the mechanical power generation devices 120 is stored in battery banks 702 (similar to the power storage subsystem 122 of FIG. 1). The control system 704 (similar to the control system 114 of FIG. 1), provides metering control of the flow control apparatus 110 as well as other control and data acquisition functions for the power generation system 100. A flow control drive system 706 provides the mechanical interface and control to adjust the flow control apparatus 110 (in one implementation, similar to a butterfly valve) under control of the control system 704.

The primary nozzle section 102 is comprised of bounding walls that define the convergent-divergent nature (ducting) of the primary nozzle section 102. The bounding walls interface with the inside top of the outer cover of the primary nozzle housing 202 to enable a substantially airtight seal that prevents loss of air (or other fluid types) other than through the primary nozzle section 102. For example, the input CD stage 108, middle DC nozzle stage 116, and power generation stage 118 are bounded by opposing walls or barriers 708 designed to assist in achieving the desired fluid flow dynamics, effects, and parameters.

As previously indicated, in the convergent portion of the input CD stage 108, the airflow increases in speed and decreases in pressure while flow is occurring (when the flow control apparatus 110 is sufficiently open). However, if the flow is blocked (flow control apparatus 110 is closed) the pressure increases, since the inertia/momentum of the moving air is stopped against (or blocked by) the flow control apparatus 110 in the input CD stage 108 side. In essence, the kinetic energy of the moving air is converted into potential energy in the form of increased air pressure. This effect is also referred to as ram tuning, especially when the flow control apparatus 110 is cycled (throttled) in a manner to produce a harmonic resonance air pressure wave through the input CD stage 108.

When the air flows past the flow control apparatus 110 at a higher pressure than the outside environment, the air travels through the divergent portion 718 of the middle DC nozzle stage 116, which allows the air column to enter the space of the divergent portion 718, and then into the convergent portion 720 of the middle DC nozzle stage 116 in which to flow before reaching the power generation stage 118. The middle DC nozzle stage 116 enables the air to gain momentum again after being slowed down or impeded (e.g., stopped) at the flow control apparatus 110.

The secondary nozzle housing 206 encloses the secondary nozzle stage 124, which also operates as the fluid ejector. The fluid ejector takes outside airflow and increases velocity of the air by decreasing the pressure of the air at the output. This jet of air flows over the exhaust received from the previous stages (e.g., the input CD stage 108 and middle DC nozzle stage 116) and produces a low pressure region at this point to create a Venturi effect. While this low pressure region has been developed over the exhaust of the input CD stage 108, the jet of air also imparts momentum to the slower exhaust air of the input CD stage 108. All this combined/ mixed air is allowed to expand out of the exhaust (divergent) power generation stage 118 (also referred to as a diffuser). This fluid flow increases pressure and decreases velocity through the diffuser such that the exhaust pressure of the aerodynamic primary nozzle housing 202 is greater than surrounding environment pressure. Note that not all of the turbines (e.g., mechanical power generation devices 120) are required as shown; a fewer number can be employed for a shorter vehicle (e.g., recreational vehicle, boat, motorhomes, etc.), for example.

All assemblies and subsystems of the power generation system 100 can be mounted in a weight balanced relationship on the base 602 and symmetrical about the longitudinal axis 112. For example, in this implementation, the battery banks 702 are assembled as two banks mounted symmetrically on opposite sides of the axis 112. Similarly, the power generation devices 120 are mounted on the base 602 and arranged for efficient and optimum performance relative to the fluid flow, and generally centered on the axis 112. Still further, the barriers 708 are contoured and mounted to the base 602 in a generally symmetrical manner to the axis 112.

The FCA 110 mounts to the base 602 and the barriers 708 at a "choke point" where the barriers 708 converge to the closest point. The control system 704 mounts to the base 602 and in close proximity to the FCA 110 to enable efficient throttling of the FCA 110 for control of the airflow from the input CD stage 108 to the middle DC stage 116.

The base 602 is considered to be in the x-y plane, which is parallel to the top surface of the trailer. The power generation devices 120 are mounted to the base 602 inside the barriers 708 to receive the imparted kinetic energy from the throttled (metered) airflow.

Each of the power generation devices 120 is mounted as fixed on a vertical shaft (in the z-axis) such that rotation occurs in the x-y plane in either a clockwise or counterclockwise rotation. The rotation is enabled by the airflow (fluid flow) tangentially impacting the rotary devices. Thus, since the power generation devices 120 are all mechanically coupled together, the power generation devices 120 rotate in unison, but some or all rotate at different rotational speeds based on the diameters of the rotational devices (e.g., turbines).

All stages are mechanically coupled in-line (via the barriers 708) to ensure that any possible loss of airflow is minimized from the input CD stage 108, through the FCA 110, the middle DC stage 116, and the power generation stage 118. In support thereof, each of the barriers 708 can be manufactured as a single contiguous structure with the desired contours on the inner surface to enable the desired airflow characteristics for optimum power generation from the power generation devices 120.

Figure 8:
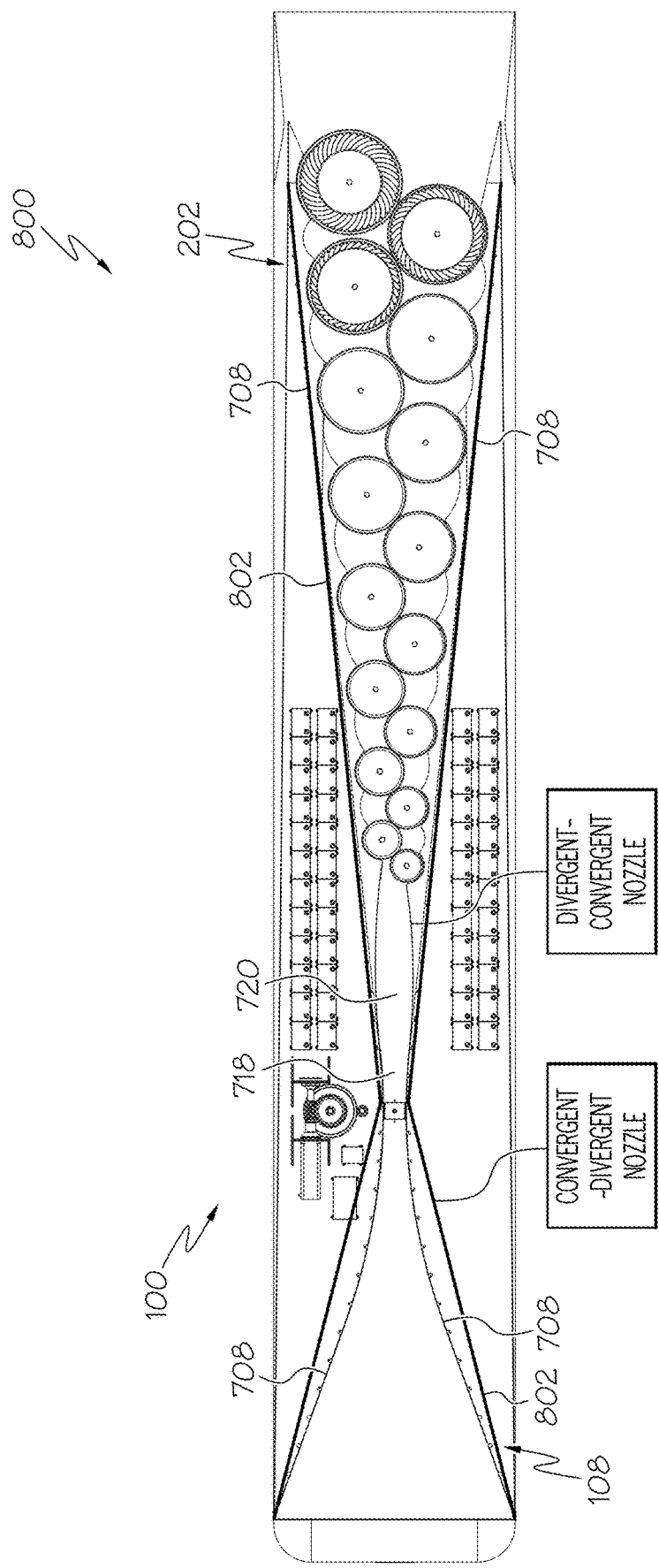
FIG. 8 illustrates a view of the aerodynamic housing system that encloses the power generation system.

FIG. 8 illustrates a top-down view 800 of the primary nozzle section 102 of the power generation system 100. The view 800 more clearly depicts the convergent-divergent characteristics of the input CD stage 108, and the divergent-convergent characteristics of the middle DC nozzle stage 116. The general outline of the primary nozzle section 102 is represented by straight lines 802. The more precise representation is according to barriers 708, which on the divergent side of the FCA 110 coincide substantially with the lines 802.

Figure 9:
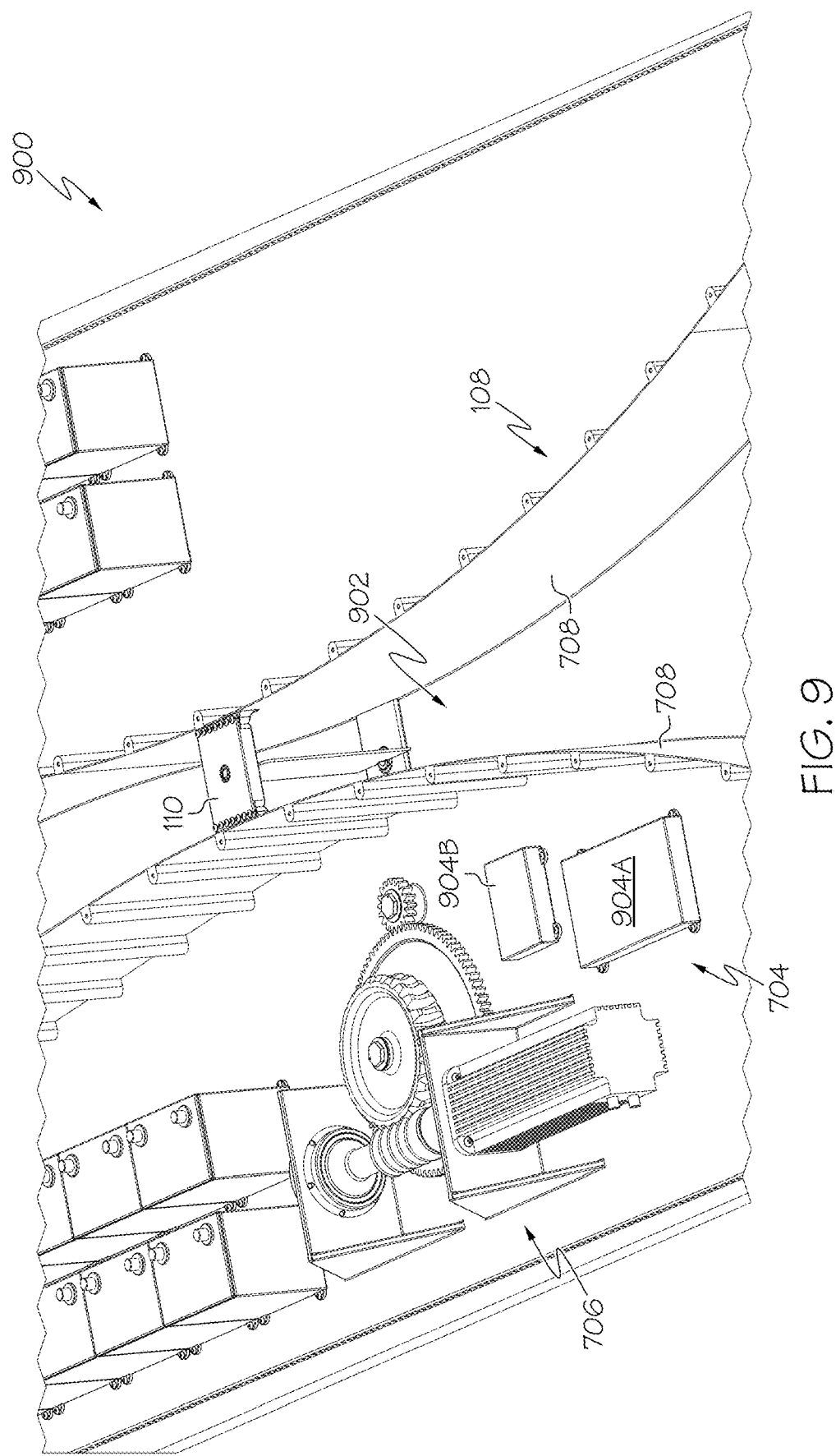
FIG. 9 illustrates a close-up isometric view of a divergent portion of the input CD stage, flow control apparatus, control system, and flow control drive system.

FIG. 9 illustrates a close-up isometric view 900 of a convergent portion 902 of the input CD stage 108, flow control apparatus 110, control system 704 (similar to the control system 114 of FIG. 1), and flow control drive system 706. The control system 704 (similar to control system 114 of FIG. 1) can comprise a control component 904A and data acquisition component 904B that interfaces to sensors and controls for mechanical/electrical devices, for example. The control system 704 also enables the driver of the vehicle to remotely interact/initiate commands-read/write data with the control system 704 to activate/read all aspects and features of the power generation system 100 while stationary or moving down the road.

Figure 10:
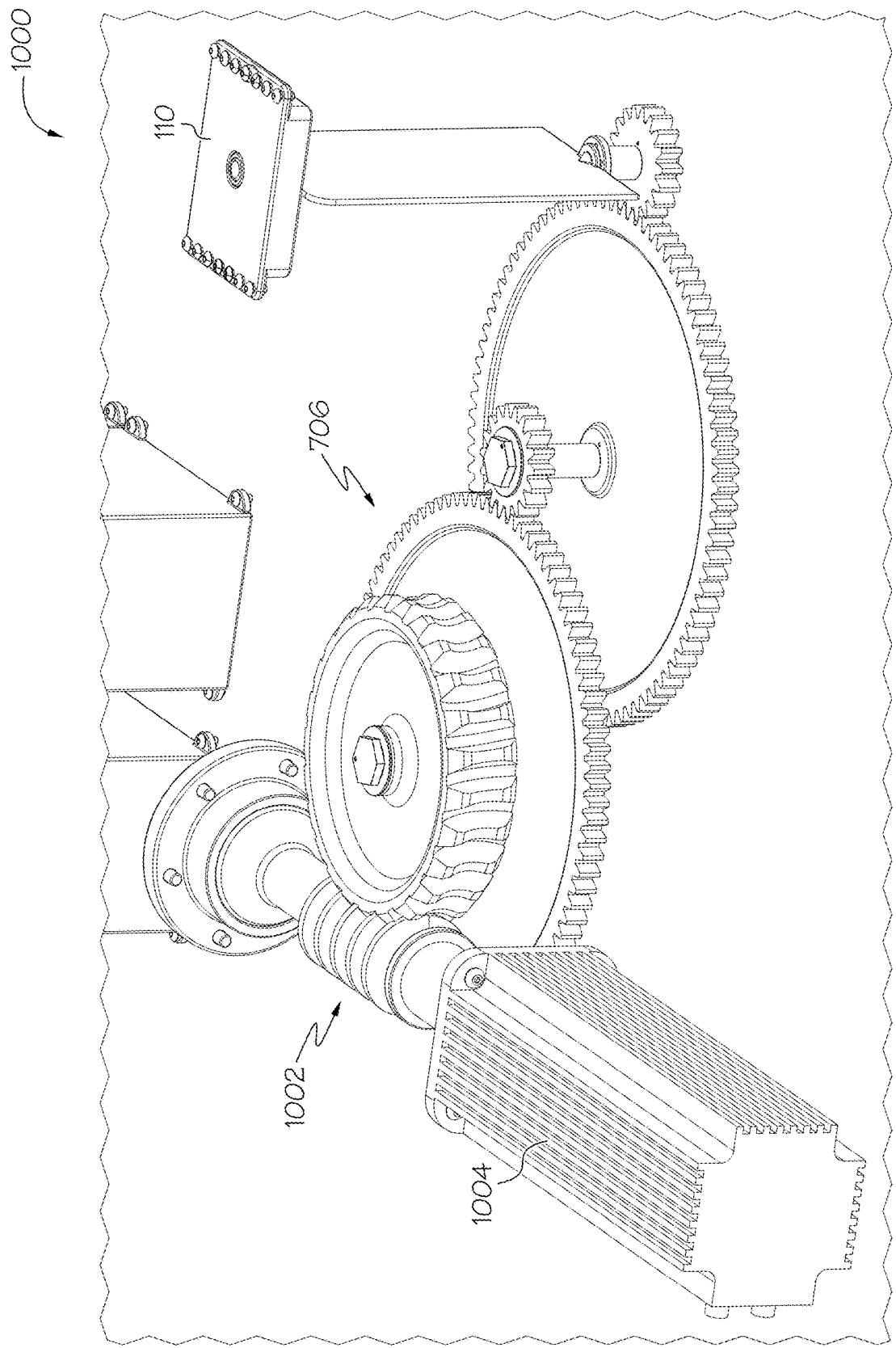
FIG. 10 illustrates a close-up isometric view of the flow control drive system of the flow control apparatus.

FIG. 10 illustrates a close-up isometric view 1000 of the flow control drive system 706 of the flow control apparatus 110. This also shows a worm gear 1002 that facilitates control and throttling of the FCA 110, as desired. The flow control drive system 706 includes an FCA drive motor 1004 that rotates the worm gear 1002 (bi-directional) to effectively throttle the FCA 110 as needed to obtain optimum fluid/nozzle characteristics for power generation. The FCA drive motor 1004 can be a digitally-controlled servo motor controlled to rapidly throttle the FCA 110 via the worm gear 1002 to adapt airflow to maintain resonance in the power generation system 100.

Figure 11:
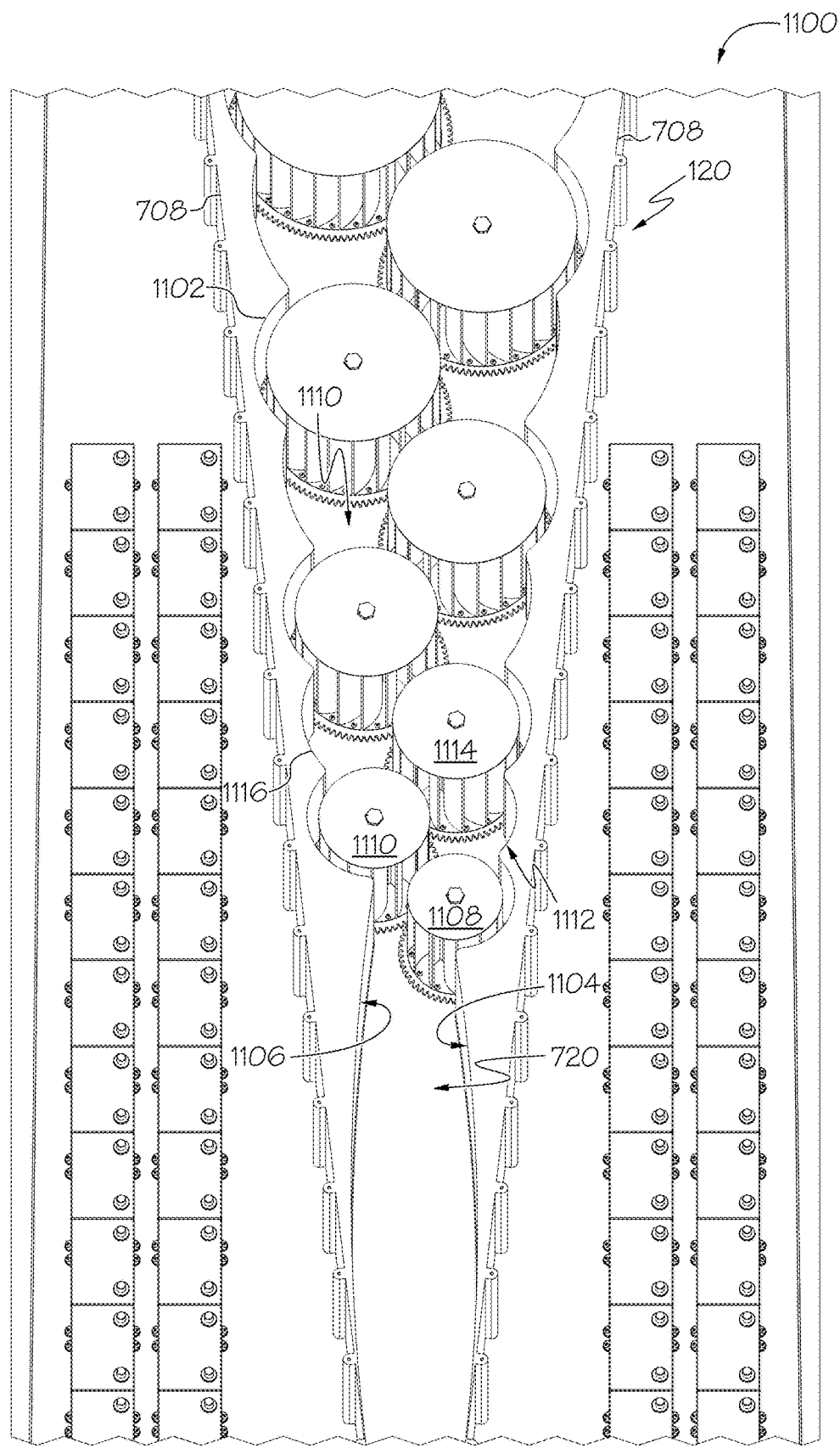
FIG. 11 illustrates a predominantly top-down isometric view of the mechanical power generation devices.

FIG. 11 illustrates a predominantly top-down isometric view 1100 of the mechanical power generation devices 120.

The power generation stage 118 contains all the air turbines oriented to create Curtis stages, barrier contours to create Curtis stage reversing buckets, and the Rateau expansion nozzle/chamber stages. The Rateau stage nozzle blocks are defined as the spaces between adjacent turbines and the open area by a Curtis stage reversing bucket is a Rateau stage expansion chamber. The Curtis stage reversing buckets are defined by specific contours in the inside walls of the barriers 708. A Curtis stage comprises two turbines (the moving or rotating portion of the Curtis stage) and the Curtis stage reversing bucket (the stationary part of the Curtis stage).

In operation, the power generation devices 120 are oriented in a staggered fashion and in combination with inside wall contours 1102 of the barriers 708 to implement Curtis and Rateau stages for a "sinusoidal" path of the airflow through the power generation stage 118. Airflow is received from the convergent portion 720 of the middle DC nozzle stage 116. The first Rateau stage is where airflow is converged and directed, using the inside wall contours (e.g., 1104 and 1106) of the barriers 708, to the first two turbines (1108 and 1110). Ultimately, airflow is directed through the Curtis stages of the power generation stage 118 according to turbine pairs and Curtis stage reversing buckets along the barriers 708 and the length of the power generation stage 118.

It is to be understood that where the outer mechanical dimension of a turbine is proximate to an inside wall contour, the clearance between the contour wall and the mechanical dimension of the turbine is suitably designed to be small to minimize any airflow leakage between the turbine dimension and the contour wall.

More specifically, the right inside contour 1104 of the Rateau stage directs converging airflow to blades of the turbine 1108 and the left inside contour 1106 of the Rateau stage directs converging airflow to blades of the turbine 1110, thereby imparting airflow velocity to the turbines 1108 and 1110. Thus, turbine rotation is clockwise for the turbine 1108 and counterclockwise for the turbine 1110. Ultimately, airflow is between the turbines 1108 and 1110, and on to the associated reversing bucket 1112 for this first Curtis stage. The reversing bucket 1112 redirects the airflow to the rotating and stationary portions of the second Curtis stage of turbines 1110 and 1114, and second reversing bucket 1116.

After the air passes between the turbines 1108 and 1110, the partially expanded air is re-directed by the stationary reversing bucket 1112. This re-directed air enters the second Rateau stage and expands into the second Curtis stage of turbines 1110 and 1114, and associated second reversing bucket 1116.

This process repeats for a plurality of device stages before the air exits the divergent portion of the primary nozzle section 102. The Curtis and Rateau stages provide a series of velocity and pressure staging which limit the rotational speed of the turbines relative to (e.g., half) the incoming air velocity.

Figure 12:
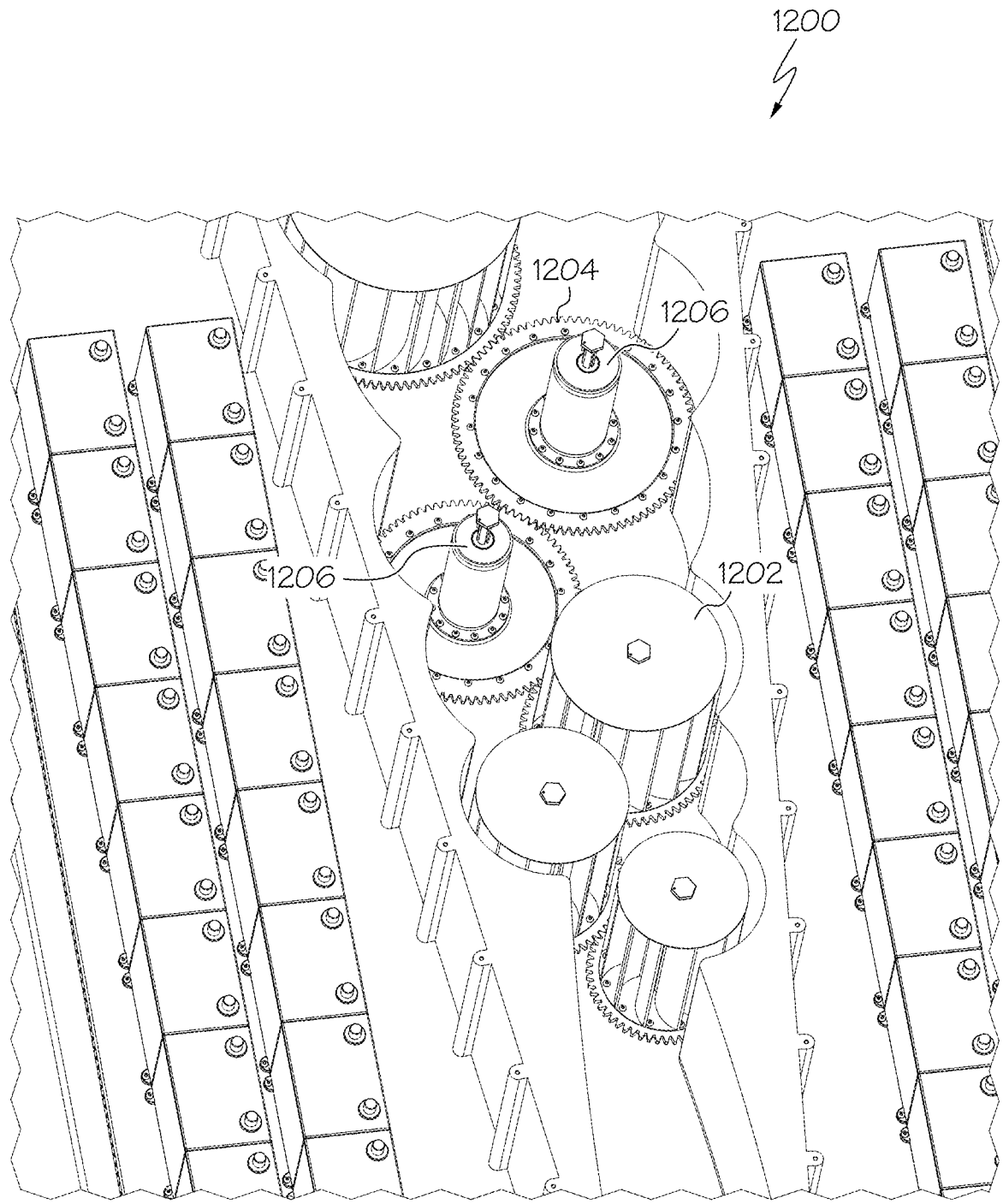
FIG. 12 illustrates a close-up isometric view of a rotary mechanical device and flywheel gear.

FIG. 12 illustrates a close-up isometric view 1200 of a rotary mechanical device 1202 and flywheel gear 1204. The flywheel gear 1204 acts as an inertia wheel to mitigate rotational perturbations or other fluctuations during operation. In this depiction, two turbines are removed to expose two corresponding alternating current (AC) generators 1206, and from which power is generated. Banks of storage batteries, for storing and outputting generated power, are shown on both sides of the turbines.

Figure 13:
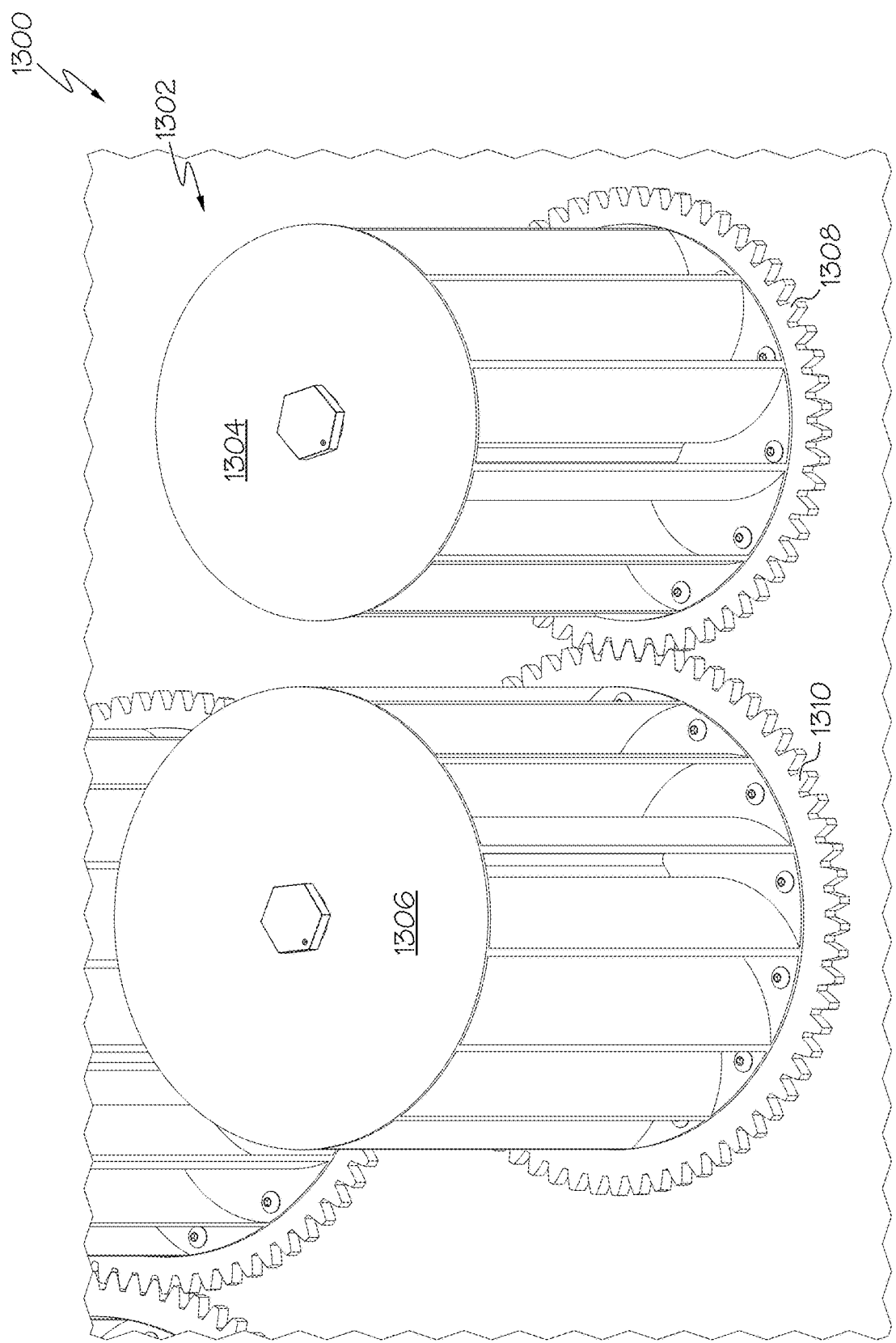
FIG. 13 illustrates an isometric view of two different rotary mechanical devices.

FIG. 13 illustrates an isometric view 1300 of two different rotary mechanical devices 1302. A smaller device 1304 is geared in cooperation with a larger second device 1306. The devices (1304 and 1306) have corresponding flywheel gears (1308 and 1310) engaged to rotate in opposite directions. Note that the turbines of these devices (1304 and 1306) are counter rotating as indicated by the orientation of the turbine blades and the flywheel gear coupling.

Figure 14:
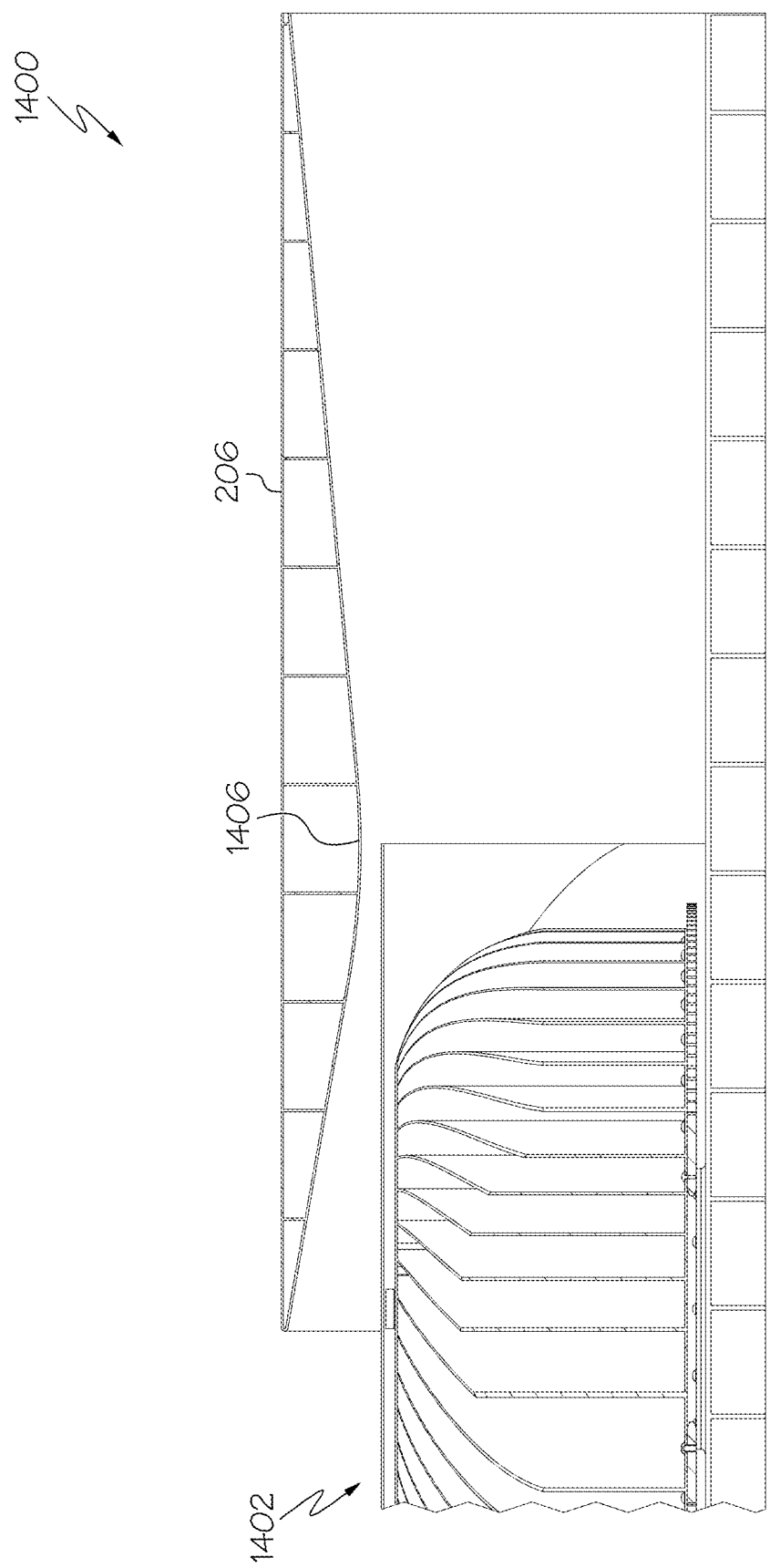
FIG. 14 illustrates a side view of a portion of the secondary nozzle stage.

FIG. 14 illustrates a side view 1400 of the secondary nozzle housing 206 over the secondary nozzle stage 124. Here, a wind turbine 1402 is shown and employed as the rotary mechanical device for power generation. Note also that the secondary nozzle housing 206 can be constructed with an internally enlarged portion 1406 that functions to constrict and thereby enhance air flow past the turbine 1402 and facilitate the Venturi effect at the output (on the right inside of the housing 206).

Figure 15:
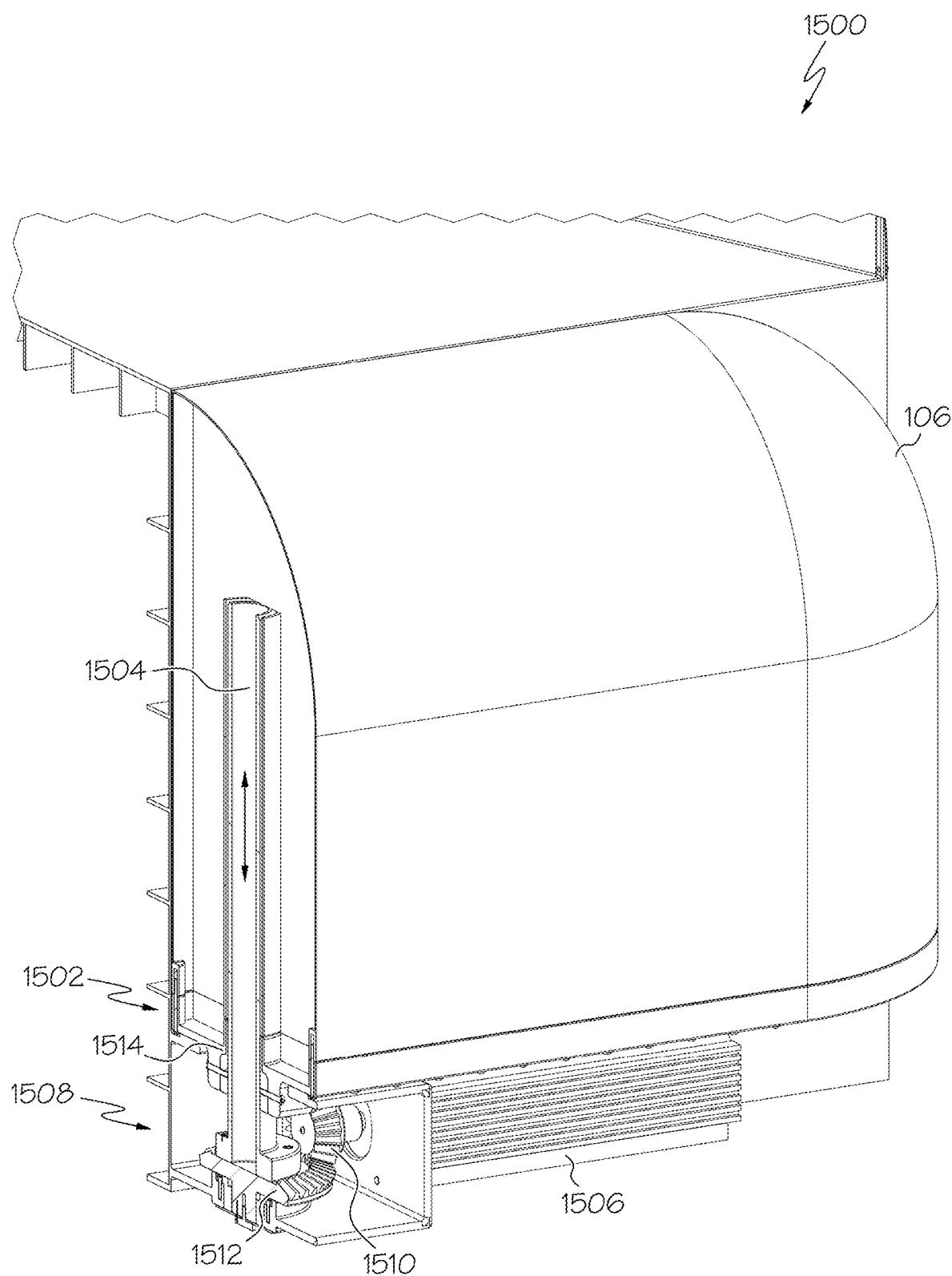
FIG. 15 illustrates an exposed isometric view of the input shutter and associated mechanical control components.

FIG. 15 illustrates an exposed isometric view 1500 of the input shutter 106 and associated mechanical control components 1502. The input shutter 106 is raised/lowered vertically along a threaded guide 1504. An input shutter drive motor 1506 operates under control of the control system 114 to drive a gear set 1508 (shown as a cutaway) that turns the threaded guide 1504 to move the input shutter 106 upward and downward, as desired. The shutter drive motor 1506 comprises a shaft to which a bevel gear 1510 is affixed. The bevel gear 1510 is mechanically aligned and in rotating mechanical communication with a beveled guide gear 1512 to rotate the threaded guide 1504 to drive the shutter 106 upward and downward via a threaded guide bracket 1514 affixed to the shutter 106. The shutter 106 is aerodynamically designed to efficiently move air over and around the primary nozzle housing 202 when fully closed and while traveling.

Figure 16:
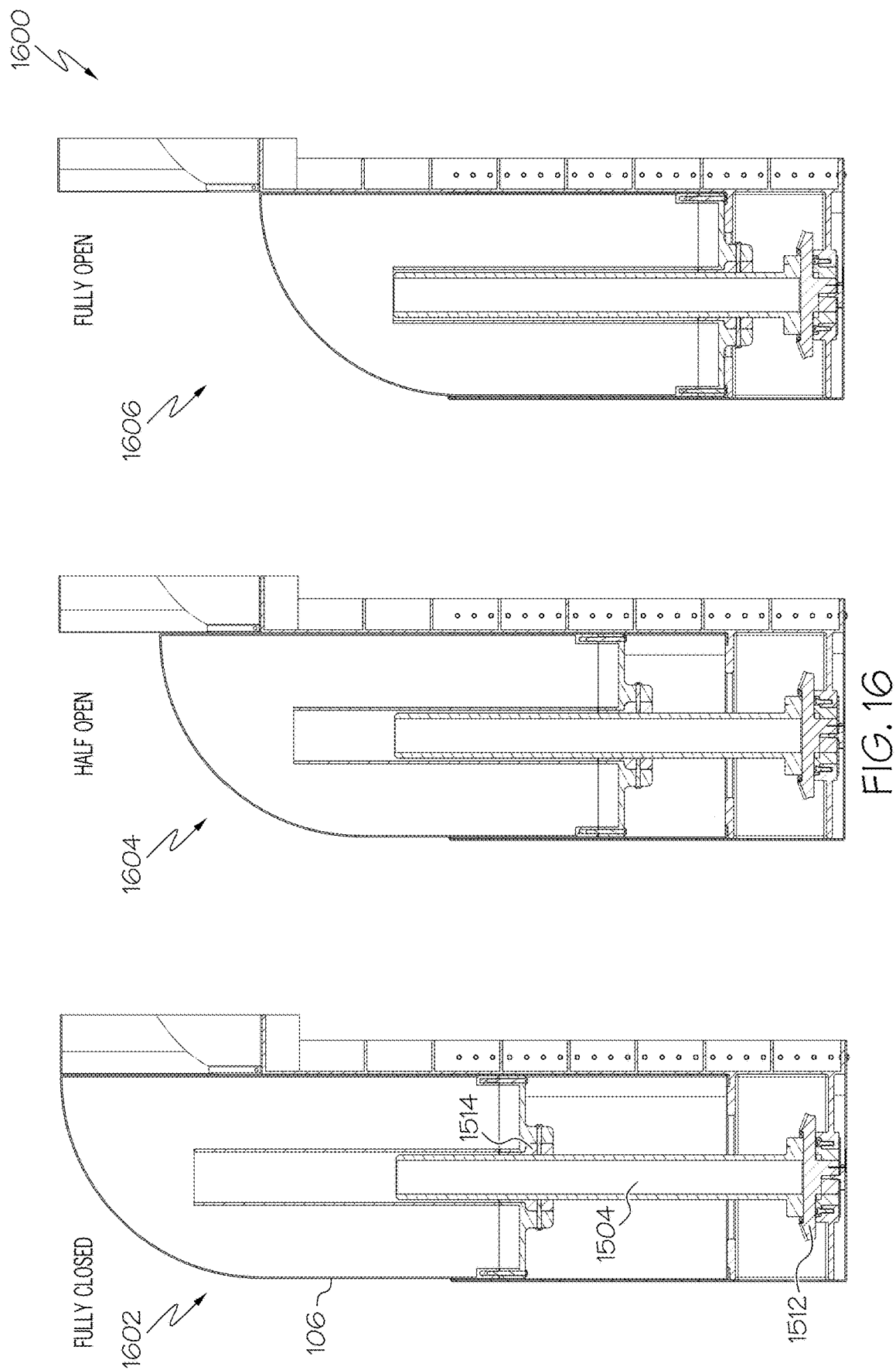
FIG. 16 illustrates a side view of the input shutter in various states.

FIG. 16 illustrates a side view 1600 of the input shutter 106 in various states. In a first state 1602, the shutter 106 is shown in a fully closed position, thereby preventing any airflow into the power generation system. The fully closed position has the shutter 106 driven to the farthest upward position. The threaded guide bracket 1514 is affixed to the shuttle 106 and is in threaded communication with the threaded guide 1504. The guide 1504 is affixed to the beveled guide gear 1512 of the gear set 1508. In a second state 1604, the shutter 106 is depicted in an approximately half-open position. In this second state 1604, the input shutter drive motor 1506 is controlled by the control system 114 to drive the gear 1512 in the correct direction to lower the shutter 106 downward. In a third state 1606, the shutter 106 is depicted in a fully-open position. Here, the input shutter drive motor 1506 is controlled by the control system 114 to drive the gear 1512 in the correct direction to lower the shutter 106 to the lowermost position. It is to be understood that the input shutter 106 can be raised and lowered to essentially any controlled position, not just the three positions of open, closed, and midway. Moreover, the shutter 106 can be raised and lowered slowly or quickly according to any programmed speed to the desire positions and in accordance with the desired fluid input flow.

Figure 17:
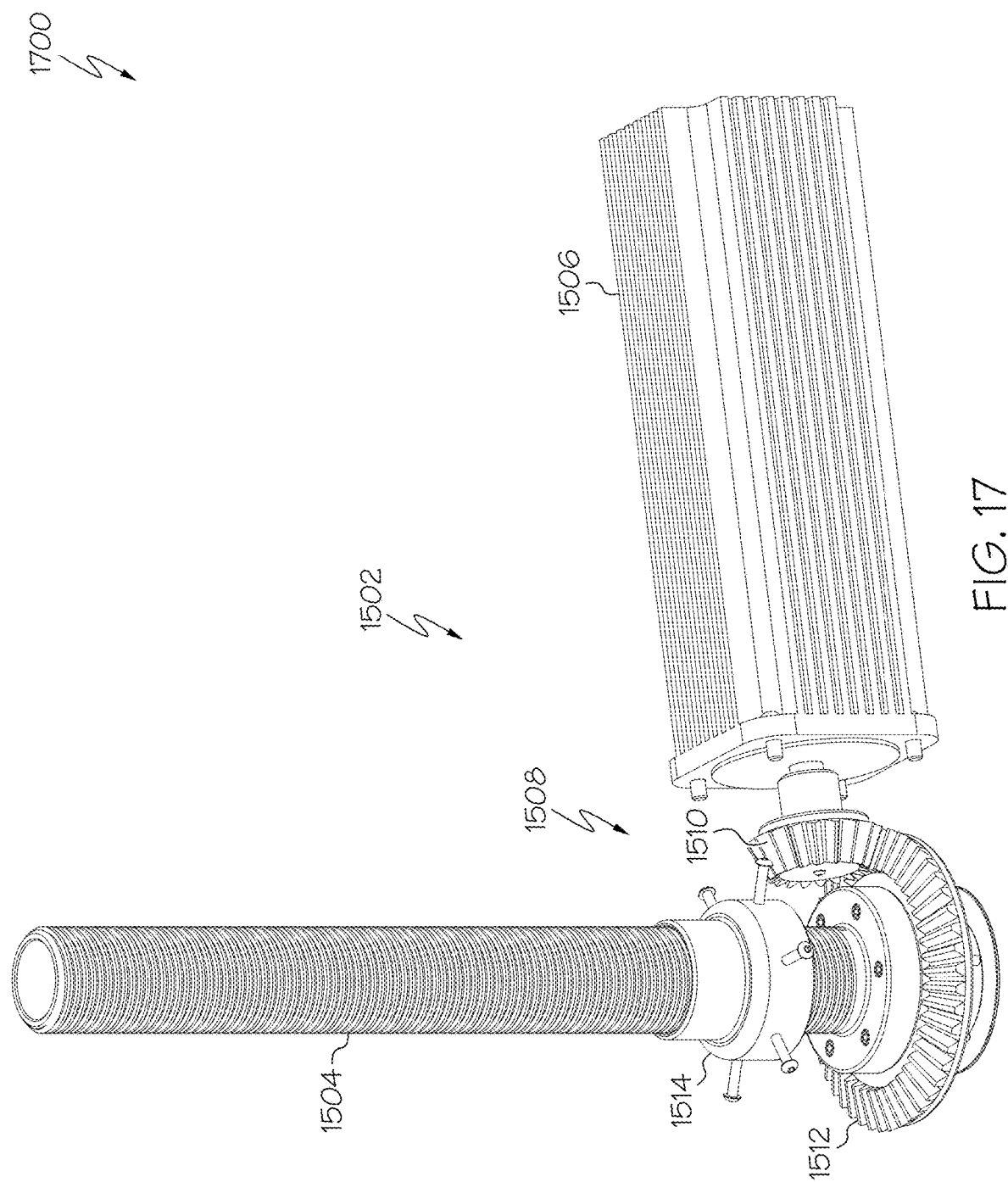
FIG. 17 illustrates an isometric view of the mechanical control components of the shutter.

FIG. 17 illustrates an isometric view 1700 of the mechanical control components 1502 of the shutter 106. The control components 1502 comprise the shutter drive motor 1506 that is controlled by the control system 114 to turn the threaded guide 1504 to raise or lower the shutter 106. The input shutter drive motor 1506 connects to the bevel gear 1510 of the gear set 1508. The bevel gear 1510 mechanically interfaces to the beveled guide gear 1512 to rotate the threaded guide 1504. The threaded guide bracket 1514, as affixed to the shutter 106, is driven upward and downward in response to rotation of the threaded guide 1504.

Put another way, there is provided a power generation system 100, comprising: an aerodynamic housing 201; and a primary nozzle section 102 mounted in the aerodynamic housing 201, the primary nozzle section 102 comprising: an input nozzle stage 108 constructed to receive airflow and increase velocity of the airflow; an input flow control apparatus 110 in-line with the input nozzle stage 108 to receive the airflow, and controlled (by the control system 114) to meter the airflow; a middle nozzle stage 116 in mechanical alignment with the input flow control apparatus 110 (and the input nozzle stage 108 and/or the input shutter 106) to receive and accelerate the metered airflow; and a non-combustion power generation stage 118 in mechanical alignment with the middle nozzle stage 116 to receive the accelerated and metered airflow, the non-combustion power generation stage 118 comprising an arrangement of rotary mechanical devices (e.g., multiples of rotary mechanical device 1202 and of different sizes) impacted by the accelerated and metered airflow to cause rotation of the rotary mechanical devices and generation of power based on the rotation of the rotary mechanical devices.

The rotary mechanical devices are mechanically coupled (via the flywheel gears, such as flywheel gear 1204) in a counter-rotation manner to enable velocity and pressure stages in the power generation stage 118 and to limit rotation speed of the rotary mechanical devices relative to the accelerated and metered airflow. The input flow control apparatus 110 is controlled to pulse the airflow to approximate a resonant frequency of the power generation system 100. The primary nozzle section 102 comprises a Curtis stage for airflow redirection and a Rateau stage for airflow velocity and pressure staging. The rotary mechanical devices include flywheel gears that are mechanically coupled so that all of the rotary mechanical devices rotate at the same time.

The system 100 can further comprise the control system 114 coupled to the input flow control apparatus 110 to control to meter the airflow. The control system 114 can comprise a data acquisition system that employs meteorological sensors, for control and power generation. The system 100 can further comprise the power storage subsystem 122 that stores the power generated by the power generation stage 118 and delivers power, as needed, to power consuming devices and systems (e.g., vehicle systems). The system 100 can further comprise the input shutter 106 as part of the aerodynamic housing 201 and controlled (the input shutter 106) to allow or block airflow into the input nozzle stage 108. The rotary mechanical devices can include at least one of generators or alternators that generate the power, the at least one of the generators or the alternators operate absent any external power.

In an alternative implementation, the power generation system 100 can comprise: the aerodynamic housing 201 mounted on a vehicle (e.g., the trailer 204 of the tractor-trailer system 200); and the primary nozzle section 102 mounted in the aerodynamic housing 201, the primary nozzle section 102 comprising: the input nozzle stage 108 constructed to receive airflow and increase velocity of the airflow; the input flow control apparatus 110 in-line (e.g., centered along the longitudinal axis 112) with the input nozzle stage 108 to receive the airflow, and controlled to meter the airflow; the middle nozzle stage 116 in mechanical alignment (e.g., centered along the longitudinal axis 112) with the input flow control apparatus 110 to receive and accelerate the metered airflow; the non-combustion power generation stage 118 in mechanical alignment (e.g., centered along the longitudinal axis 112) with the middle nozzle stage 116 to receive the accelerated and metered airflow, the non-combustion power generation stage 118 comprising an arrangement of power generation devices 120 impacted by the accelerated and metered airflow to cause generation of power from the power generation devices 120; a power storage subsystem 122 that stores the power generated by the power generation stage 118 and delivers power, as needed, to power consuming devices and systems; an input shutter 106 as part of the aerodynamic housing 201 and controlled to allow or block airflow into the input nozzle stage 108; and a control system 114 coupled to the input flow control apparatus 110 to control and meter the airflow, the control system 114 comprising a data acquisition system that employs meteorological sensors, for control and power generation.

The system 100 can further comprise the secondary nozzle section 104 mechanically aligned (e.g., centered along the longitudinal axis 112) with the primary nozzle section 102 and controlled to generate a Venturi effect at the output airflow of the primary nozzle section 102. The power generation devices 120 are mechanically coupled (via the flywheel gear teeth) in a counter-rotation manner to enable velocity and pressure stages in the power generation stage 118 and to limit rotation speed of the power generation devices 120 relative to the accelerated and metered airflow.

The input flow control apparatus 110 is controlled to generate a harmonic pressure wave cycle to increase kinetic energy delivered to the power generation devices 120. The power generation devices 120 include flywheel gears that are mechanically coupled so that all of the power generation devices 120 rotate at the same time but some of the power generation devices 120 rotate at different speeds than other power generation devices 120.

The power generation devices 120 include at least one of generators or alternators that generate the power, the at least one of the generators or the alternators operate absent any external power. The power storage system 122 comprises electrical switching gear that enables charging of some power storage elements (e.g., batteries) and power delivery from other power storage elements.

Following is a description of an alternative implementation that facilitates power generation from fluid flow using a stationary system, where "stationary" is intended to mean that the power generation system does not move, but fluid flow moves through/around the power generation system to effect power generation. As further described in an alternative embodiment, the "stationary" system can be mounted on a moving vehicle (e.g., truck, automobile, water craft, etc.) to facilitate power generation.

Figure 18:
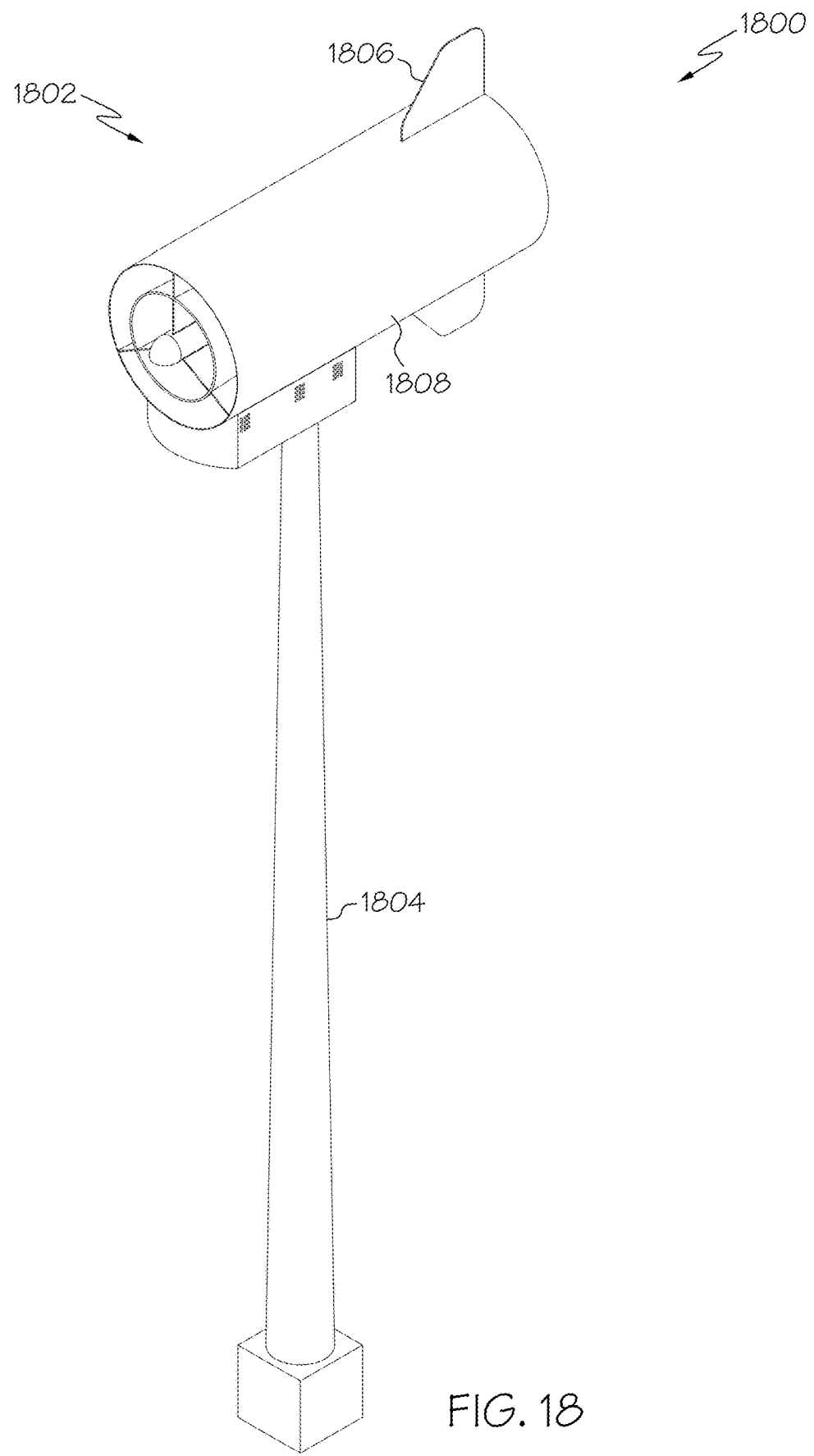
FIG. 18 illustrates a tower-based power generation system that utilizes fluid flow for power generation in accordance with the disclosed architecture.

FIG. 18 illustrates a tower-based power generation system 1800 that utilizes fluid flow (e.g., airflow) for power generation in accordance with the disclosed architecture. Accordingly, a stationary single turbine system 1802 is mounted on a stand or tower 1804 to place the turbine system 1802 in fluid flow for rotary power generation. The turbine system 1802 can be described as stationary, since in one embodiment, the turbine system 1802 is mounted on top of the stationary tower (or support) 1804 via housing 1808. The tower 1804 is of a suitable height for use in accordance with a residential or commercial building, for example. Still further, the tower 1804 can be so designed and constructed to work (be mounted) in cooperation with trucks or other types of vehicles, ships, and transports. In these cases, the turbine system 1802 is no longer stationary, but moves with the vehicle.

The turbine system 1802 can be pivotally mounted on the top of the tower 1804 such that by way of fins 1806 on the outer surface of the aerodynamic system housing 1808 of the turbine system 1802, the turbine system 1802 will face the oncoming fluid flow for optimum utilization and power generation. Generated power is then carried on wiring routed down the outside or inside of the tower 1804 to the associated consuming system and/or storage system.

Figure 19:
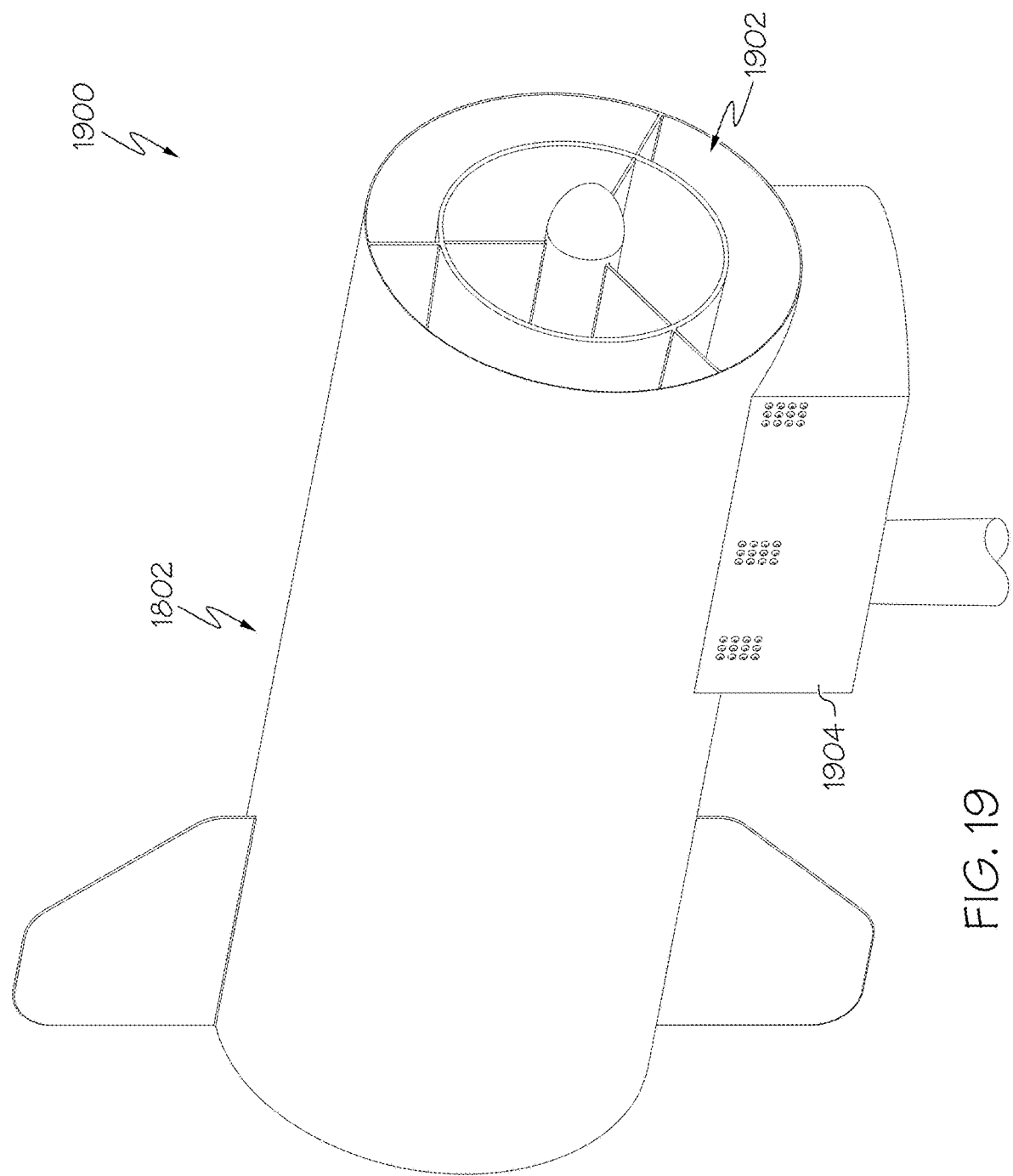
FIG. 19 illustrates an isometric close-up view of the turbine system for stationary and moving power generation systems.

FIG. 19 illustrates an isometric close-up view 1900 of the turbine system 1802 for stationary and moving power generation systems. The system 1802 comprises dual (concentric) inputs 1902 into which the fluid flow is received. The system 1802 also comprises a local (with the turbine system 1802 versus away from the turbine system 1802) electromechanical (also "local") control system 1904 for power conversion, power routing, and electromechanical interconnection for control and data acquisition.

Figure 20:
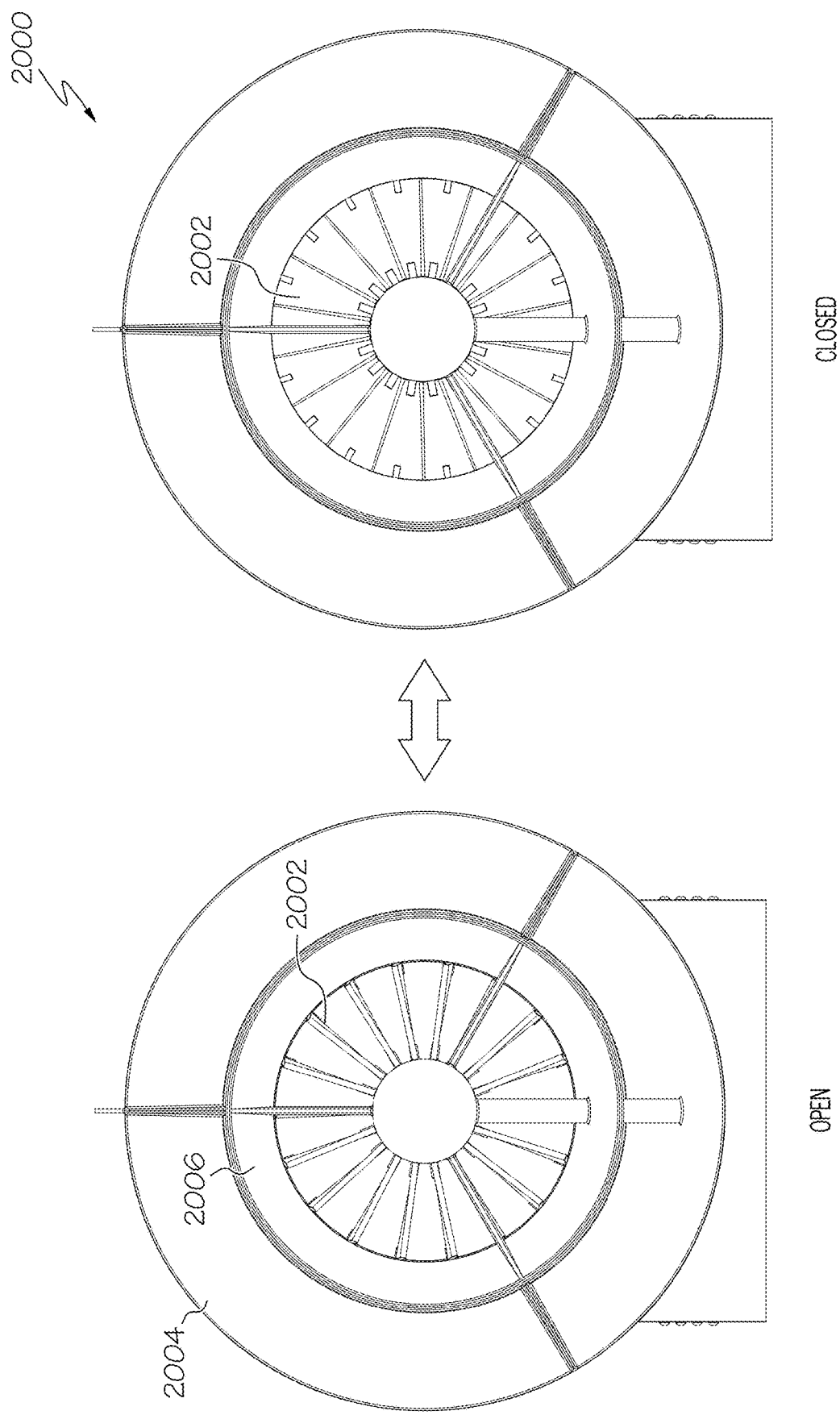
FIG. 20 illustrates a frontal view of open and closed cycling blades for the turbine system.

FIG. 20 illustrates a frontal view 2000 of open and closed cycling blades 2002 for the turbine system 1802. The cycling blades 2002 are pivotally attached and controlled to enable optimum rotational energy of the turbine/flywheel for power generation. These cycling blades 2002 are shown in greater detail herein. The view 2000 further shows the concentric inputs 1902: an outer input 2004 and an inner input 2006.

Figure 21:
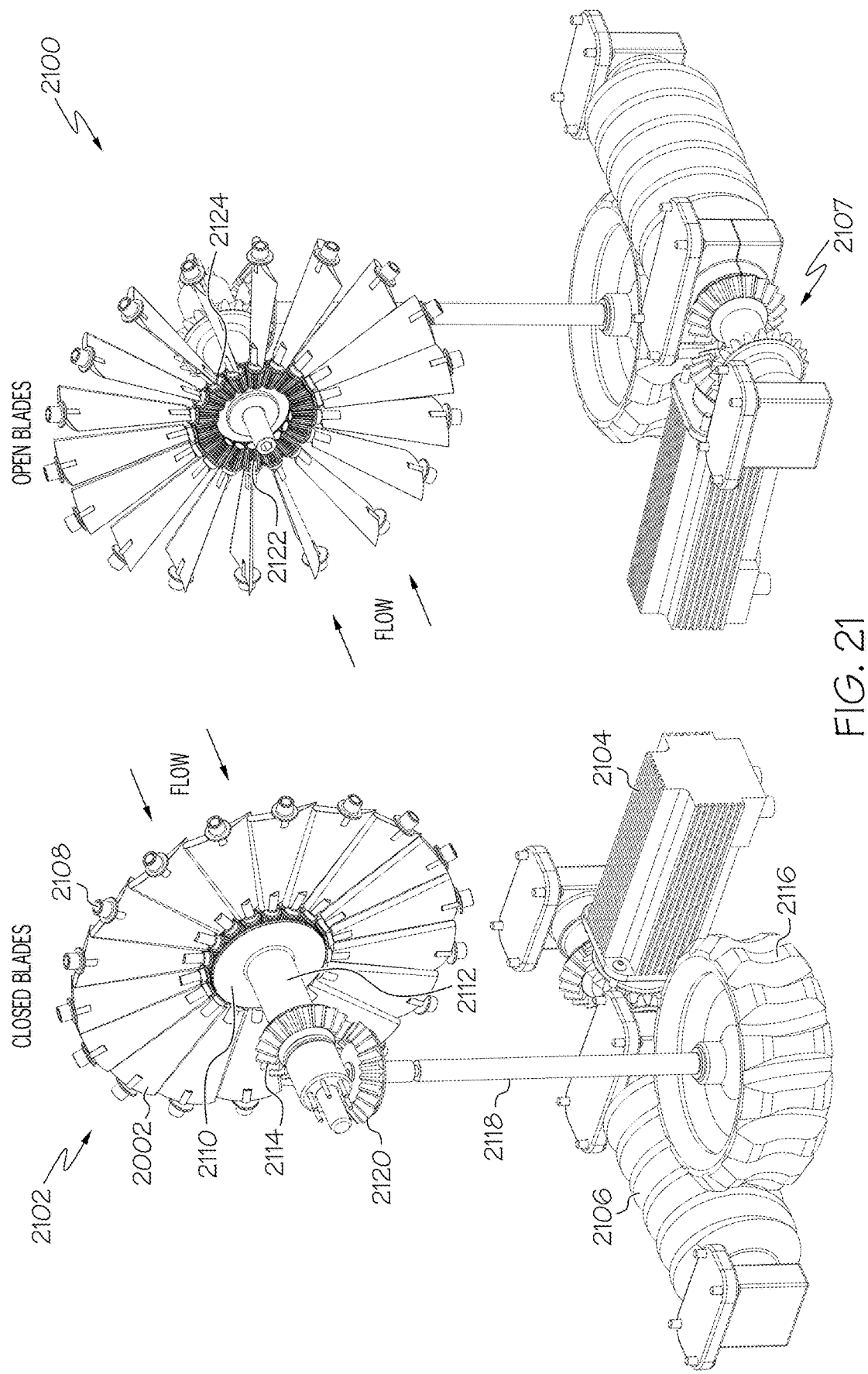
FIG. 21 illustrates an isometric view of the cycling blade gear system.

FIG. 21 illustrates an isometric view 2100 of the cycling blade gear system 2102. The cycling blade gear system 2102 comprises a drive motor 2104 (e.g., a stepper motor) that when controlled, turns a worm gear 2106 using a mutilated gear assembly 2107 (of beveled gears mated to a mutilated gear where, on a portion of the periphery, the gear cogs are missing) to rotate, open or close, the cycling blades 2002. The control of the motor 2104 is sufficient to incrementally rotate the blades 2002 to various degrees of openness via the mutilated gear assembly. Moreover, the motor 2104 can be operated in a single direction of rotation to eliminate reversing or start/stop, which would decrease the lifetime of the motor due to increased wear and heat generation. In any degree of open state, the cycling blades 2002 are rotated to enable fluid flow past the cycling blades 2002 thereby causing a turbine (not shown) to rotate and enable power generation via a turbine connected generator unit (not shown).

A blade assembly 2108 of the gear system 2102 comprises all the blades properly oriented and pivotally coupled to a drum 2110, the drum 2110, a drum shaft 2112, and a drum shaft bevel gear 2114. The drum shaft 2112 is fixed to the drum 2110 at one end and the drum shaft bevel gear 2114 at the other end. The blades 2002 are in rotational communication with a toothed backside gear face of the drum 2110.

In operation, the motor 2104 drives the mutilated gear assembly 2107 to open and close the blades 2002 to achieve the desired fluid flow and pressure for optimum power generation. The worm gear 2106, in turn, drives a worm gear sprocket 2116. The sprocket 2116 turns a shaft 2118 having a sprocket bevel gear 2120 in rotational communication with the shaft bevel gear 2114. The shaft bevel gear 2114 rotates accordingly, thereby turning the drum 2110, and hence, a backside gear face 2124 of the drum 2110. Each of the blades 2002 is affixed to a corresponding blade bevel gear 2122. Each blade bevel gear 2122 is in mechanical communication with the backside gear face 2124, such that when the backside gear face 2124 is rotated, the blade bevel gears 2122 and blades 2002 are also rotated to various level of openness (from closed to wide open). In the closed state, the cycling blades 2002 are rotated to prevent fluid flow from ultimately rotating the turbine shaft (not shown) and generating power.

Figure 22:
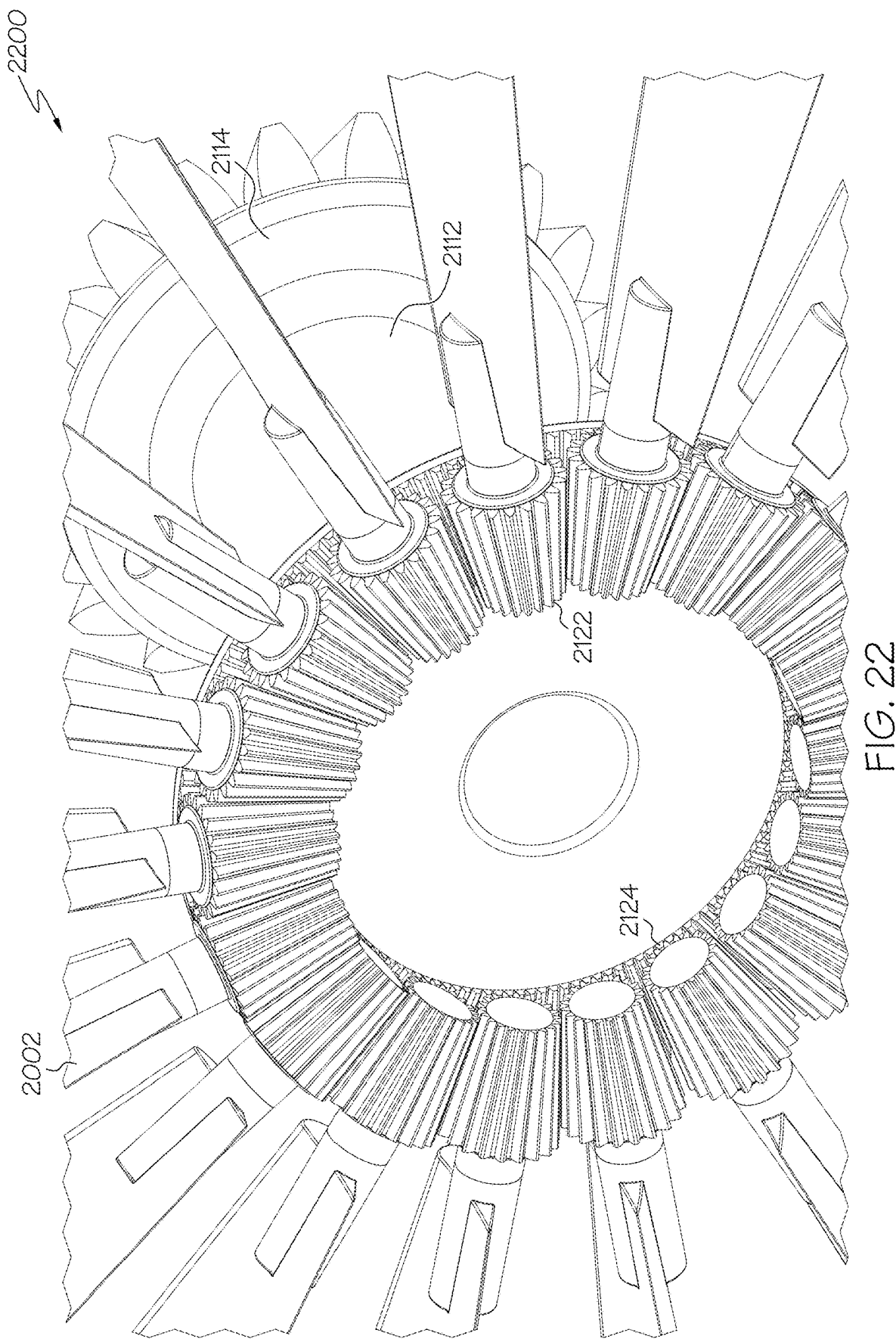
FIG. 22 illustrates a close-up isometric view of cycling blades and associated blade bevel gears.

FIG. 22 illustrates a close-up isometric view 2200 of cycling blades 2002 and associated blade bevel gears 2122. The blade bevel gears 2122 are mechanically and rotatably coupled to the backside gear face 2124, that when rotated, causes the cycling blades 2002 to rotate to various degrees of openness, which openness includes closed, wide open, and any other rotations in-between. As illustrated, the backside gear face 2124 is part of the drum 2110, which drum 2110 is fixed to the drum shaft 2112, and which drum shaft 2112 is fixed to the drum shaft bevel gear 2114.

FIG. 23 illustrates isometric views 2300 of the drum 2110, drum shaft 2112, and drum shaft bevel gear 2114. The drum 2110 comprises the backside gear face 2124 that mates to the many blade bevel gears 2122.

Figure 24:
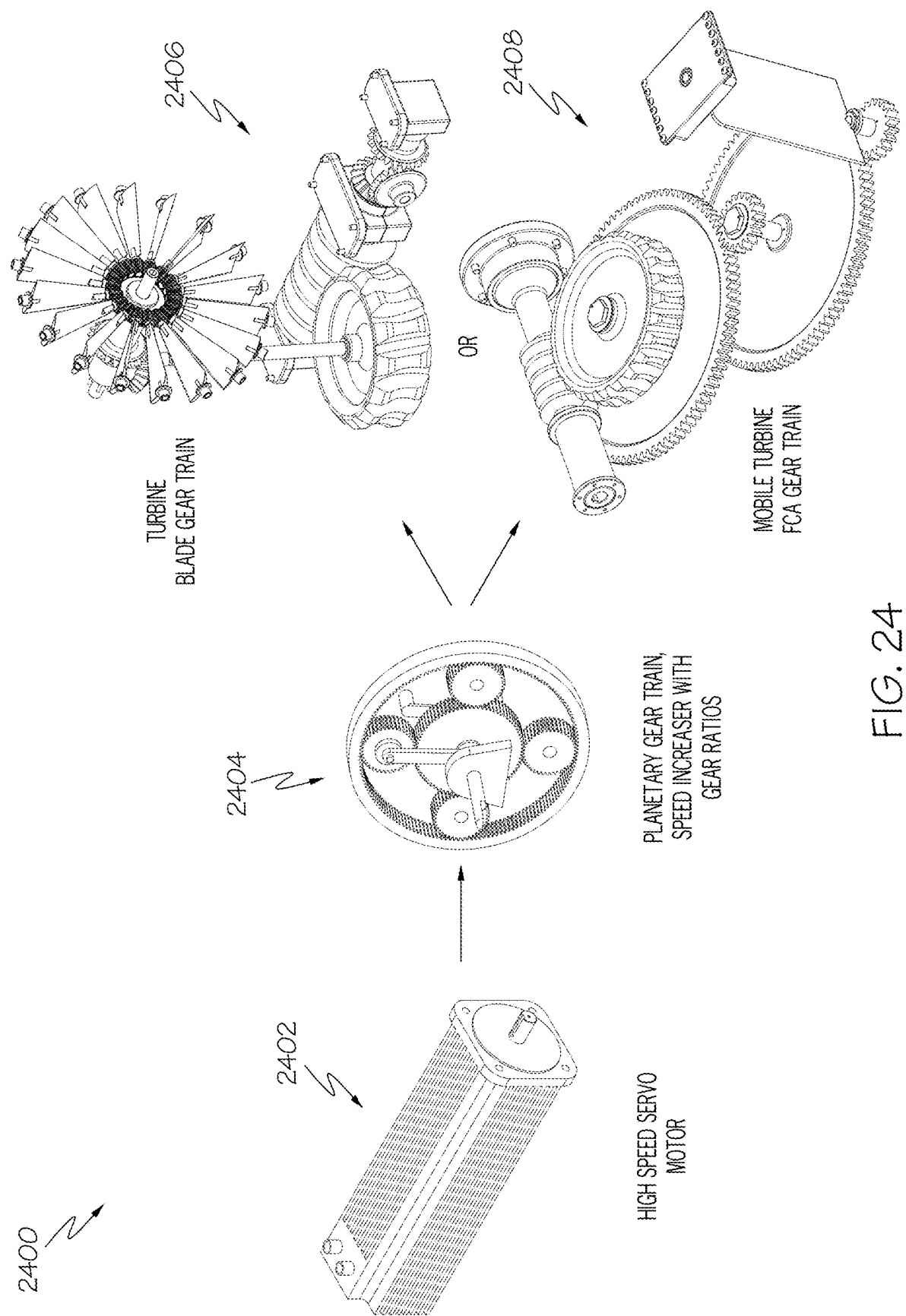
FIG. 24 illustrates a diagram of a high speed gear train for stationary or mobile turbines.

FIG. 24 illustrates a diagram of a high speed gear train 2400 for stationary or mobile turbines. The gear train 2400 can comprise a high speed servo-motor 2402. In one implementation, for example, the servo-motor 2402 operates at a minimum thirty-six hundred revolutions per minute (RPMs). The servo-motor 2402 connects to ("drives") a planetary gear train 2404, which is a speed increaser with gear ratios that can range from 30:1 to 100:1, for example. The planetary gear train 2404 can be employed in at least two scenarios: in connection with a stationary turbine blade gear train 2406 and a mobile turbine FCA gear train 2408 (similar to the flow control drive system 706). In operation, the servo motor 2402 is controlled to quickly throttle the gear trains (2406 and 2408) as desired to achieve the optimum fluid flow and power generation.

Figure 25:
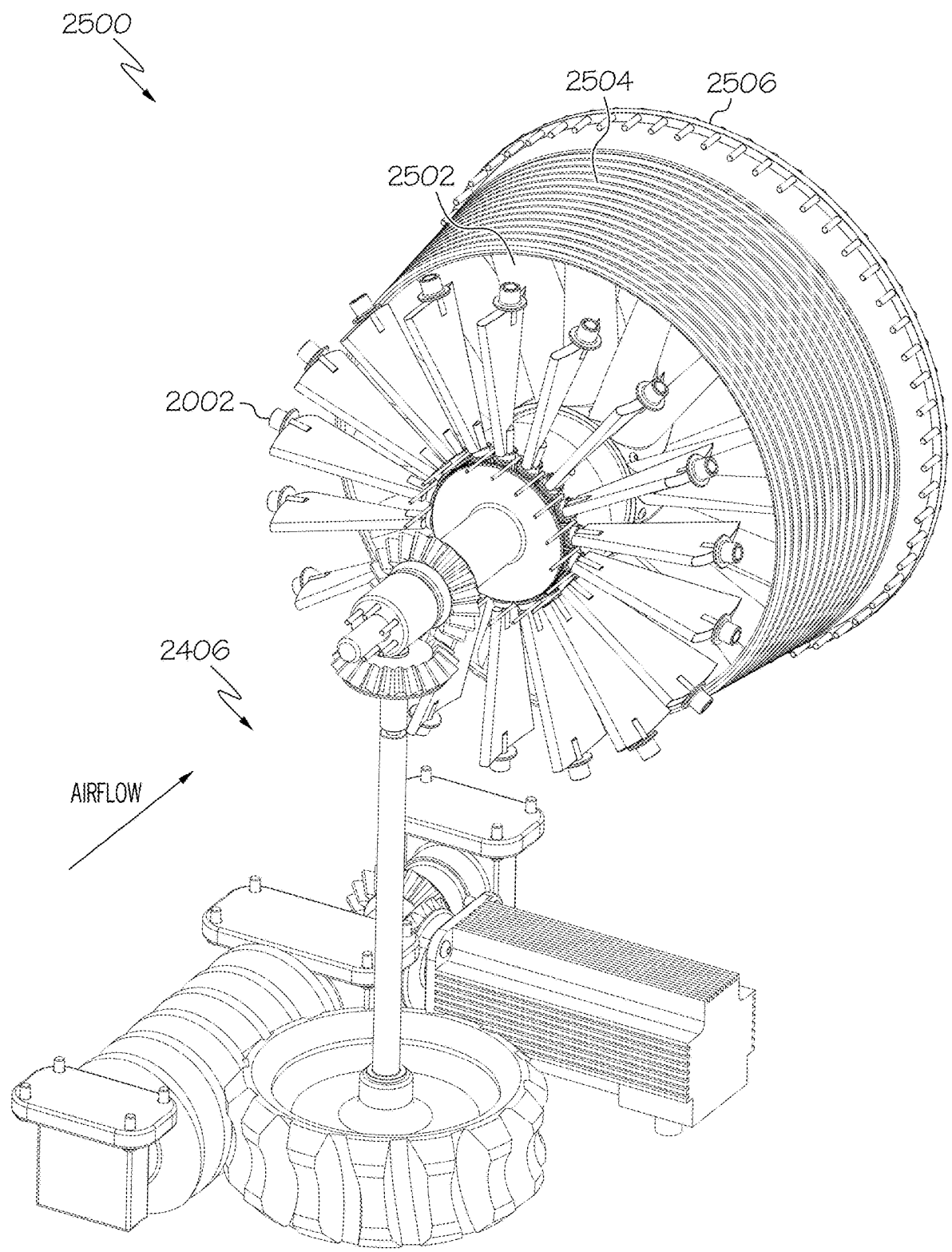
FIG. 25 illustrates an isometric view of the stationary turbine blade gear train as employed with a turbine, a turbine flywheel shroud, and turbine flywheel support.

FIG. 25 illustrates an isometric view 2500 of the stationary turbine blade gear train 2406 as employed with a turbine 2502, a turbine flywheel shroud 2504, and turbine flywheel support 2506. The turbine 2502 and shroud 2504 are fixedly attached together to rotate in unison based on the driving force of the airflow against the turbine blades, as enabled by opening the cycling blades 2002. Airflow is shown first impacting the cycling blades 2002 and then when allowed to pass through some degree of openness by the blades 2002, exits through the turbine 2502, thereby driving a power generation device (not shown) to produce power.

Figure 26:
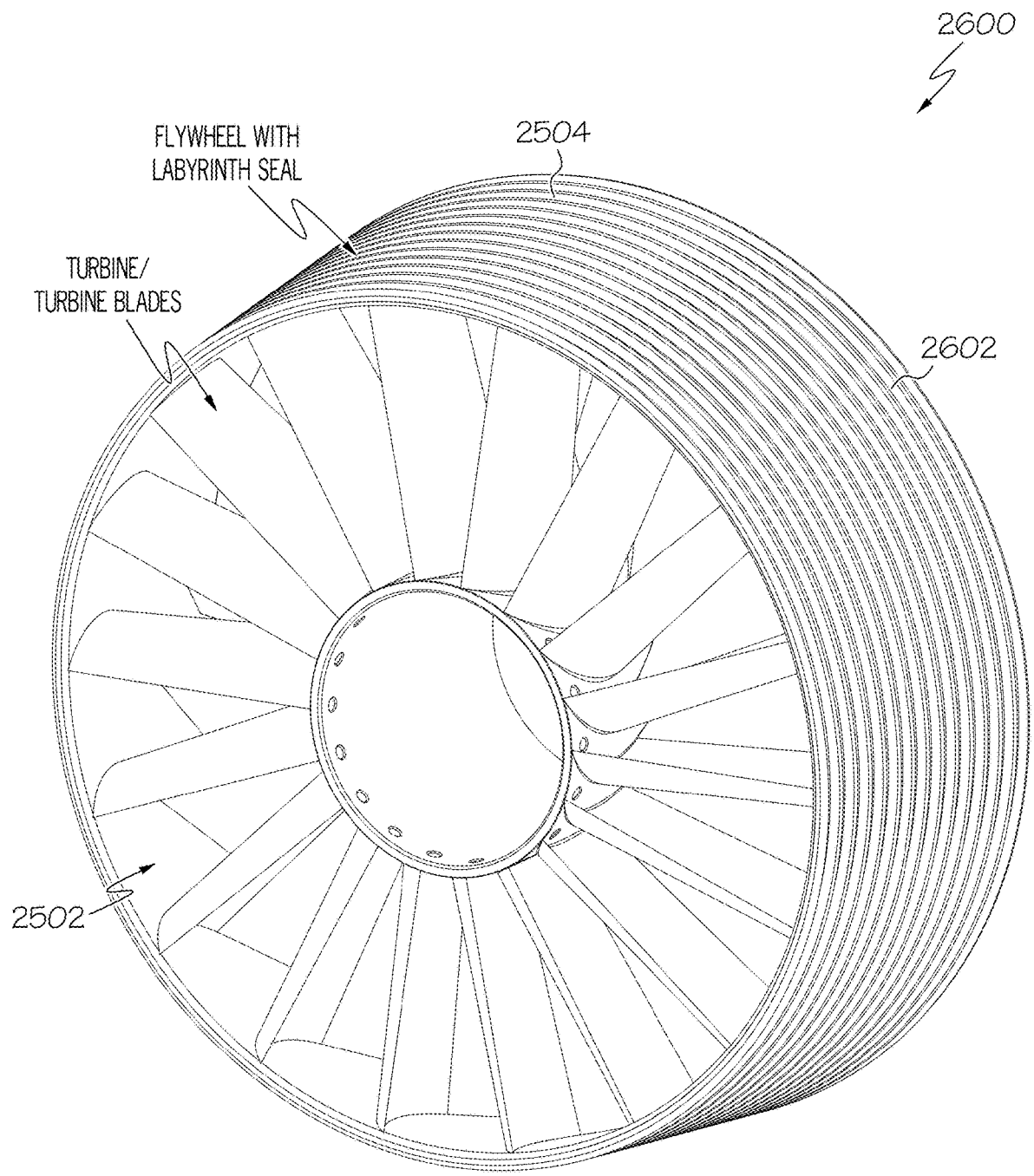
FIG. 26 illustrates an isometric view of the turbine as positioned in the flywheel shroud.

FIG. 26 illustrates an isometric view 2600 of the turbine 2502 as positioned in the flywheel shroud 2504. The flywheel shroud 2504 also functions as a flywheel for this stationary embodiment. The exterior surface 2602 of the shroud 2504 is so designed to function as a labyrinth seal when coupled closely in mechanical alignment with a structure/housing in which the turbine 2502 and shroud 2504 are utilized (mounted).

FIG. 27 illustrates views 2700 of the turbine 2502. A power generation device is seated into and secured to a hub 2702 of the turbine 2502, such that the rotating turbine 2502 also rotates the power generation device for this system.

FIG. 28 illustrates side and isometric views 2800 of the flywheel shroud 2504. The flywheel shroud 2504 is designed as a conic section where airflow is into the smaller opening and exhaust is from the larger opening. Accordingly, the turbine 2502 is also shaped as a conic section that mechanically mates with an interior surface 2802 of the flywheel shroud 2504 when positioned inside the shroud 2504. The outside surface of the flywheel shroud 2504 is designed as a labyrinth seal 2804, which provides a prohibitive path through which fluid must flow to exit past the seal. For example, the labyrinth seal 2804 can be designed with multiple grooves or screw threads such that the fluid (e.g., air, liquid, etc.) has to pass through a long and arduous path to escape.

Figure 29:
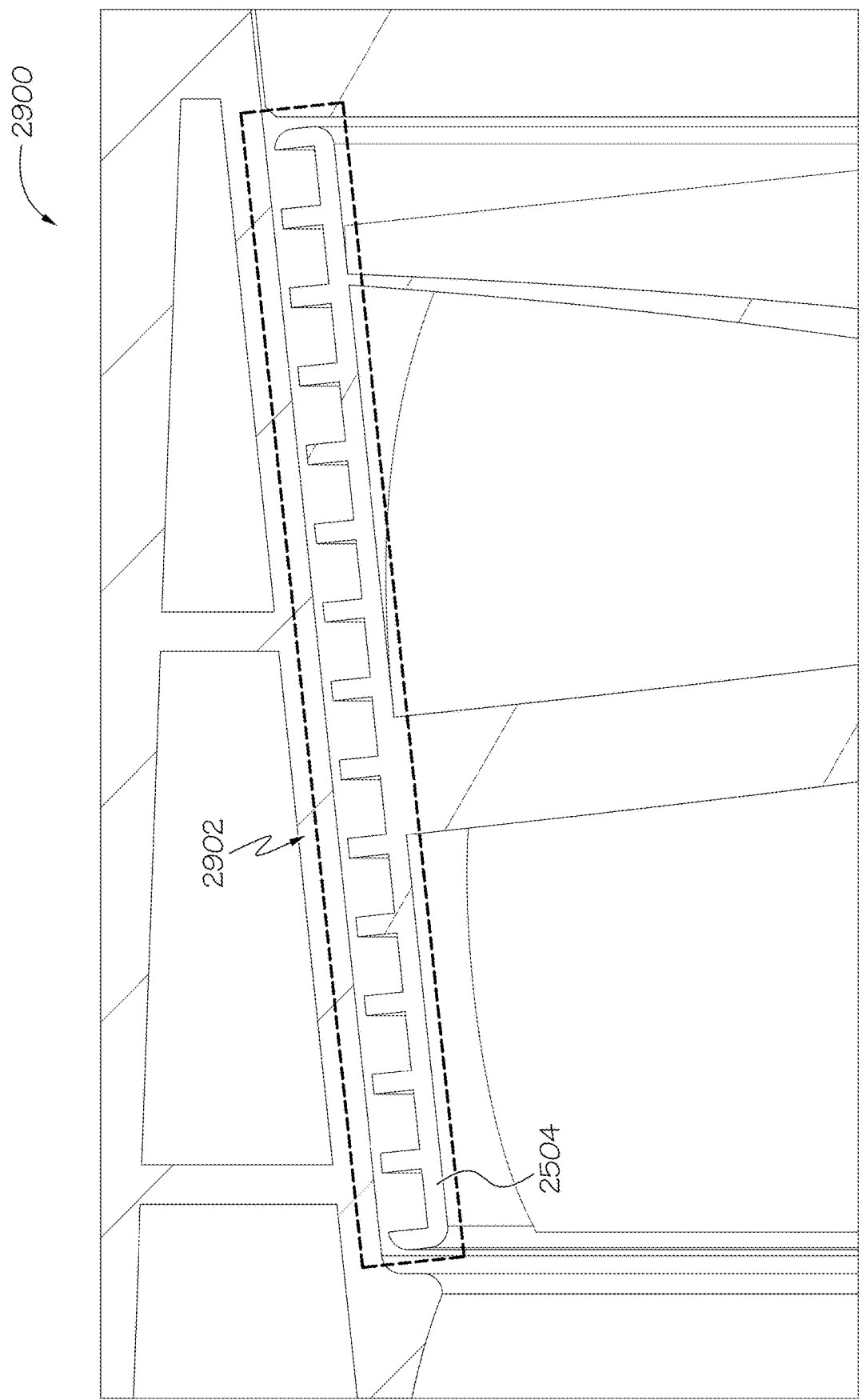
FIG. 29 illustrates a close-up cross-sectional view of the flywheel shroud and seal interface, as positioned in the turbine housing.

FIG. 29 illustrates a close-up cross-sectional view 2900 of the flywheel shroud 2504 and seal interface 2902, as positioned in the turbine flywheel support 2506. The turbine 2502 is affixed to the interior surface 2802 of the flywheel shroud 2504 via a spoke structure, such that the turbine 2502 and flywheel shroud 2504 rotate as a unit. The seal interface 2902 is designed to be mechanically sufficient to enable a close clearance (e.g., millimeters or sub-millimeter) between the flywheel labyrinth seal and the interior surface 2802.

Figure 30:
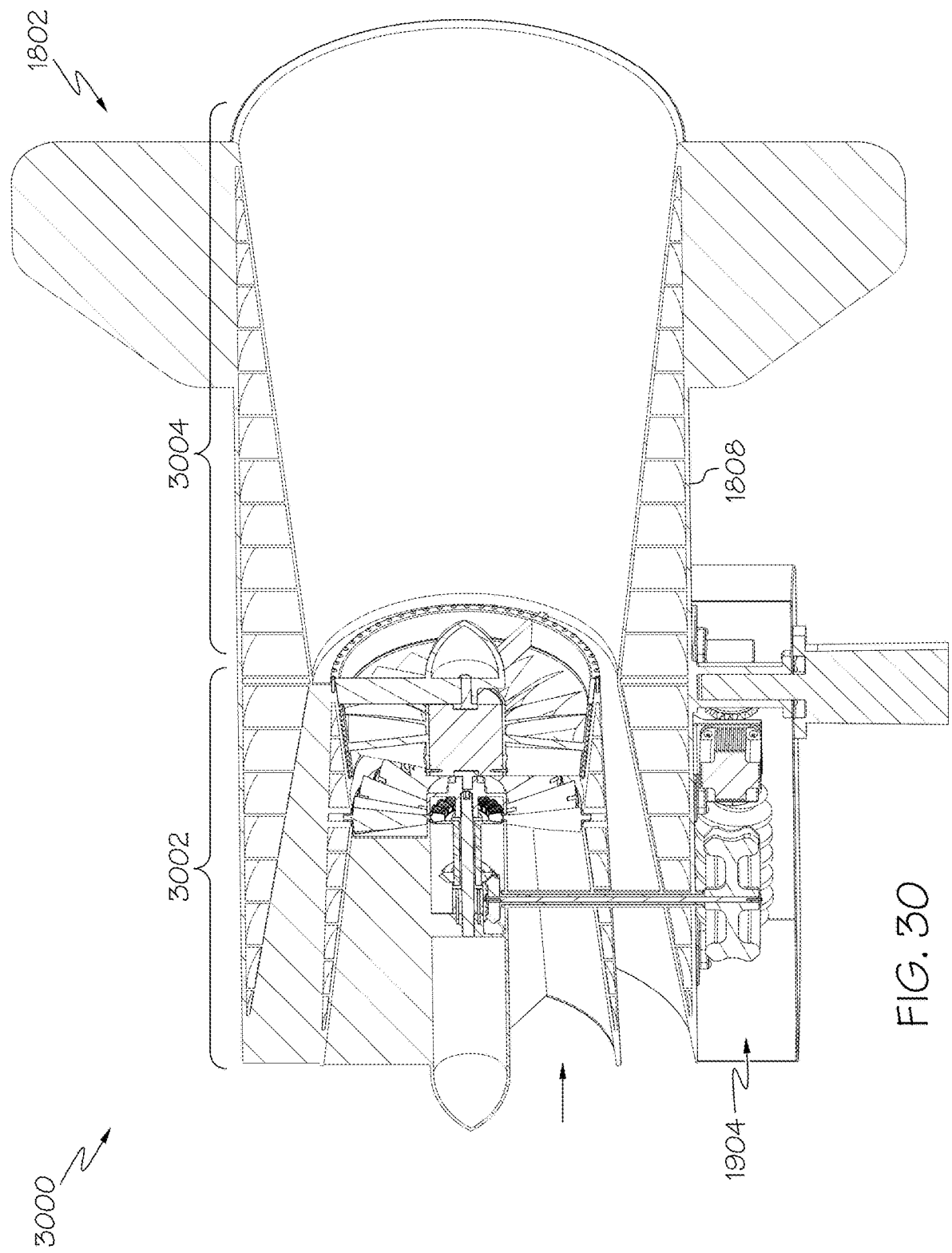
FIG. 30 illustrates a sectional view of the stationary turbine system, housing, and local control system.

FIG. 30 illustrates a sectional view 3000 of the stationary turbine system 1802, housing 1808, and local control system 1904. The interior of the housing 1808 comprises a convergent section 3002 and divergent section 3004. Airflow entering from the left into the convergent section 3002 is allowed into the housing 1808 by way of opening the blades 2002 via the local control system 1904, which airflow forces the turbine and flywheel to rotate. The local control system 1904 comprises part of the turbine blade gear train 2406, which gear train 2406 extends upward into the convergent section 3002. The convergent section 3002 and divergent section 3004 are created in the housing 1808 using increased housing thickness that reaches the thickest structure about the housing section that encompasses the flywheel shroud portion.

Figure 31:
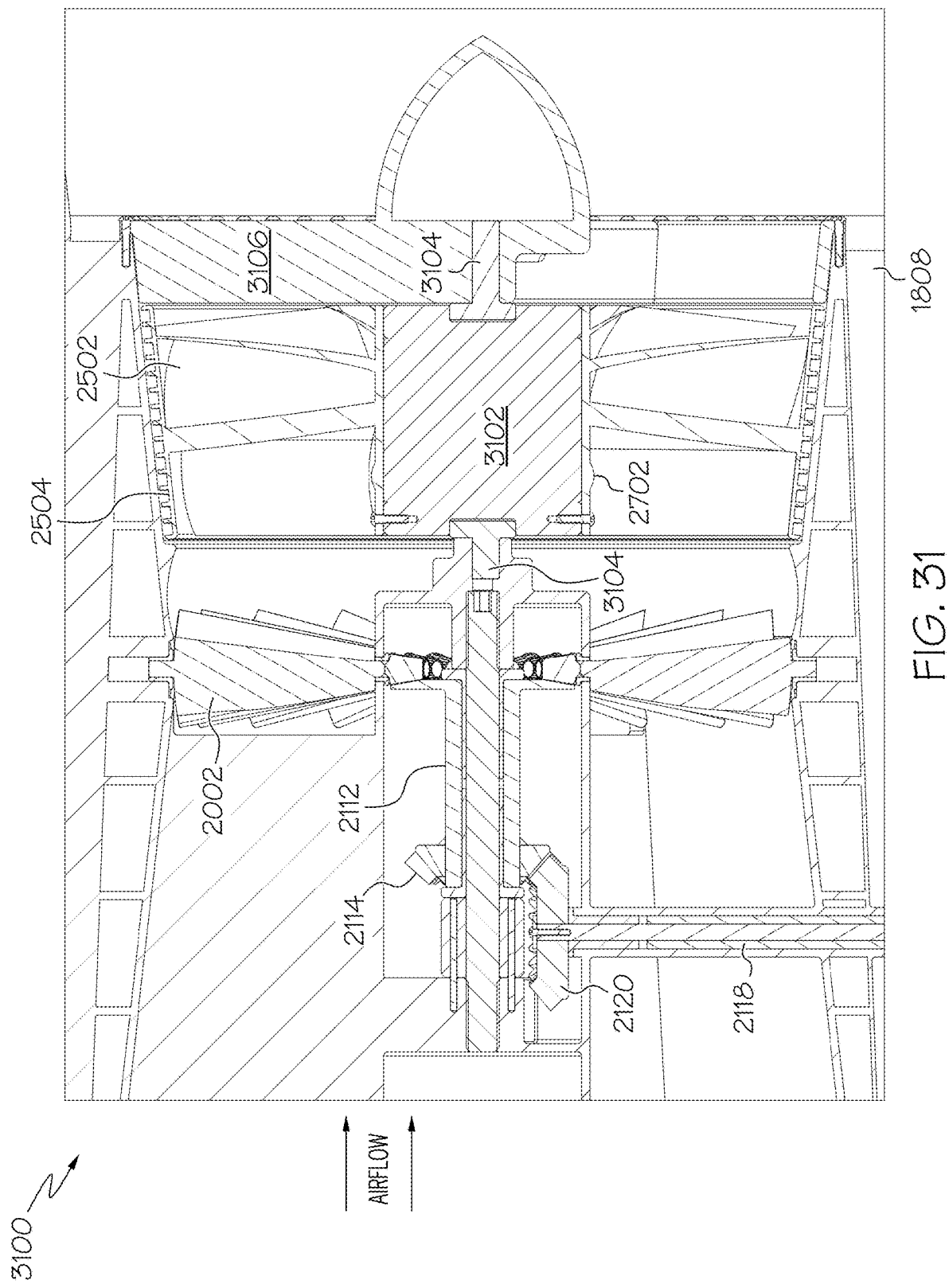
FIG. 31 illustrates a close-up cross-sectional view of the housing and internal structures and systems.

FIG. 31 illustrates a close-up cross-sectional view 3100 of the housing 1808 and internal structures and systems. The view 3100 shows a power generation device 3102 affixed in the hub 2702 of the turbine 2502. Thus, as the turbine 2502 rotates, the stator of the device 3102 also rotates, while the rotor 3104 remains stationary. This operation is opposite as to how generators are traditionally used, where the rotor 3104 is turned relative to the stationary stator. In this use, the rotor 3104 is fixed to a rotor structure 3106 internal to the housing 1808. As the blades 2002 are opened, by turning the shaft 2118 and sprocket bevel gear 2120, the mating drum shaft bevel gear 2114 is rotated correspondingly, along with the drum shaft 2112 to cause rotation of the blades 2002. The device housing and rotor 3104 provide suitable structural support for the turbine 2502 and flywheel shroud 2504 under high speed rotation.

Figure 32:
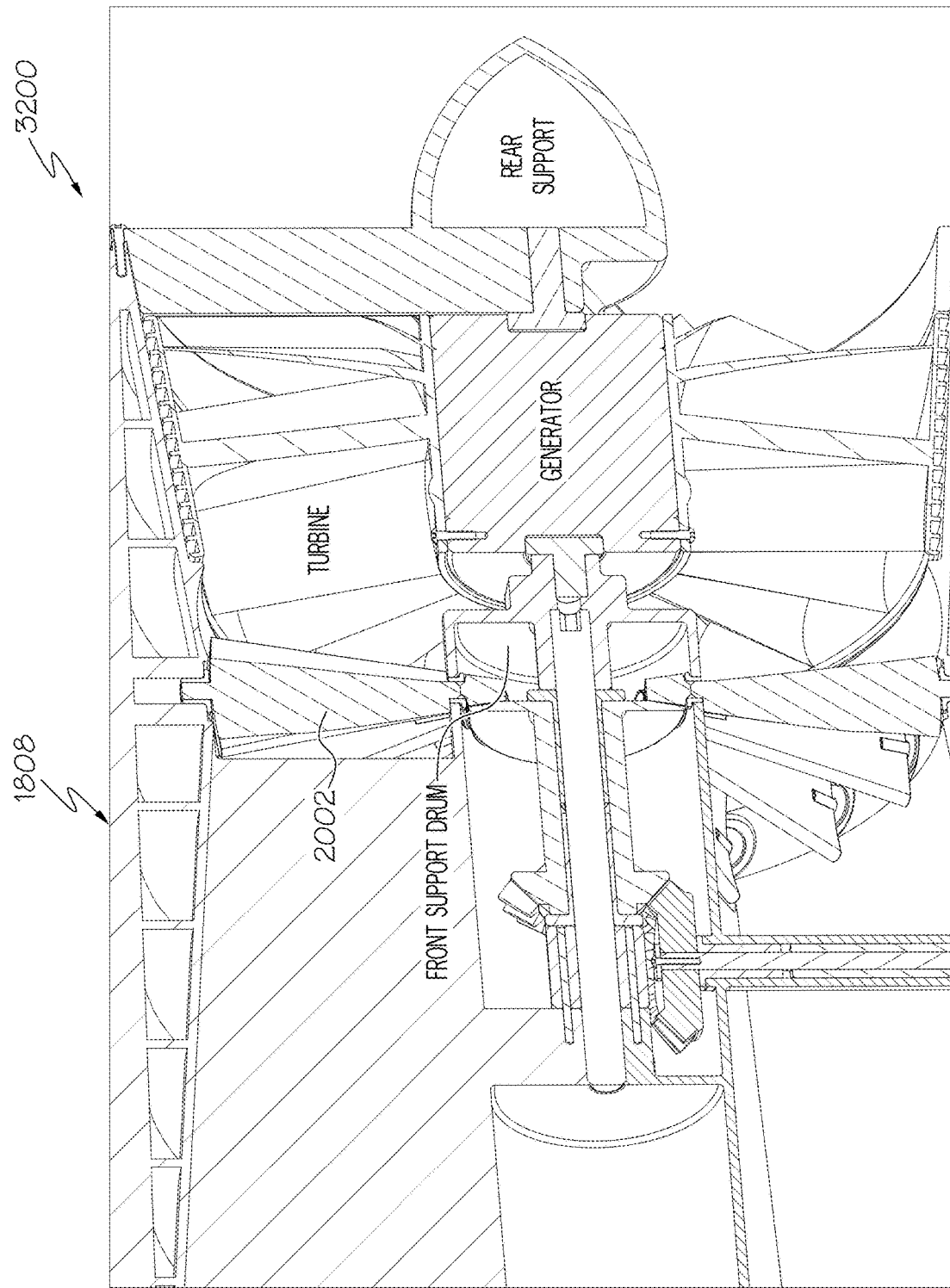
FIG. 32 illustrates an isometric cross-sectional view of the housing and internal structures and systems of FIG. 31.

FIG. 32 illustrates an isometric cross-sectional view 3200 of the housing 1808 and internal structures and systems of FIG. 31. The generator is fixed to the turbine, and thus turns with the turbine. The cycling blades 2002 are turned to affect the airflow and kinetic energy imparted therefrom to the turbines (e.g., turbines 2502). The view 3200 shows the rear support, the rotational generator with turbines affixed thereto, and front support drum.

Figure 33:
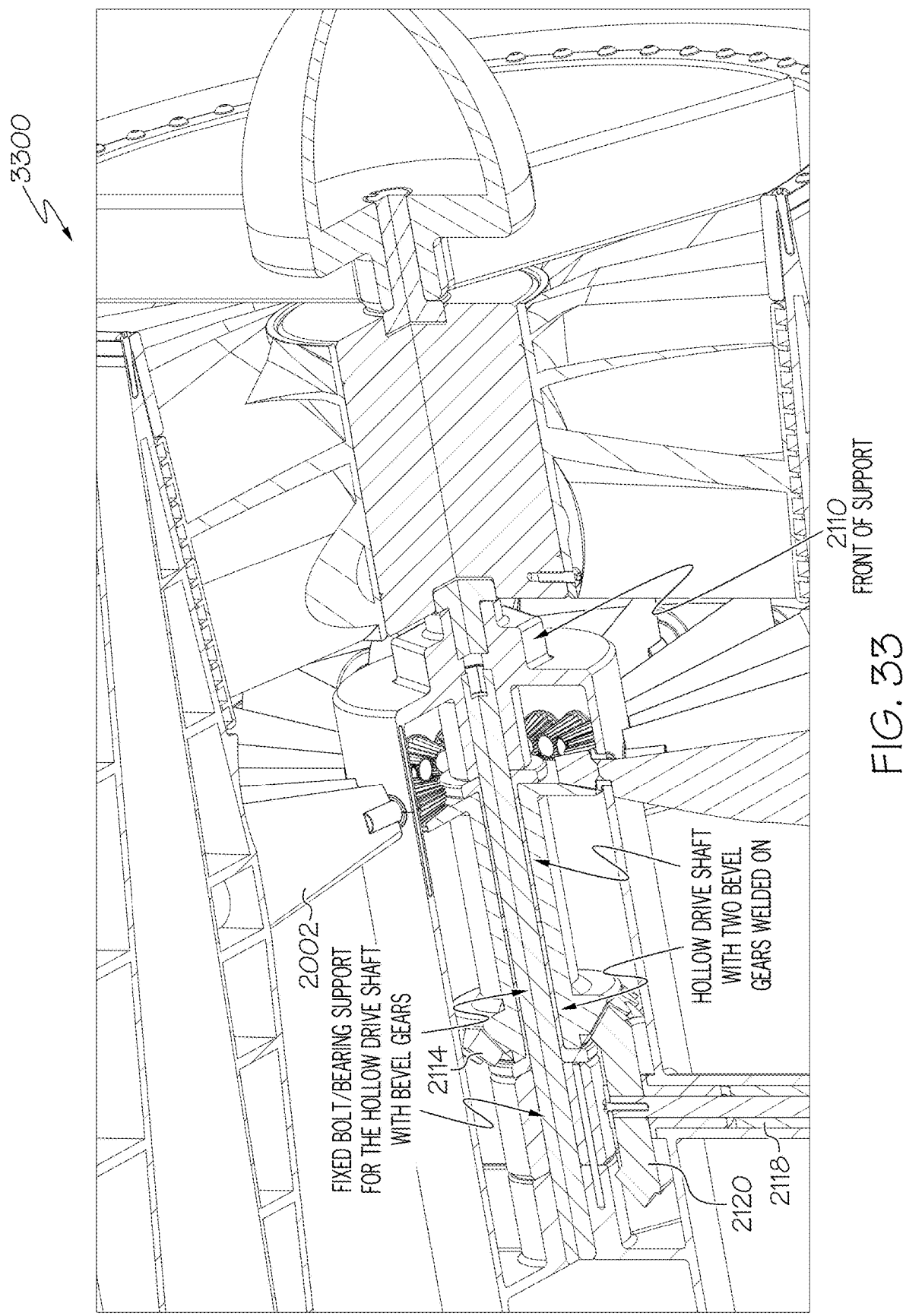
FIG. 33 illustrates a close-up sectional view of the internal power generator device structures and blade control system.

FIG. 33 illustrates a close-up sectional view 3300 of the internal power generator device structures and blade control system. The shaft 2118 is turned, which also rotates the sprocket bevel gear 2120. The sprocket bevel gear 2120 couples to the drum shaft bevel gear 2114 to turn the drum shaft bevel gear 2114 and cause the cycling blades 2002 to turn at the desired speed and degree of openness (e.g., ranging from entirely open to entirely closed, to some degree of partially opened in-between).

Figure 34:
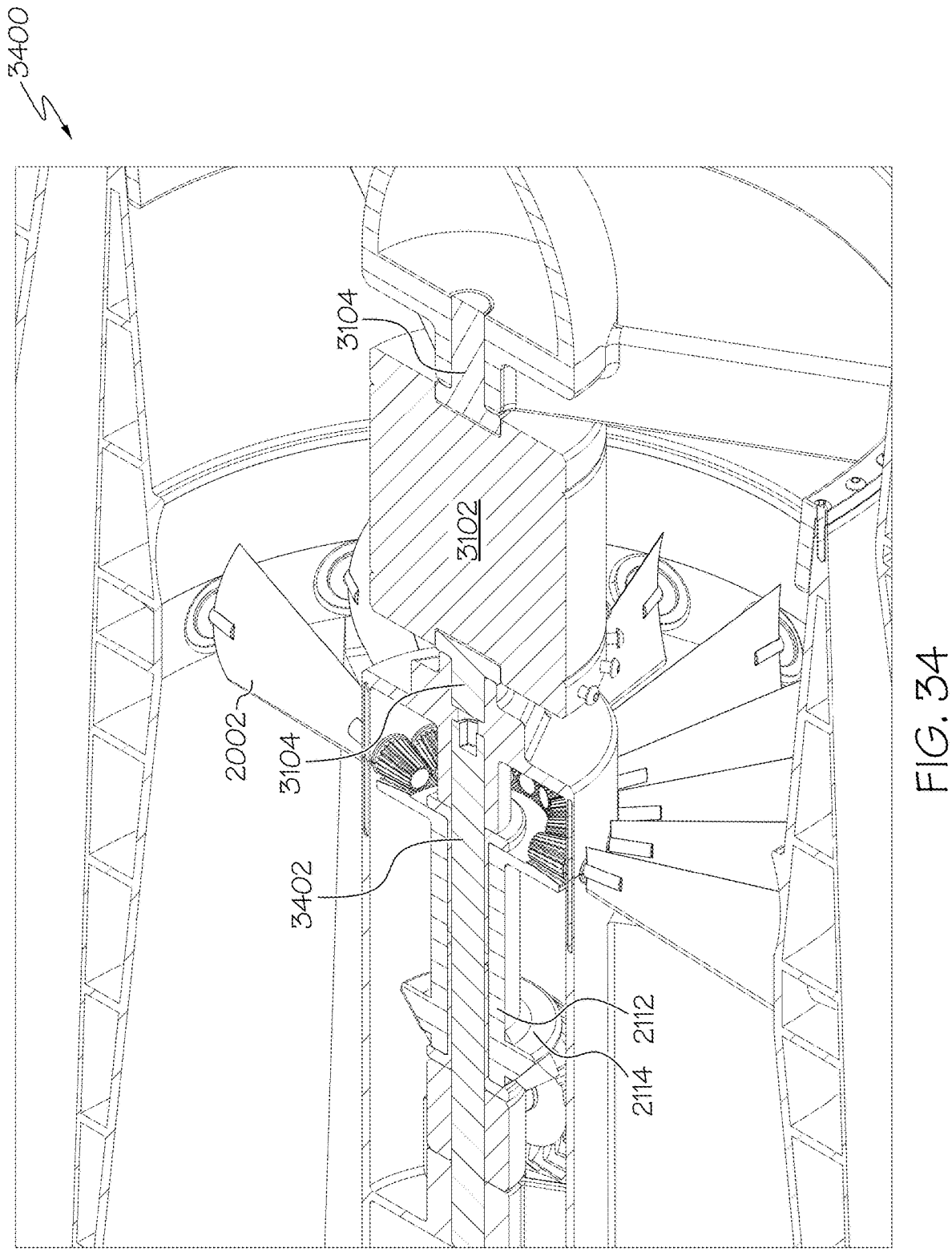
FIG. 34 illustrates a cross-sectional close-up view of the fixed power generation device rotor as affixed to a support internal to the drum shaft.

FIG. 34 illustrates a cross-sectional close-up view 3400 of the fixed power generation device rotor 3104 on opposing ends of the power generation device 3102 as mechanically connected to a fixed bolt support 3402 internal to the drum shaft 2112. Thus, as the turbine 2502 rotates, the stator of the device 3102 also rotates, while the rotor 3104 remains stationary. As previously indicated, this operation is opposite as to how generators are traditionally used, where the rotor 3104 is turned relative to the stationary stator. Airflow to turn the turbine 2502 is controlled by rotating the blades 2002 (e.g., opened), which are rotated by turning the drum shaft bevel gear 2114 and the drum shaft 2112.

Figure 35:
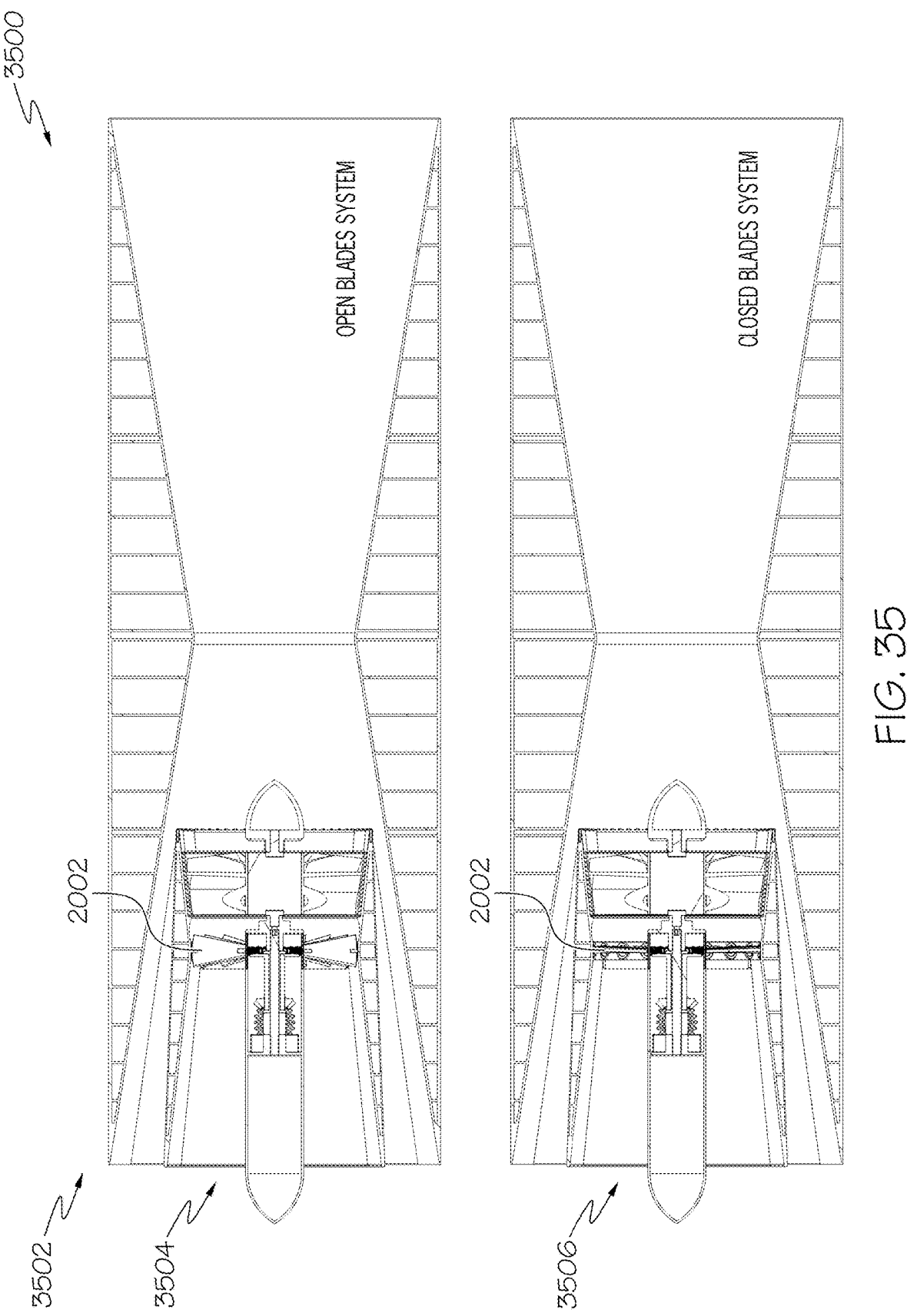
FIG. 35 illustrates cross-sectional views of an alternative stationary system having an elongated nozzle and showing an open blade operation and a closed blade operation.

FIG. 35 illustrates cross-sectional views 3500 of an alternative stationary system 3502 having an elongated nozzle and showing an open blade operation 3504 and a closed blade operation 3506. In the open blade operation 3504, the blades 2002 are controlled to rotate to some degree of open state. The alternative system 3502 is larger in length in comparison to the design of system 1802. The system 3502 can exhibit improved efficiency as well as better in terms of fluid flow operation. The system 3502 uses a converging-diverging (CD) exhaust component, whereas the system 1802 utilizes a diffuser section (divergent nozzle). The CD nozzle in the system 3502 decreases pressure and increases velocity in the mixing portion of the ejector. The turbine exhaust mixes (combines) with the ejector (high velocity) flow while continuing to flow into an area of lower pressure at higher velocity until the final divergent portion is reached in the system 3502. Ultimately, the system 3502 imposes less back pressure on the fluid flow exiting the turbine (hence, improved turbine efficiency), since there is not as drastic of a sudden area enlargement for the ejector (high velocity) flow when mixing with the turbine exhaust flow.

With respect to other alternative implementations, the generator(s) do not need to be internal to the stationary systems (1802 and 3502). Thus, the generators may be external with mechanical linkage, gearing, power shafts, hydraulics, pneumatics, and/or other connections to the internal turbine from the outside.

Secondarily, the turbine(s) and blade(s) can be mounted in the outer cowl/nozzle with the ejector nozzle portion positioned on the inside cowl/nozzle. Additionally, the power generation system 100 and stationary systems (1802 and 3502) can employ electric heating elements inside or in association with critical parts to melt ice or snow that might obstruct flow or bind moving parts.

Still further, the power generation systems can employ solar-assisted power input at the input CD stage 108 by focusing sun light with mirrors in creating (thermal/heat) hot spot(s) on the outer shell of the input area of CD stage 108. This adds heat energy to the compressed air just before entering the wind turbine. The power generation systems can also employ a hybrid photovoltaic solar panel(s) in order to assist in charging the battery banks.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 36:
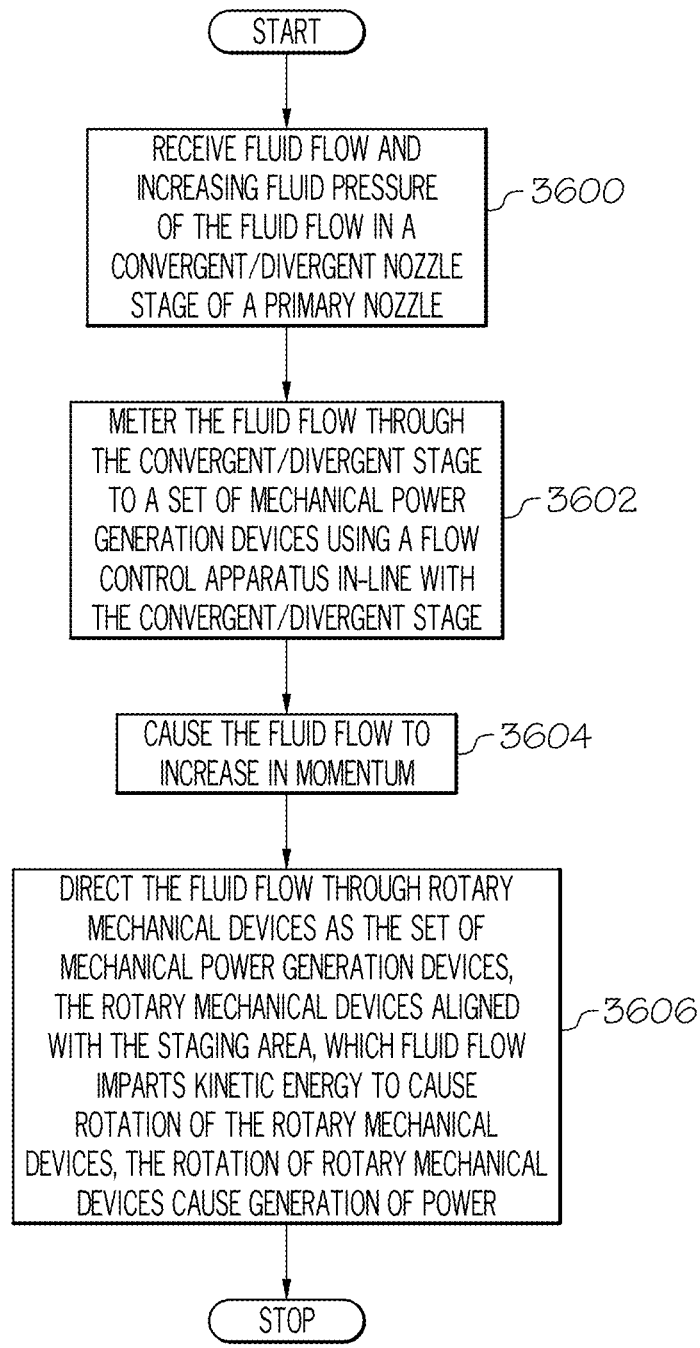
FIG. 36 illustrates a method of power generation in accordance with the disclosed architecture.

FIG. 36 illustrates a method of power generation in accordance with the disclosed architecture. At 3600, fluid flow is received and fluid pressure of the fluid flow increased in a convergent/divergent nozzle stage of a primary nozzle. At 3602, the fluid flow is metered through the convergent/divergent stage to a set of mechanical power generation devices using a flow control apparatus in-line with the convergent portion. At 3604, the fluid flow is caused to increase in momentum. At 3606, the fluid flow is directed through rotary mechanical devices as the set of mechanical power generation devices. The rotary mechanical devices are aligned with the staging area such that the fluid flow imparts kinetic energy to cause rotation of the rotary mechanical devices. The rotation of rotary mechanical devices causes the generation of power. The power can be stored in a storage subsystem, such as in batteries.

Figure 37:
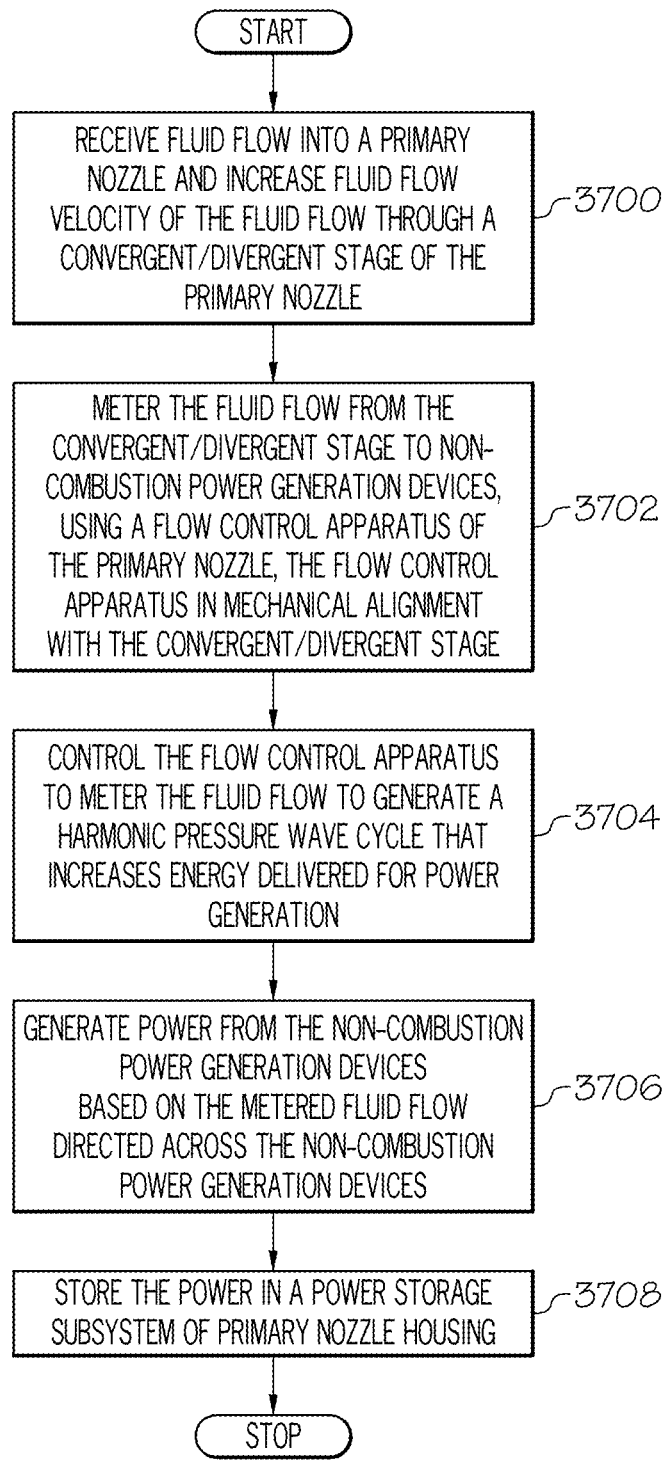
FIG. 37 illustrates an alternative power generation method in accordance with the disclosed architecture.

FIG. 37 illustrates an alternative power generation method in accordance with the disclosed architecture. At 3700, fluid flow is received into a primary nozzle and fluid flow velocity of the fluid flow increased through a convergent/divergent stage of the primary nozzle. At 3702, the fluid flow is metered from the convergent/divergent stage to non-combustion power generation devices, using a flow control apparatus of the primary nozzle, the flow control apparatus in mechanical alignment with the convergent/divergent stage. At 3704, the flow control apparatus is controlled to meter the fluid flow to generate a harmonic pressure wave cycle that increases energy delivered for power generation. At 3706, power is generated from the non-combustion power generation devices based on the metered fluid flow directed across the non-combustion power generation devices. At 3708, the power is stored in a power storage subsystem of a primary nozzle housing.

The method can further comprise mechanically coupling the non-combustion power generation devices so that all of the non-combustion power generation devices rotate at the same time, but some of the non-combustion power generation devices rotate at different speeds than other non-combustion power generation devices.

The method can further comprise controlling the fluid flow into the primary nozzle by way of an input shutter. The method can further comprise sensing data points of the power generation system using a computer-controlled data acquisition system.

Figure 38:
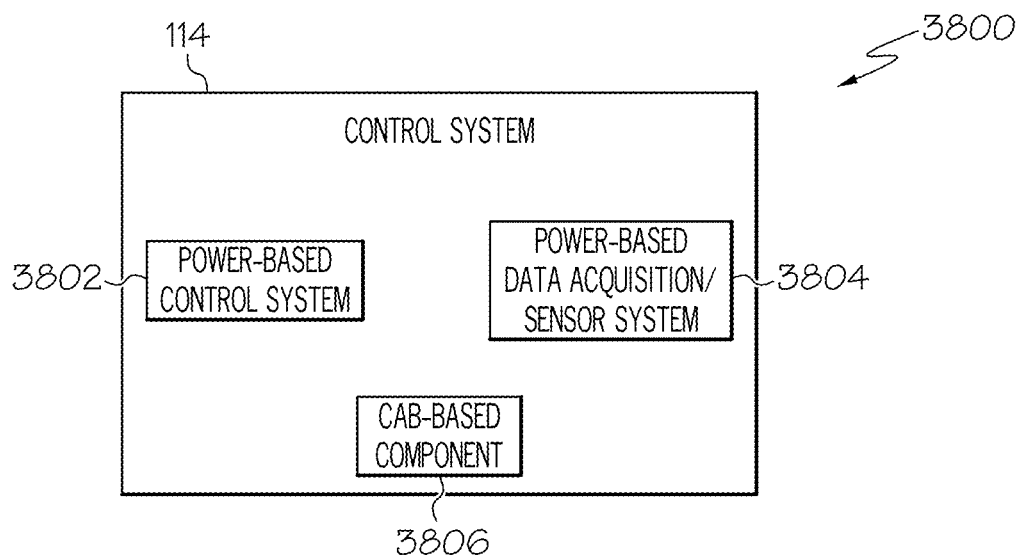
FIG. 38 illustrates a global computer control and data acquisition system for power generation via environment fluid flow.

FIG. 38 illustrates a global computer control and data acquisition system diagram 3800 for power generation via environment fluid flow in accordance with the disclosed architecture. The computer control and data acquisition system is "global" in the sense that it monitors and controls all operations and functions associated with at least the entire power generation system. The diagram 3800 comprises the control system 114 of all software and hardware that enables the disclosed architecture. For example, in the tractor-trailer implementation, the control system 114 comprises the components utilized in the trailer system to enable control and data acquisition, such as a power-based control system 3802 (similar to the control component 904A of FIG. 9) and a power-based data acquisition/sensor system 3804 (similar to the data acquisition component 904B of FIG. 9), as well as hardware/software that may be used to interface to the power-based control system 3802 and a power-based data acquisition/sensor system 3804, such as a cab-based (of a tractor in a tractor-trailer implementation or driver compartment of any terrestrial and/or non-terrestrial machine) component 3806.

Either or both of the power-based control system 3802 and a power-based data acquisition/sensor system 3804, and the cab-based component 3806 can include a user interface that enables user interaction via a display using, for example, standard user input devices (e.g., a mouse, pen, touch, voice control, etc.). The cab-based component 3806 can communicate in a wired and/or wireless manner with the trailer-based system(s) (3802 and/or 3804). The power generation system may be automatically controlled according to user input via the user interface, and/or automatically computed data as compared to control parameters. For example, the power generation system may be automatically enabled into operation based on environmental conditions such as a temperature that approximates fifty degrees and above and vehicle movement that approximates forty miles per hour and above.

The cab-based component 3806 can also enable the display of many different operation parameters of the power generation system while in operation, such as the environmental measurements (e.g., temperature, humidity, fluid velocity/pressure, etc., inside the primary nozzle), rotational speeds of the turbines, state of the FCA 110 and input shutter 106, power generation efficiency, power storage level in the batteries, etc.

It is to be understood that the cab-based component 3806 is intended to be equivalent to any hardware/software system that interfaces to the power generation system and which can be remote so that the user need not directly interface/interact with the power-based control system 3802 and/or the power-based data acquisition/sensor system 3804. It is within contemplation of the disclosed architecture that this comprises a smart-phone based application suitably designed for such capability, a portable computing device suitably designed for such capability, etc.

It is also within contemplation of the disclosed architecture that the control and data acquisition data/parameters can be obtained/transmitted remotely via cellular communications, and that the location of the power generation system can be tracked using geolocation systems such as GPS (global positioning system).

As used in this application, the term "component" is intended to refer to either hardware, a combination of software and tangible hardware, software, or software in execution. For example, a component can be, but is not limited to, tangible components such as a gears, screws, microprocessor(s), chip memory, mass storage devices (e.g., optical drives, solid state drives, and/or magnetic storage media drives), and computers, and software components such as a process running on a microprocessor, an object, an executable, a data structure (stored in a volatile or a non-volatile storage medium), a module, a thread of execution, and/or a program.

The word "exemplary" may be used herein to mean serving as an example, instance, or illustration. Any aspect or design described herein as "exemplary" is not necessarily to be construed as preferred or advantageous over other aspects or designs.

Figure 39:
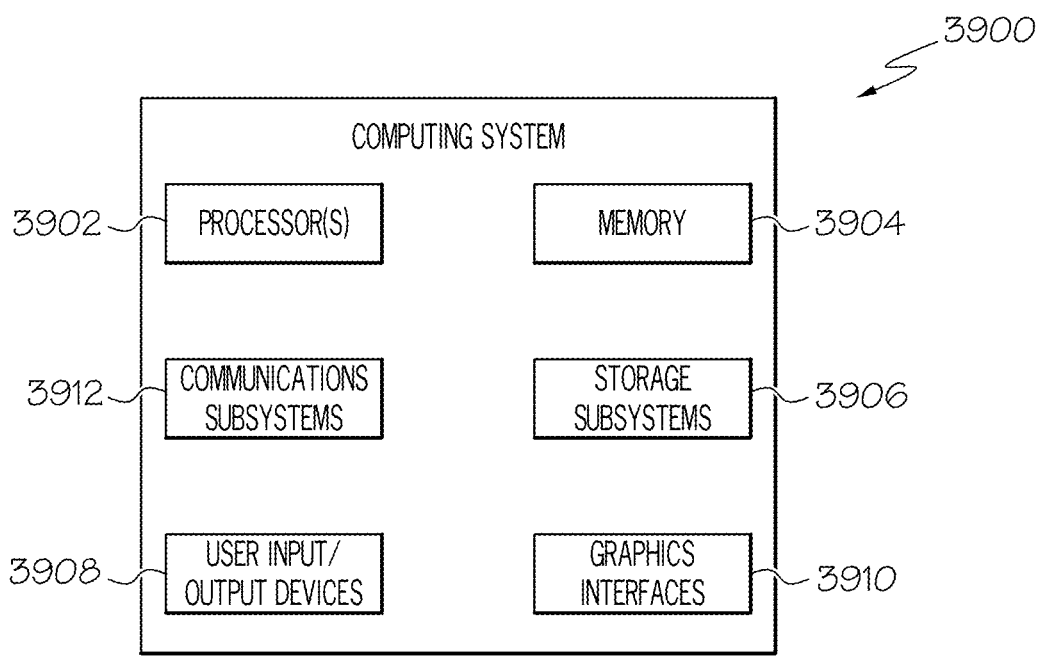
FIG. 39 illustrates a computing system that can operate as the control system to effect control and data acquisition for the disclosed architecture.

FIG. 39 illustrates a computing system 3900 that can operate as the control system 114 to effect control and data acquisition for the disclosed architecture. However, it is appreciated that the some or all aspects of the disclosed methods and/or systems can be implemented as a system-on-a-chip, where analog, digital, mixed signals and other functions are fabricated on a single chip substrate.

In order to provide additional context for various aspects thereof, FIG. 39 and the following description are intended to provide a brief, general description of the suitable computing system 3900 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 3900 for implementing various aspects includes the microprocessing unit(s) 3902 (also referred to as microprocessor(s) and processor(s)), a computer-readable storage medium such as a system memory 3904 (computer readable storage medium/media also include magnetic disks, optical disks, solid state drives, external memory systems, and flash memory drives) and storage subsystem 3906.

The microprocessing unit(s) 3902 can be any of various commercially available microprocessors such as single-processor, multi-processor, single-core units and multi-core units of processing and/or storage circuits. Moreover, those skilled in the art will appreciate that the novel architecture can be practiced with other computer system configurations such as personal computers (e.g., desktop, laptop, tablet PC, etc.), hand-held computing devices, microprocessor-based or programmable consumer electronics, and the like, each of which can be operatively coupled to one or more associated devices.

The system memory 3904 can include computer-readable storage (physical storage) medium such as a volatile (VOL) memory (e.g., random access memory (RAM)) and a non-volatile memory (NON-VOL) (e.g., ROM, EPROM, EEPROM, etc.). A basic input/output system (BIOS) can be stored in the non-volatile memory and includes the basic routines that facilitate the communication of data and signals between components within the computer 3900, such as during startup. The volatile memory can also include a high-speed RAM such as static RAM for caching data.

An internal bus provides an interface for system components including, but not limited to, the system memory 3904 to the microprocessing unit(s) 3902. The system bus can be any of several types of bus structure that can further interconnect to a memory bus (with or without a memory controller), and a peripheral bus (e.g., PCI, PCIe, AGP, LPC, etc.), using any of a variety of commercially available bus architectures.

The storage subsystem 3906 of the computer 3900 can include machine readable storage subsystem(s) and storage interface(s) for interfacing the storage subsystem(s) 3906 to the system bus and other desired computer components and circuits. The storage subsystem(s) 3906 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) can include interface technologies such as EIDE, ATA, SATA, and IEEE 1394, for example.

One or more programs and data can be stored in the memory 3904, a machine readable and removable memory subsystem (e.g., flash drive form factor technology), and/or the storage subsystem(s) 3906 (e.g., optical, magnetic, solid state), including an operating system, one or more application programs, other program modules, and program data. The operating system, one or more application programs, other program modules, and/or program data can include items and components suitable for control and data acquisition functions of the disclosed architecture.

Generally, programs include routines, methods, data structures, other software components, etc., that perform particular tasks, functions, or implement particular abstract data types. All or portions of the operating system, applications, modules, and/or data can also be cached in memory such as the volatile memory and/or non-volatile memory, for example. It is to be appreciated that the disclosed architecture can be implemented with various commercially available operating systems or combinations of operating systems (e.g., as virtual machines).

The storage subsystem(s) 3906 and memory 3904 serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general-purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computing system 3900, and include volatile and non-volatile internal and/or external media that is removable and/or non-removable. For the computing system 3900, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 3900, programs, and data using external user input/output devices 3908 such as a keyboard and a mouse. Other external user input/output devices 3908 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computing system 3900, programs, and data using onboard user input devices such a touchpad, microphone, keyboard, etc.

These and other input/output devices are connected to the microprocessing unit(s) 3902 through input/output (I/O) device interface(s), but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) also facilitate the use of output peripherals such as printers, audio devices, camera devices, and so on, such as a sound card and/or onboard audio processing capability.

One or more graphics interface(s) 3910 (also commonly referred to as a graphics processing unit (GPU)) provide graphics and video signals between the computing system 3900 and internal/external display(s) (e.g., LCD, plasma) and/or onboard displays. The graphics interface(s) 3910 can also be manufactured as part of the computer system motherboard.

The computing system 3900 can operate in a standalone and/or networked environment (e.g., IP-based) using logical connections via a wired/wireless communications subsystem 3912 to one or more networks and/or other computers. The other computers can include workstations, servers, routers, personal computers, microprocessor-based entertainment appliances, peer devices or other common network nodes, and typically include many or all of the elements described relative to the computing system 3900. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computing system 3900 connects to the network via the wired/wireless communications subsystem 3912 (e.g., a network interface adapter, onboard transceiver subsystem, etc.) to communicate with wired/wireless networks, wired/wireless printers, wired/wireless input devices, and so on. It will be appreciated that the network connections shown are exemplary and other means of establishing a communications link between the computers can be used.

The computing system 3900 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The power generation system can be implemented as a system, comprising: means for receiving fluid flow into a primary nozzle and increasing fluid flow velocity of the fluid flow through a convergent/divergent stage of the primary nozzle; means for metering the fluid flow from the convergent/divergent stage to non-combustion power generation devices, the means for metering in mechanical alignment with the convergent/divergent stage; means for controlling the flow control apparatus to meter the fluid flow to generate a harmonic pressure wave cycle that increases energy delivered for power generation; means for generating power from the non-combustion power generation devices based on the metered fluid flow directed across the non-combustion power generation devices; and means for storing the power in a power storage subsystem of a primary nozzle housing.

Power Generation System for Power Generation and Propulsion

The power generation systems described herein are capable of additional applications and benefits associated with now utilizing the power generation devices (e.g., turbines) as thrust/propulsion generation devices for wheeled land-based vehicles (e.g., trucks, cars, bicycles, buses, etc.), water-based vehicles (e.g., personal water craft, boats, air boats (e.g., swamp gliders), barges, ships, submersible vessels, etc.), manned air-based vehicles (e.g., propeller driven craft, gliders, vertical take-off and landing aircraft, etc.), unmanned air-based vehicles (e.g., aircraft drones, radio-controlled (RC) machines and models), and so on.

Additionally, the power generation devices can be scaled from smaller applications (single user handling and setup) to large applications (industrial uses such as wind turbine farms, ship, aircraft, and other types of large transport implementations, and so on, A power generation system (e.g., the turbine system 1802) can be accompanied with a support (also referred to as a mast, column, or stand) and support base. The support can be designed as an extendible column or stand to be employed in extended and/or retracted modes to generate power in stationary and/or moving uses. As previously indicated, the power generation system can be designed for smaller power generation applications such as a portable device which can be handled by a user and setup for outdoor camping power generation uses, and for larger power generation needs such as for trucks, boats, ships, buses, automobiles, two-wheeled machines (e.g., bicycles, motorcycles, etc.) and myriad other vehicle types for air, land, and water surface and subsurface mobility.

In other words, commercial full-scale wind turbines as well as residential mini/micro wind turbines can be built utilizing the disclosed turbine system(s). Portable wind turbines and/or water turbines can be made small enough for transport in environments such as camping, military, and other outdoor scenarios, where electrical power may be required. The disclosed portable wind and/or water turbines can fulfill needs in outdoor conditions which may not have readily available sources of power.

Marine vessels of all sizes, such as ships and sailboats can utilize wind-driven turbines as well as water-driven turbines to generate electric power, and stored in power storage systems such as batteries. The water and/or water turbines can also be used for propulsion when the power to the generator is reversed, to operate as an electric motor to force wind and/or water out the turbine to propel the associated vehicle (e.g., sailboat) especially when entering a harbor with the sail down or if the wind is not sufficiently strong to use the sails.

Therefore, when the power (electric current) is supplied to the water turbine motor/generator unit, the turbine functions as a propeller. However, if water currents are sufficiently strong to rotate the motor/generator, the water turbine produces electricity which can be stored in a battery bank, for example, for later usage. In addition, specially designed boats (e.g., air boats, swamp boats, etc.) can utilize the motor/generator concept with the wind turbine/ducted fan configurations.

Buses, recreational vehicles (RVs), and other vehicles typically require large amounts of electrical power during long trips, and there are not always places along the route to plug-in and recharge from the electrical grid. The disclosed architecture solves this problem when using the wind turbine with a tiltable telescoping mast, which can be retracted during travel and extended (or deployed) while parked. Additionally, there can be streamlined enclosures made for which the wind turbine retracts and nests into the enclosure during vehicle motion in order to reduce air resistance.

The disclosed wind turbines and water turbines reduce and/or eliminate problems plaguing the wind industry as well as providing benefits and a wide variety of applications in diverse markets that are environmentally friendly. For example, when utilizing wind turbines, tractor-trailer ("semi") trucks can charge and use batteries during long haul trips while the truck is parked and the driver is resting. More specifically, the semi-trucks can utilize telescoping masts in order to raise and lower the wind turbine while the truck switches between parked and moving conditions, respectively. In the trucking industry, for example, there is a significant need to reduce vehicle emissions, as many long-haul drivers idle the engine to keep power in the cab while the driver rests, and in seasonal conditions, to keep warm when sleeping in the cab. These emissions can be eliminated by using a wind turbine with battery banks (e.g., onboard).

With respect to aircraft, for example, manned electric motor-gliders and unmanned fixed-wing drones can utilize wind turbines to generate electricity to be stored in on-board electric batteries. These wind turbines compensate for aerodynamic drag (air resistance) by utilizing compound nozzles (e.g., convergent input and divergent output), which generate thrust that overcomes the drag force similar to a wing (airfoil) producing both lift and drag. In addition, the stored battery power can be supplied to the wind turbine motor/generator, which can then function as a ducted fan (propeller) to create powered thrust for take-offs and improved control.

Moreover, when using multiple wind turbine/ducted fan units, some turbine units can be enabled (controlled) in wind-turbine (generator) mode while other turbines can be enabled (controlled) in ducted-fan (motor) mode. These turbines can be (automatically) controlled to switch modes as power availability parameters vary in the power storage system.

These parameters can be user configured for manual and/or automatic control such that, for example, power consumption (for propulsion mode) is reduced or halted entirely when storage parameters (e.g., storage is at a low value) indicate charging is a higher priority than propulsion. In this case, the power generation system can send control signals to the turbine systems to dedicate some or all turbine systems to enter power storage mode.

Similarly, power generation can be reduced or halted entirely when storage parameters (e.g., storage is at a peak value) indicate propulsion is a higher priority than generation for storage. In this case, the power generation system can send control signals to dedicate some or all turbine systems to enter propulsion mode.

The power generation system is also capable of switching back and forth between charging and propulsion according to an optimum state where charging occurs while propulsion is also occurring such that power storage will not be drained.

When used for aircraft, for example, all wind turbines can be placed in wind turbine (generator) mode during landings to operate similar to regenerative braking in automobiles, where the turbine systems produce electricity upon descent to a landing and full stop.

The wind turbine systems (and water turbine systems) reduce and eliminate many current problems plaguing the wind industry such as eliminating "shadow flicker" due to an enclosed turbine design which prevents sunlight from shining through the turbine blades, eliminating acoustic pollution (infrasonic sound) by removing blade tip vortex shedding and controlling turbine exhaust pressure waves, eliminating ice or blade throwing due to an enclosed turbine design that traps debris internally, and mitigating wildlife kills (e.g., bird, bat, etc.) and other wildlife kills due to a more visible structure and elimination of the acoustic pollution.

The disclose turbine systems operate in a wide range of wind/water current speeds (e.g., low, high) due to the compound nozzle design with the fluid control valves. The turbine system can operate as a thruster in water and a ducted fan in the air for propulsion when the generator is powered in reverse as a motor for both boats and aircraft, respectively. The compound nozzles generate thrust which counters drag similar to a wing producing lift to overcome drag to fly.

The thrust force exceeds the drag force at a specific fluid speed range thereby enabling use on mobile vehicles. The system can use a wide variety of turbine designs including reaction types, impulse types, and horizontal or vertical concepts, where the variations are almost limitless, and reduces turbine size by improving power density due to generating higher fluid speeds at the turbine, in contrast to conventional turbines.

The (single) turbine system 1802 of FIG. 18 can be a multi-purpose system such that not only can the system 1802 be employed to generate power for storage in power storage units (e.g., batteries), but also to deliver power from the power generation system to the drive the turbine system 1802 in a propulsion (or thrust) mode. Thus, the same internal mechanisms of the turbine system 1802 that are driven by fluid flow into the turbine to rotate the turbine for power generation and storage in a power storage system (e.g., batteries), can be employed in the reverse by accessing the stored power to then drive the turbine to thrust or propel the turbine system 1802 in a given direction and at a given speed based on directional orientation of the turbine system 1802.

For example, the turbine system 1802 can be enabled into propulsion mode and the turbine system 1802 can be swiveled to propel the system 1802 in a given direction (e.g., horizontal, vertical, angled, etc.). Accordingly, any larger body or movable structure (e.g., a boat, submersible, vehicle, aircraft, etc.) affixed to the turbine system 1802 will then be propelled at the rate of speed in some direction.

Still further, the tower 1804 can be so designed and constructed to work (e.g., be mounted) in cooperation with trucks or other types of vehicles, ships, and transports. In these cases, the turbine system 1802 is no longer stationary, but moves with the vehicle.

The turbine system 1802 can be pivotally mounted on the top of the tower 1804 such that by way of fins 1806 on the outer surface of the aerodynamic system housing 1808 of the turbine system 1802, the turbine system 1802 will face the oncoming fluid flow for optimum utilization and power generation. Generated power is then carried on wiring routed down the outside or inside of the tower 1804 to the associated consuming system and/or storage system.

Figure 40:
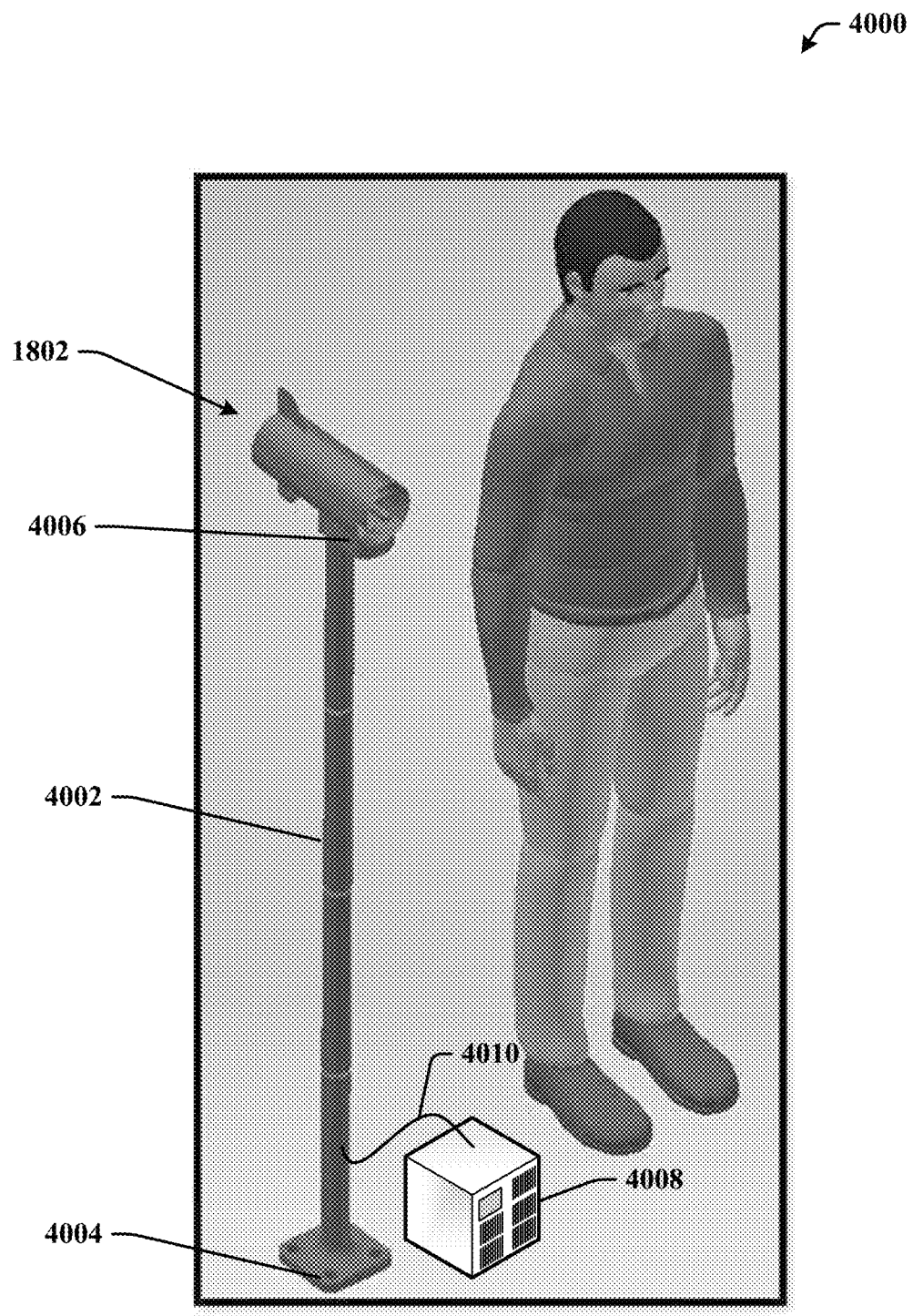
FIG. 40 illustrates the implementation of the turbine system as a user-portable power generation unit and/or as a user-portable propulsion generation system.

Referring again to the drawings, FIG. 40 illustrates the implementation of the turbine system 1802 as a user-portable power generation unit and/or as a user-portable propulsion generation system 4000. Here, the turbine system 1802 can be mounted on a support 4002. The support 4002 is user extendible as a height adjustment.

The support 4002 can also have a support base 4004 that facilitates securing the support 4002 and turbine system 1802 in a stable manner when in use. For example, the turbine system 1802 can be used solely as a fan in an outdoor environment. Alternatively, the turbine system 4000 can be placed into a windy environment sufficient to rotate the turbine and generate power (e.g., for light, to power other user devices, etc.). In yet another implementation, the user-portable turbine system 1802 can be placed into running water, such as a stream, which rotates the turbine to generate power.

As indicated in FIG. 39, the turbine system 1802 also comprises a local (with the turbine system 1802 versus remote from the turbine system 1802) electromechanical control system 1904 for power conversion, power routing (e.g., switching gear), and electromechanical interconnection for control and data acquisition.

The portable system 4000 includes the turbine system 1802 mounted on the extendible support 4002 (also referred to as telescoping mast). The support 4002 can also be provided with the support base 4004 which can be used to mount the support 4002 and turbine system 1802 on a solid surface (e.g., ground, tree trunk, rock, vehicle surfaces, etc.) for stable use. This turbine system 1802 can be controlled to operate as a wind power generator, wind propulsion system as a fan, or both. A power storage system 4006 can be built onboard the turbine system 1802, as a standalone system 4008 that plugs into (e.g., connects via a cable 4010) the turbine system 1802, or as both onboard and standalone systems.

Figure 41:
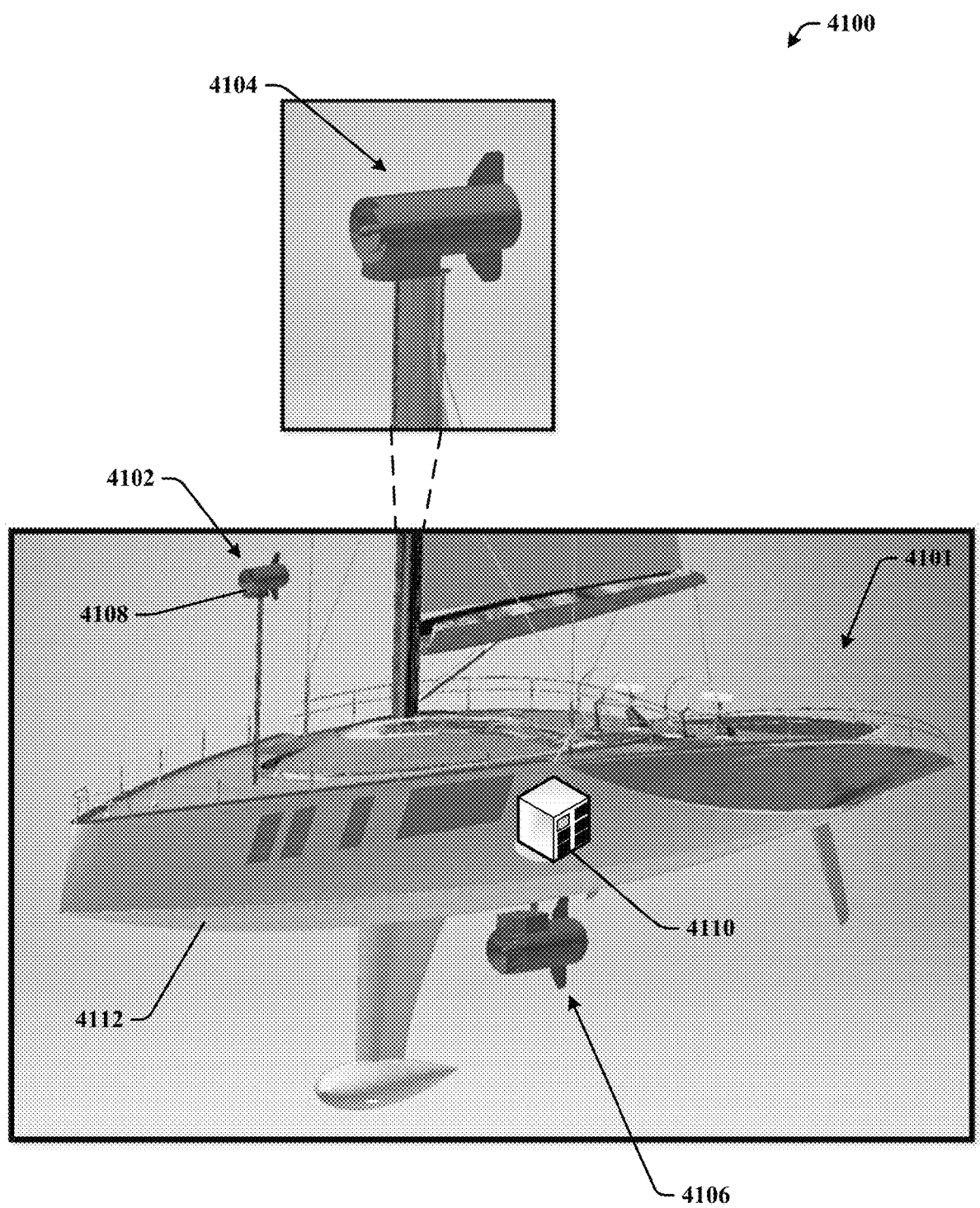
FIG. 41 illustrates a water-vehicle system of a water vehicle that can utilize turbine systems as dual-use power generators and/or propulsion units.

FIG. 41 illustrates a water-vehicle system 4100 of a water vehicle 4101 that can utilize turbine systems (4102, 4104, and 4106—similar to turbine system 1802) as dual-use power generators and/or propulsion units. Wind turbine system 4102 can be a small-scale deck-mounted air turbine system, turbine system 4104 can be a boat mast-mounted air turbine system, and turbine system 4106 can be a hull-mount submersible turbine system.

Turbine system 4102 can be controlled as a generator to generate power for storage in a power storage system 4108 (similar to onboard storage system 4006), and/or a separate off-board (not on the turbine system 4102) power storage system 4110 (similar to system 4008) that may be connected to and sited within the boat hull 4112. The turbine system 4102 can, alternatively, be controlled to operate as a ducted fan to assist (e.g., the sails of a sailboat, trolling of a fishing boat, etc.) in propelling the water vehicle 4101 through the water.

Further still, the power generation system can control the turbine system 4102 to cycle between power generation and propulsion according to predetermined parameters (e.g., power storage level, turbine system power usage, etc.) and/or sensed data (e.g., weather conditions, wind direction, wind velocity, ambient lighting conditions, road conditions, water temperature, fluid flow (speed, direction), etc.).

Wind turbine system 4104 (depicted as an expanded view (indicated by the dashed lines) on top of the boat mast) can be controlled as a generator to generate power for storage in the onboard power storage system (similar to onboard storage system 4108), and/or a separate off-board (not on the turbine system 4104) power storage system 4110 (similar to system 4008) that may be connected to and sited within the boat hull 4112. The turbine system 4104 can, alternatively, be controlled to operate as a ducted fan to assist (e.g., the sails of a sailboat, trolling of a fishing boat, etc.) in propelling the water vehicle 4101 through the water.

Further still, the power generation system can control the turbine system 4104 to cycle between power generation and propulsion according to predetermined parameters (e.g., power storage level, turbine system power usage, etc.) and/or sensed data (e.g., weather conditions, wind direction, wave action, wind velocity, ambient lighting conditions, road conditions, water temperature, fluid flow (speed, direction), etc.).

Water turbine system 4106 (submerged and attached to the bottom of the hull 4112) can be controlled as a generator to generate power for storage in the onboard power storage system (similar to onboard storage system 4108), and/or a separate off-board (not on the turbine system 4106) power storage system 4110 (similar to system 4008) that may be connected to and sited within the boat hull 4112. The turbine system 4106 can, alternatively, be controlled to operate as a propulsion unit to assist (e.g., the sails of a sailboat, trolling of a fishing boat, etc.) or standalone in propelling the water vehicle 4101 through the water.

Further still, the power generation system can control the turbine system 4106 to cycle between power generation and propulsion according to predetermined parameters (e.g., power storage level, turbine system power usage, etc.) and/or sensed data (e.g., weather conditions, wind direction, wave action, wind velocity, ambient lighting conditions, road conditions, water temperature, fluid flow (speed, direction), etc.).

FIG. 42A and FIG. 42B illustrate a land-vehicle system 4200 of a land-based vehicle 4201 that can utilize turbine system 4202 (similar to turbine system 1802) as a power generator.

In the trucking industry, for example, there is a significant need to reduce vehicle emissions and save on fuel costs, as long-haul drivers typically idle the engine to maintain power to the truck cab while the driver rests, sleeps, etc., and in seasonal conditions, to keep the driver warm when resting/sleeping in the cab. These emissions can be eliminated by using the (wind) turbine systems 4200 with battery banks (e.g., not shown, but typically located onboard the tractor).

For example, when utilizing wind turbines, tractor-trailer ("semi") trucks can charge batteries, while the truck is moving and/or stationary, and then use the stored power in the batteries (e.g., during long-haul trips) while the truck is parked and the driver is resting/sleeping to power the cab systems (e.g., heating system, cooling system, entertainment systems, communications, radios, etc.).

The turbine system 4202 can be attached to the top of the mast 4204 using a swivel attachment 4206 (e.g., using bearings) that enables the turbine system 4202 to automatically orient itself at the incoming air flow, as further enabled by the fins 1806 on the housing of the turbine system 4202.

More specifically, the semi-trucks (the land-based vehicle 4201) can utilize a telescoping mast 4204 in order to raise the turbine system 4202 (shown in FIG. 42A) and lower the (wind) turbine system 4202 (shown in FIG. 42B) while the land-based vehicle 4201 switches between parked and moving conditions, respectively. In the lowered or retracted position shown in FIG. 42B, the turbine system 4202 can also be automatically stored so as to not interfere with the trailer typically being pulled (not shown).

FIG. 43A and FIG. 43B illustrate a power generation system 4300 that employs the wind turbine system 4202 on a public transport, such as a bus 4302. In FIG. 43A, the turbine system 4202 is in an elevated position using the mast 4204. The turbine system 4202 rotates freely (e.g., on a bearing-based swivel system) to orient itself into the oncoming wind as the bus 4302 moves and when stationary, to charge an onboard power storage system (e.g., battery banks).

As depicted in FIG. 43B, when not needed or used, the mast 4204 can be retracted, and the retracted mast 4204/turbine system 4202 can be controlled by the bus driver to be laid down flat against the top surface of the bus 4302 by using a swivel base 4302 and onboard power generation system.

FIG. 44A and FIG. 44B illustrate an aircraft system 4400 that utilizes turbine systems 4202 attached to an aircraft 4402 for power generation and/or propulsion. The aircraft 4402 can be a glider where simply gliding through the air enables the turbine systems 4202 to generate and store power in an onboard power storage system (e.g., batteries). The turbine systems 4202 can, alternatively or in combination therewith, be controlled (e.g., manually, automatically) as thrust systems to assist in propelling the aircraft 4402 through the air.

As indicated herein, the turbine systems 4202 can be controlled independently (e.g., one at a time), selectively as subsets (e.g., 2 or 3 in the same mode) and/or entirely (all four systems 4202 in the same mode, or mixed modes of thrust and power generation), for power generation and propulsion during flight and landing operations.

Put another way, there is described a turbine system, comprising: a turbine mounted in a housing into which fluid flow is received for rotation of the turbine, the housing having compound nozzles which include a smaller opening into which fluid flow is received and a larger opening from which fluid flow is exhausted, the turbine positioned inside a shroud, the shroud designed as a conic section and rotates in unison with the turbine; and, a power generation system connected to the turbine to receive and store power from the turbine in a power storage mode, and to deliver power to the turbine to control the turbine in a propulsion mode.

The turbine system can further comprise an electromechanical control system which controls cycling blades of the turbine system to incrementally open and close the cycling blades to manage fluid flow into the turbine. The cycling blades can be controlled to achieve optimum rotational energy of the turbine for at least one of power generation or propulsion.

The turbine system can further comprise an electromechanical control system for control and data acquisition, power conversion, and power routing, the electromechanical control system is local to the power generation system. The power generator system can include a rotating stator, the rotating stator fixedly attached to the turbine, and rotated by the turbine based on the fluid flow to generate power which is routed to power storage.

The housing is pivotally mounted and controlled to enable the propulsion mode from the turbine in a specific direction. The turbine system can be employed on an aquatic (water-based) vehicle to generate and store power when controlled as a wind turbine, and another turbine system is employed on the aquatic vehicle to provide propulsion when controlled as a (submerged) water turbine.

The turbine system can be portable for outdoor use to generate and store power based on at least one of wind or water. The turbine system can be controlled to provide thrust from at least one of wind or water when in the propulsion mode.

The turbine system can further comprise an extendible support on which the housing is mounted, the extendible support is at least one of manually extendible and retractable or automatically controlled to be extended and retracted, and which support comprises a support base which enables attachment of the support and turbine system to a surface. The support base can comprise a hinged hardware component which enables rotation of the support and the turbine system into a stowed position and an operational position.

The compound nozzles of the turbine system inherently generate thrust to compensate for aerodynamic drag. The power generation system automatically switches operation of the turbine between the power storage mode and the propulsion mode based on amount of stored power. The turbine can be controlled in propulsion mode during take-off of an aircraft, and in power storage mode during landing of the aircraft to facilitate braking. The turbine system can further comprise electrical switching gear that enables charging of some power storage elements and power delivery from other power storage elements.

In another implementation, a turbine system is provided, comprising: a turbine mounted in a housing into which fluid flow is received for rotation of the turbine, the housing having compound nozzles which include a smaller opening into which fluid flow is received and a larger opening from which fluid flow is exhausted, the turbine positioned inside a shroud, the shroud designed as a conic section and rotates in unison with the turbine; an electromechanical control system which controls cycling blades of the turbine system to incrementally open and close the cycling blades to manage fluid flow into and out of the turbine; and, a power generation system connected to the turbine to receive and store power from the turbine in a power storage mode, and to deliver power to the turbine to control the turbine in a propulsion mode.

The turbine system can further comprise an extendible support on which the housing is mounted, the extendible support is at least one of manually extendible and retractable or automatically controlled to be extended and retracted. The turbine system can further comprise a support base which enables attachment of the support and turbine system to a water-based vehicle, a land-based vehicle, and an air-based vehicle.

The turbine system can further comprise electrical switching gear that enables charging of some power storage elements during the power storage mode and concurrent delivery of power from other power storage elements during the propulsion mode.

In yet another implementation, a turbine system is provided, comprising: a turbine mounted in a housing into which fluid flow is received for rotation of the turbine, the housing comprising a convergent section into which fluid flow is input and a divergent section from which fluid flow is output, the turbine positioned inside a shroud, the shroud designed as a conic section and rotates in unison with the turbine; an electromechanical control system which controls cycling blades of the turbine system to incrementally open and close the cycling blades to manage fluid flow into and out of the turbine; and a power generation system connected to the turbine to receive and store power from the turbine in a power storage mode, and to deliver power to the turbine to control the turbine in a propulsion mode.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A turbine system, comprising:
a turbine mounted in a housing into which fluid flow is received for rotation of the turbine, the housing having compound nozzles which include a smaller opening into which fluid flow is received and a larger opening from which fluid flow is exhausted, the turbine positioned inside a shroud and affixed to an inside surface of the shroud, wherein the shroud and turbine rotate in unison; and
a power generation system connected to the turbine to store power from rotation of the turbine when in a power storage mode, and to deliver power to the turbine to control the turbine to output fluid flow as thrust when in a propulsion mode, the power generation system includes a power generation device affixed in a hub of the turbine, the power generation device having a stator and a rotor wherein rotation of the turbine also rotates the stator of the power generation device to generate the power for storage and the power for thrust from fluid flow.

2. The turbine system of claim 1, wherein the housing is pivotally mounted and controlled to enable the propulsion mode from the turbine in a specific direction.

3. The turbine system of claim 1, further comprising an extendible support on which the housing is mounted, the extendible support is at least one of manually extendible and retractable or automatically controlled to be extended and retracted, and which support comprises a support base which enables attachment of the support and turbine system to a surface.

4. The turbine system of claim 3, wherein the support base comprises a hinged component which enables rotation of the support and the turbine system into a stowed position and an operational position.

5. The turbine system of claim 1, wherein the compound nozzles inherently generate the thrust to compensate for aerodynamic drag.

6. The turbine system of claim 1, wherein the power generation system automatically switches operation of the turbine between the power storage mode and the propulsion mode based on an amount of the stored power.

7. The turbine system of claim 1, further comprising an electromechanical control system which controls cycling blades of the turbine system to incrementally open and close the cycling blades to manage fluid flow into the turbine.

8. The turbine system of claim 1, wherein the cycling blades are controlled to achieve optimum rotational energy of the turbine for at least one of power generation or propulsion.

9. The turbine system of claim 1, further comprising an electromechanical control system for control and data acquisition, power conversion, and power routing, the electromechanical control system is local to the power generation system.

10. The turbine system of claim 1, wherein the power generator system includes a rotating stator, the rotating stator fixedly attached to the turbine, and rotated by the turbine based on the fluid flow to generate power which is routed to power storage.

11. The turbine system of claim 1, wherein the turbine system is employed on an aquatic vehicle to generate and store power when controlled as a wind turbine, and another turbine system is employed on the aquatic vehicle to provide propulsion when controlled as a water turbine.

12. The turbine system of claim 1, wherein the turbine system is portable for outdoor use to generate and store power based on at least one of wind or water.

13. The turbine system of claim 1, wherein the turbine system is controlled to provide thrust from at least one of wind or water when in the propulsion mode.

14. The turbine system of claim 1, wherein the turbine can be controlled in propulsion mode during take-off of an aircraft, and in power storage mode during landing of the aircraft to facilitate braking.

15. The turbine system of claim 1, further comprising electrical switching gear that enables charging of some power storage elements and power delivery from other power storage elements.

16. A turbine system, comprising:
a turbine mounted in a housing into which fluid flow is received for rotation of the turbine, the housing having compound nozzles which include a smaller opening into which fluid flow is received and a larger opening from which fluid flow is exhausted, the turbine positioned inside a shroud and affixed to an inside surface of the shroud, wherein the shroud and turbine rotate in unison;

an electromechanical control system which controls cycling blades of the turbine system to incrementally open and close the cycling blades to manage fluid flow into and out of the turbine; and a power generation system connected to the turbine to store power from rotation of the turbine when in a power storage mode, and to deliver power to the turbine to control the turbine to output fluid flow as thrust when in a propulsion mode, the power generation system includes a power generation device affixed inside a hub of the turbine, wherein rotation of the turbine also rotates the power generation device in the hub to generate the power for storage and the power for thrust from fluid flow.

17. The turbine system of claim 16, further comprising an extendible support on which the housing is mounted, the extendible support is at least one of manually extendible and retractable or automatically controlled to be extended and retracted.

18. The turbine system of claim 17, further comprising a support base which enables attachment of the support and turbine system to a water-based vehicle, a land- based vehicle, and an air-based vehicle.

19. The turbine system of claim 16, further comprising electrical switching gear that enables charging of power storage elements during the power storage mode and concurrent delivery of power from other power storage elements during the propulsion mode.

* * * * *